United States Patent [19]
Itou et al.

[11] Patent Number: 5,982,754
[45] Date of Patent: Nov. 9, 1999

[54] METHOD OF CHARGING FOR ADDITIONAL SERVICES, AND ADDITIONAL-SERVICE COMMUNICATION SYSTEM

[75] Inventors: Daiji Itou; Shinichi Ishigaki, both of Fukuoka, Japan

[73] Assignee: Fujitsu Limited, Kanagawa, Japan

[21] Appl. No.: 08/812,087

[22] Filed: Mar. 4, 1997

[30] Foreign Application Priority Data

Aug. 20, 1996 [JP] Japan ................................. 8-218390

[51] Int. Cl.⁶ .............................. H04J 3/14; H04L 12/56
[52] U.S. Cl. ............................................. 370/253; 370/395
[58] Field of Search ............................ 370/395, 397, 370/399, 252, 253; 348/1, 2, 3, 10; 455/1, 2; 379/111, 113, 114, 122, 126, 130, 140

[56] References Cited

U.S. PATENT DOCUMENTS

| | | | |
|---|---|---|---|
| 5,539,884 | 7/1996 | Robrock, II | 370/399 |
| 5,589,892 | 12/1996 | Knee et al. | 348/731 |
| 5,748,493 | 5/1998 | Lightfoot et al. | 348/10 |
| 5,771,231 | 6/1998 | Watanabe | 370/377 |
| 5,790,172 | 8/1998 | Imanaka | 348/10 |

FOREIGN PATENT DOCUMENTS

| | | |
|---|---|---|
| 53-114306 | 10/1978 | Japan . |
| 55-58654 | 5/1980 | Japan . |
| 58-14646 | 1/1983 | Japan . |
| 58-30261 | 2/1983 | Japan . |
| 58-66455 | 4/1983 | Japan . |
| 58-99054 | 6/1983 | Japan . |
| 59-178853 | 10/1984 | Japan . |
| 62-132461 | 6/1987 | Japan . |
| 1-317063 | 12/1989 | Japan . |
| 3-38194 | 2/1991 | Japan . |
| 3-139954 | 6/1991 | Japan . |

*Primary Examiner*—Chau Nguyen
*Assistant Examiner*—Soon-Dong Hyun
*Attorney, Agent, or Firm*—Helfgott & Karas, P C.

[57] ABSTRACT

Disclosed is an additional-service communication system in which an additional service for which a request has been issued by a subscriber apparatus is provided to the subscriber apparatus from a provider apparatus by cells via a transmission line. In the communication system, a transmission apparatus is provided between the provider apparatus and the subscriber apparatus. The transmission apparatus generates charge metering cells commensurate with amount of additional-service cells in regard to each subscriber apparatus and transmits these cells to the provider apparatus and subscriber apparatus via the transmission line. The provider apparatus counts the charge metering cells in regard to each subscriber apparatus and calculates the charge due from each subscriber apparatus. The subscriber apparatus counts the charge metering cells, calculates the charge due and displays this charge.

36 Claims, 57 Drawing Sheets

| UNIT CHARGE (ex. 10) | • INDICATES 10 YEN PER CHARGE METERING CELL FOR UNIT CHARGE |

| CHARGE (ex. 1000) | • INDICATES THAT CHARGE IS 1000 YEN |

FIG. 12

|   | 8 | 7 | 6 | 5 | 4 | 3 | 2 | 1 |
|---|---|---|---|---|---|---|---|---|
| 1 | GFC | | | | VPI(8) | | | |
| 2 | VPI | | | | VCI(16) | | | |
| 3 | | | | | | | | |
| 4 | | | | PTI(3) | | | CLP | |
| 5 | HEC(8) | | | | | | | |
| 6 | OAM Cell Type | | | | OAM Function Type | | | |
| 7 | NOT USED | | | | | | | |
| 8 | | | | | | | | |
| ⋮ | | | | | | | | |
| 51 | | | | | | | | |
| 52 | Reserved (=000000) | | | | | | | |
| 53 | EDC(CRC.-10) | | | | | | | |

VPI/VCI : CONTROL CHANNEL VPI/VCI BETWEEN PROVIDER AND SUBSCRIBER

PTI : 5 (INDICATES OAM CELL OF END-TO-END)
CLP : 0 (INDICATES THAT CELL LOSS PRIORITY IS HIGH)

HEC

OAM Cell Type : 1001 (CHARGING CELL)
OAM Function Type : 0010 (UNIT CHARGE RECEPTION-COMPLETED)

FIG. 13

| Byte | 8 | 7 | 6 | 5 | 4 | 3 | 2 | 1 |
|---|---|---|---|---|---|---|---|---|
| 1 | GFC | | | | VPI (8) | | | |
| 2 | VPI | | | | | | | |
| 3 | VCI (16) | | | | | | | |
| 4 | | | | | | PTI (3) | | CLP |
| 5 | HEC (8) | | | | | | | |
| 6 | OAM Cell Type | | | | OAM Function Type | | | |
| 7 | BASE-SIDE VPI OF VIDEO INFO A | | | | | | | |
| 8–9 | BASE-SIDE VCI OF VIDEO INFO A | | | | | | | |
| 10 | CHARGING METHOD OF VIDEO INFO A | | | | | | | |
| 11–12 | UNIT USAGE OF VIDEO INFO A | | | | | | | |
| 13 | BASE-SIDE VPI OF VIDEO INFO B | | | | | | | |
| 14–15 | BASE-SIDE VCI OF VIDEO INFO B | | | | | | | |
| ... | ... | | | | | | | |
| 43 | BASE-SIDE VPI OF VIDEO INFO X | | | | | | | |
| 44–45 | BASE-SIDE VCI OF VIDEO INFO X | | | | | | | |
| 46 | CHARGING METHOD OF VIDEO INFO X | | | | | | | |
| 47–48 | UNIT USAGE OF VIDEO INFO X | | | | | | | |
| 49–50 | STOPPER (FFFF) | | | | | | | |
| 51 | NOT USED | | | | | | | |
| 52 | Reserved (=000000) | | | | | | | |
| 53 | EDC (CRC-10) | | | | | | | |

VPI/VCI : CONTROL CHANNEL VPI/VCI BETWEEN PROVIDER AND TRANSMISSION UNIT

PTI : 5 (INDICATES OAM CELL OF END-TO-END)
CLP : 0 (INDICATES THAT CELL LOSS PRIORITY IS HIGH)

HEC
OAM Cell Type : 1001 (CHARGING CELL)
OAM Function Type : 0011 (CHARGING DATABASE NOTIFICATION)

CHARGE DATA OF UP TO SEVEN ITEMS OF VIDEO INFO CAN BE COMMUNICATED

| | 8 | 7 | 6 | 5 | 4 | 3 | 2 | 1 | |
|---|---|---|---|---|---|---|---|---|---|
| 1 | GFC | | | | VPI(8) | | | | VPI/VCI: USE SAME VPI/VCI AS THAT OF BASE-SIDE VIDEO CHANNEL |
| 2 | VPI | | | | VCI(16) | | | | |
| 3 | | | | | | | | | |
| 4 | | | | | PTI(3) | | | CLP | PTI: 4 (INDICATES OAM CELL OF SEGMENT)<br>CLP: 0 (INDICATES THAT CELL LOSS PRIORITY IS HIGH) |
| 5 | HEC(8) | | | | | | | | HEC |
| 6 | OAM Cell Type | | | | OAM Function Type | | | | OAM Cell Type : 1001 (CHARGING CELL)<br>OAM Function Type : 0101 (CHARGE METERING CELL FOR PROVIDER APPARATUS) |
| 7 | CHARGE | | | | | | | | CHARGE : 0 (INDICATES CHARGE EQUIVALENT TO UNIT CHARGE)<br>≠0 (INDICATES CHARGE) |
| 8 | | | | | | | | | |
| 9 | SUBSCRIBER-SIDE VIDEO-CHANNEL VPI | | | | | | | | |
| 10 | SUBSCRIBER-SIDE VIDEO-CHANNEL VCI | | | | | | | | |
| 11 | NOT USED | | | | | | | | |
| 51 | | | | | | | | | |
| 52 | Reserved (=000000) | | | | | | | | |
| 53 | EDC(CRC-10) | | | | | | | | |

FIG. 15

| CHARGE (ex. 1000) | · INDICATES THAT CHARGE IS 1000 YEN |

FIG. 37

VPI/VCI: CONTROL CHANNEL VPI/VCI BETWEEN PROVIDER AND TRANSMISSION APPARATUS

PTI : 5 (INDICATES OAM CELL OF END-TO-END)
CLP : 0 (INDICATES THAT CELL LOSS PRIORITY IS HIGH)

HEC

OAM Cell Type : 1001 (CHARGING CELL)
OAM Function Type : 1011 (CHARGE RECEPTION COMPLETED)

| | 8 | 7 | 6 | 5 | 4 | 3 | 2 | 1 |
|---|---|---|---|---|---|---|---|---|
| 1 | GFC | | | | VPI(8) | | | |
| 2 | VPI | | | | VCI(16) | | | |
| 3 | VCI(16) | | | | | | | |
| 4 | | | | | PTI(3) | | | CLP |
| 5 | HEC(8) | | | | | | | |
| 6 | OAM Cell Type | | | | OAM Function Type | | | |
| 7 | SEQUENCE NO. | | | | | | | |
| 8 | NOT USED | | | | | | | |
| 51 | | | | | | | | |
| 52 | Reserved (=000000) | | | | | | | |
| 53 | EDC(CRC-10) | | | | | | | |

FIG. 51

| DATE | (ex. 0) |
| --- | --- |
| HOUR | (ex. 0 0) |
| MINUTE | (ex. 0 0) |

- DATE : DATE ON WHICH CHARGE NOTIFICATION CELL WAS GENERATED
  0 : DAILY
  1~31 : SPECIFIED DATE
- HOUR : 00~23
- MINUTE : 00~59

FOR EXAMPLE, INDICATES THAT CHARGE NOTIFICATION CELL IS GENERATED DAILY AT 00 : 00

FIG. 55

| CHARGE (ex. 1000) | · INDICATES THAT CHARGE NOTIFICATION CELL IS GENERATED WHENEVER CHARGE IN REGARD TO EACH SUBSCRIBER APPARATUS AMOUNTS TO 1000 YEN |

METHOD OF CHARGING FOR ADDITIONAL SERVICES, AND ADDITIONAL-SERVICE COMMUNICATION SYSTEM

BACKGROUND OF THE INVENTION

This invention relates to an additional-service communication system in which an additional service for which a request has been issued by a subscriber apparatus is provided to the subscriber apparatus from a provider apparatus via a transmission line, as well as to a method of charging for this additional service. More particularly, the invention relates to a charging method and additional-service communication system in an ATM (asynchronous transfer mode) network for providing an additional service by ATM cells, wherein the additional service is charged separately from the charge for communication utilizing the ATM network.

The provision of additional services such as VOD (video on demand) and digital broadcasting utilizing ATM networks is growing more widespread. With a view to providing such additional services using ATM networks, there is a need to charge for the additional services per se. Hence there is demand for an appropriate charging method.

In general, charging for an additional service in an ATM network that provides an additional service by ATM cells involves paying the provider a fixed amount on a monthly basis irrespective of the amount of information supplied by the additional service (i.e., irrespective of the cell flow rate and supply time). However, it is now demanded that a charge commensurate with the amount of information supplied is collected from the subscriber. In order to accomplish this, it is required that the provider calculate the charge by metering, on a per-subscriber basis, a charge conforming to the amount of information supplied. FIG. 63 illustrates the configuration of a provider apparatus having such a charge calculating function.

Specifically, FIG. 63 shows a provider apparatus 1 for providing an additional service by ATM cells. The additional service is received by a subscriber apparatus 2 via a transmission line 3. A transmission apparatus 4 is provided between the provider apparatus 1 and the subscriber apparatus 2 and is equipped with an ATM switch and the like. The provider apparatus 1 includes a service controller 1a for communicating with the transmission apparatus 4 and subscriber apparatus 2 and controlling the provision of an additional service, an ATM controller 1b for converting various signals (video, audio, data) to ATM cells and converting ATM cells to various signals, a basic transmission line controller 1c for converting ATM cells to transmission signals and transmitting the signals over the transmission line 3, and converting transmission signals to ATM cells, and a storage device 1d for registering various information regarding the provider apparatus. The storage device 1d has a service table 1e in which various information for additional services is registered, and a charging table 1f that stores various information for charging purposes. The provider apparatus 1 further includes a charge metering unit 1g which, based on the charging information in the charging table 1f, meters and stores, on a per-subscriber basis, a charge in accordance with amount of additional-service cells (e.g., video cells).

If the subscriber apparatus 2 transmits a request for provision of an additional service to the provider apparatus 1 via the transmission apparatus 4, the service controller 1a of the provider apparatus 1 refers to the service table 1e in the storage device 1d, transmits routing information to the transmission apparatus 4 accommodating the subscriber apparatus 2 and establishes a path between the provider apparatus 1 and subscriber apparatus 2. The service controller 1a then starts sending the transmission apparatus 4 video cells that have been designated by the subscriber apparatus 2. Based upon the charging information in the charging table 1f, the charge metering unit 1g of the provider apparatus 1 meters, on a per-subscriber basis, a charge in accordance with the amount of usage of the video signals and stores this charge in memory.

Thus, when it is attempted to implement a method of charging for additional service in accordance with the amount of information supplied, the provider apparatus 1 is required to have a function through which the charge for each subscriber is metered. Consequently, if the number of subscribers is large, metering the individual charges constitutes a heavy burden. This influences the primary function of providing the additional service per se and it is likely to result in poorer service.

Further, in case of an additional service in which multicasting is performed in the transmission apparatus 4 for digital broadcasts or the like and channel changeover control is carried out by the transmission apparatus 4, charge based upon amount of cell in regard to each subscriber apparatus cannot be metered in the provider apparatus. Consequently, the only feasible method of charging available is to collect a flat rate on, say, a monthly basis.

SUMMARY OF THE INVENTION

Accordingly, an object of the present invention is to make it possible to meter charge in accordance with amount of cell usage in an apparatus other than a provider apparatus, thereby reducing the burden upon the provider apparatus and preventing a decline in the quality of additional services.

Another object of the invention is to make it possible to meter charge commensurate with cell usage on a per-subscriber basis even in case of an additional service in which multicasting is performed in a transmission apparatus and channel changeover control is carried out by the transmission apparatus.

Still another object of the invention is to improve the quality of the charging service per se by using a charge metering cell or charge notification cell to notify the provider apparatus and the subscriber of the charge.

In accordance with the present invention, the foregoing objects are attained by providing a transmission apparatus of an additional-service communication system in which an additional service for which a request has been issued by a subscriber apparatus is provided to the subscriber apparatus from a provider apparatus by cells via the transmission apparatus, the transmission apparatus comprising means for measuring amount of additional-service cells in regard to each subscriber apparatus, means for generating charge metering cells commensurate with the amount of additional-service cells, and means for transmitting the charge metering cells to the provider apparatus and/or subscriber apparatus.

Further, in accordance with the present invention, the foregoing objects are attained by providing an additional-service communication system in which an additional service for which a request has been issued by a subscriber apparatus is provided to the subscriber apparatus from a provider apparatus by cells via a transmission apparatus, wherein the transmission apparatus comprises means for measuring amount of additional-service cells at each subscriber apparatus, means for generating charge metering cells commensurate with the amount of additional-service cells, and means for transmitting the charge metering cells to the provider apparatus and/or subscriber apparatus; the subscriber apparatus comprises means for extracting the charge metering cells sent from the transmission apparatus and means for calculating a charge in regard to the subscriber apparatus based upon a number of charge metering cells received; and the provider apparatus comprises means for extracting the charge metering cells sent from the transmission apparatus, means for calculating a charge in regard to each subscriber apparatus based upon a number of charge metering cells received per each subscriber apparatus, and means for storing the charge due from each subscriber apparatus.

Further, in accordance with the present invention, the foregoing objects are attained by providing an additional-service communication system in which an additional service for which a request has been issued by a subscriber apparatus is provided to the subscriber apparatus from a provider apparatus by cells via a transmission apparatus, wherein the provider apparatus comprises means for measuring amount of additional-service cells for each subscriber apparatus, means for generating charge metering cells commensurate with the amount of additional-service cells for each subscriber apparatus, means for transmitting the charge metering cells, and means for storing the charge regarding each subscriber apparatus; and the transmission apparatus comprises means for extracting charge metering cells sent from the provider apparatus and calculating a charge due from each subscriber apparatus based upon a number of charge metering cells received, and means for notifying the provider apparatus, by a charge notification cell, of the charge due from each subscriber apparatus.

Further, in accordance with the present invention, the foregoing objects are attained by providing an additional-service communication system in which an additional service for which a request has been issued by a subscriber apparatus is provided to the subscriber apparatus from a provider apparatus by cells via a transmission apparatus, wherein the provider apparatus comprises means for measuring amount of additional-service cells for each subscriber apparatus, means for generating charge metering cells commensurate with the amount of additional-service cells for each subscriber apparatus, means for transmitting the charge metering cells, and means for storing the charge due from each subscriber apparatus; and the transmission apparatus comprises means for multicasting, to a plurality of subscriber apparatus, charge metering cells and additional-service cells sent from the provider apparatus, means for counting the charge metering cells in regard to each subscriber apparatus after multicasting, and calculating charge in regard to each subscriber apparatus at multicasting of an additional service, and means for notifying the provider apparatus and subscriber apparatus, by a charge notification cell, of the charge due from the subscriber apparatus.

Other features and advantages of the present invention will be apparent from the following description taken in conjunction with the accompanying drawings.

BRIEF DESCRIPTION OF THE DRAWINGS

FIG. 12 shows the format of a charging cell (unit-charge reception-completed notification cell);

FIG. 13 shows the format of a charging cell (charging database notification cell);

FIG. 15 shows the format of a charging cell (charge metering cell to provider apparatus);

FIG. 37 shows the format of a charging cell (charge reception-completed notification cell);

FIG. 51 is a diagram illustrating the content of charge notification time table in the transmission apparatus;

FIG. 55 is a diagram illustrating the content of a charge notification fee table in the transmission apparatus;

DESCRIPTION OF THE PREFERRED EMBODIMENTS (A) Overview of the Invention (a) Overview of First Aspect FIG. 1 is a diagram for describing an overview of a first aspect of the present invention. The system shown in FIG. 1 includes a provider apparatus 11 for providing an additional service by means of ATM cells, subscriber apparatus 12a~12n for receiving the additional service, and a transmission apparatus 14 provided between the provider apparatus 11 and the subscriber apparatus 12a~12n and equipped with an ATM switch and the like.

Figure 1:
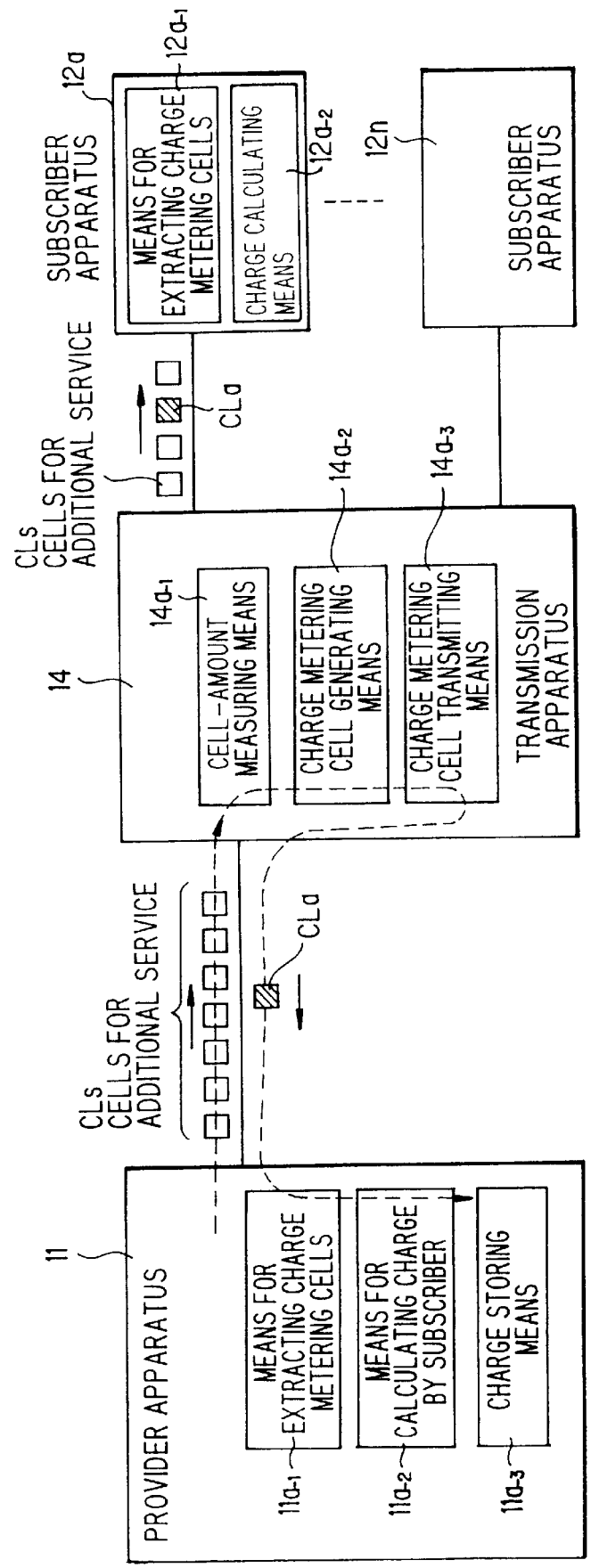
FIG. 1 is a diagram for describing an overview of a first aspect of the present invention.

The transmission apparatus 14 has means 14a-1 for measuring amount of additional-service cells per each subscriber apparatus, charge metering cell generating means 14a-2 for generating a charge metering cell CLa every unit of predetermined quality of the additional-service cells, and means 14a-3 for transmitting the charge metering cell to the provider apparatus 11 and/or subscriber apparatus 12a~12n. The provider apparatus 11 includes, in addition to means (not shown) for sending additional-service cells, means 11a-1 for extracting the charge metering cell CLa, means 11a-2 for calculating a charge in regard to each subscriber apparatus based upon the charge metering cells per each subscriber apparatus, and means 11a-3 for storing the charge regarding each subscriber apparatus. Each of the subscriber apparatus 12a~12n has means 12a-1 for extracting the charge metering cell CLa and means 12a-2 for calculating a charge in regard to the subscriber apparatus based upon the number of charge metering cells received.

The cell-amount measuring means 14a-1 of the transmission apparatus 14 measures the amount of the additional-service cells CLs subscriber by subscriber, the charge metering cell generating means 14a-2 generates charge metering cells in accordance with the amount of the additional-service cells, and the means 14a-3 transmits the charge metering cells to the provider apparatus 11 and/or subscriber apparatus 12a~12n via a transmission line. The cell extracting unit 12a-1 of the provider apparatus 11 extracts the charge metering cells and the charge calculating unit 12a-2 calculates and displays the charge in regard to the subscriber apparatus based upon the number of charge metering cells received. The cell extracting unit 11a-1 of the provider apparatus 11 extracts the charge metering cells, the charge calculating unit 11a-2 calculates a charge in regard to each subscriber apparatus based upon the received charge metering cells per each subscriber apparatus, and the charge memory 11a-3 stores the charge regarding each subscriber apparatus.

In this case, the unit charge per charge metering cell is established in advance and the charge calculating units 11a-2, 12a-2 in the provider apparatus 11 or subscriber apparatus 12a~12n calculate the charge based upon the number of charge metering cells received and the unit charge. Further, the charge metering cell generating unit 14a-2 in the transmission apparatus 14 inserts the charge into a charge metering cell and the charge calculating units 11a-2, 12a-2 in the provider apparatus 11 or subscriber apparatus 12a~12n add up the charges in the charge metering cells to calculate the total charge per subscriber.

The transmission apparatus 14 generates and transmits charge metering cells in accordance with any of the following methods (1) through (4):

(1) The transmission apparatus 14 generates a charge metering cell per prescribed flow-rate units of additional-service cells sent from the provider apparatus 11 to the subscriber apparatus 12a~12n.

(2) The transmission apparatus 14 generates a charge metering cell per prescribed time during which the provider apparatus 11 supplies the subscriber apparatus 12a~12n with an additional service.

(3) The transmission apparatus 14 generates a charge metering cell per connection in which the provider apparatus 11 supplies the subscriber apparatus 12a~12n with an additional service.

(4) In dependence upon the category of additional service which the provider apparatus provides to the subscriber apparatus, the transmission apparatus 14 decides in accordance with which of charging by prescribed cell flow rate, charging by prescribed service provision time or charging by connection, charging control is to be performed, generates the charge metering cell and transmits the charge metering cell to the provider apparatus 11 and subscriber apparatus 12a~12n.

Furthermore, the transmission apparatus 14 is provided with a charging database and performs charging control in accordance with this database. Alternatively, the provider apparatus 11 is provided with a charging database and notifies the transmission apparatus 14, per each additional-service request from the subscriber apparatus 12a~12n, of a charging rate in accordance with the charging database, and the transmission apparatus 14 performs charging control in accordance with the charging rate of which it has been notified.

(b) Overview of second aspect

Figure 2:
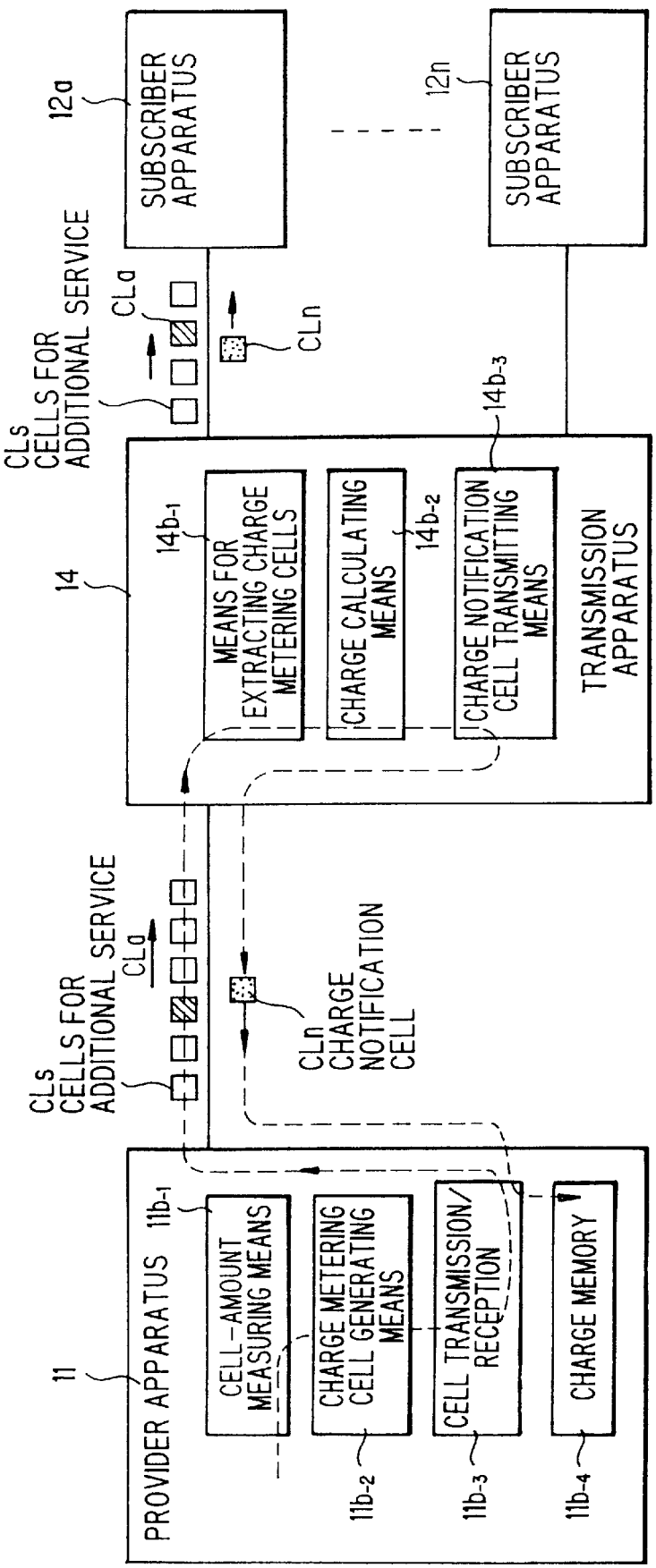
FIG. 2 is a diagram for describing an overview of a second aspect of the present invention.

FIG. 2 is a diagram for describing an overview of a second aspect of the present invention. The system shown in FIG. 2 includes the provider apparatus 11 for providing an additional service by means of ATM cells, the subscriber apparatus 12a~12n for receiving the additional service, and the transmission apparatus 14 provided between the provider apparatus 11 and the subscriber apparatus 12a~12n and equipped with an ATM switch and the like.

The provider apparatus 11 in FIG. 2 includes means 11b-1 for measuring amount of additional-service cells, means 11b-2 for generating charge metering cells commensurate with the amount of additional-service cells, cell sending/receiving means 11b-3 for transmitting the charge metering cells and receiving charge notification cells, and means 11b-4 for storing the charge in regard to every subscriber apparatus. The transmission apparatus 14 includes means 14b-1 for extracting the charge metering cells sent from the provider apparatus 11, means 14b-2 for calculating a charge in regard to each subscriber apparatus based upon the number of charge metering cells received, and means 14b-3 for notifying the provider apparatus 11 of the charge in regard to each subscriber apparatus by a charge notification cell CLn.

The cell-amount measuring means 11b-1 of the provider apparatus 11 measures amount of additional-service cells CLs for each subscriber apparatus, the charge metering cell generating means 11b-2 generates charge metering cells commensurate with amount of additional-service cells, and the cell transmitting/receiving means 11b-3 transmits the additional-service cell CLs and the charge metering cell CLa to the transmission apparatus 14. The cell extracting means 14b-1 of the transmission apparatus 14 extracts the charge metering cells CLa, the charge calculating unit 14b-2 calculates the charge in regard to each subscriber apparatus by measuring the charge per Virtual Connection VC (per subscriber) based upon the charge metering cell CLa, and the means 14b-3 for sending the charge notification cell notifies the provider apparatus 11 and the subscriber apparatus 12a~12n of the charge in regard to each subscriber apparatus by the charge notification cell CLn. In this case, the transmission apparatus 14 notifies the provider apparatus 11 and the subscriber apparatus 12a~12n of the charge by communicating the charge notification cell CLn (a) whenever a connection ends, (b) periodically, (c) on a flat-rate basis or (d) when there is a charge notification request from the provider apparatus 11 or subscriber apparatus 12a~12n.

Further, the provider apparatus 11 meters the additional-service cells per each subscriber apparatus 12a~12n and generates the charge metering cells CLa that are in accordance with the amount of additional service cells, and -the subscriber apparatus 12a~12n extract the charge metering cells and calculate and display the charge regarding the subscriber apparatus based upon the number of charge metering cells received.

The provider apparatus 11 generates and transmits the charge metering cells CLa in accordance with any of the following methods (1) through (4):

(1) The provider apparatus 11 generates the charge metering cell CLa per prescribed flow-rate units of additional-service cells CLs sent from the provider apparatus 11 to the subscriber apparatus 12a~12n.

(2) The provider apparatus 11 generates the charge metering cell CLa per prescribed time during which the provider apparatus 11 supplies the subscriber apparatus 12a~12n with an additional service.

(3) The provider apparatus 11 generates the charge metering cell CLa per connection in which the provider apparatus 11 supplies the subscriber apparatus 12a~12n with an additional service.

(4) In dependence upon the category of additional service which the provider apparatus provides to the subscriber apparatus, the provider apparatus 11 decides in accordance with which of charging by cell flow-rate units, charging by service provision time or charging by connection, charging control is to be performed, generates the charge metering cell CLa and transmits the charge metering cell to the transmission apparatus 14 and the subscriber apparatus 12a~12n.

VC groups can be constructed from a plurality of VCs (subscriber apparatus) and the transmission apparatus 14 can measure the charge for each VC group or can measure the charge for each VP. Alternatively, VP groups can be constructed from a plurality of VPs and the transmission apparatus 14 can measure the charge for each VP group. The transmission apparatus 14 notifies the provider apparatus 11 and subscriber apparatus 12a~12n of the charge. Here VC represents a virtual channel and VP a virtual path.

(c) Overview of third aspect

Figure 3:
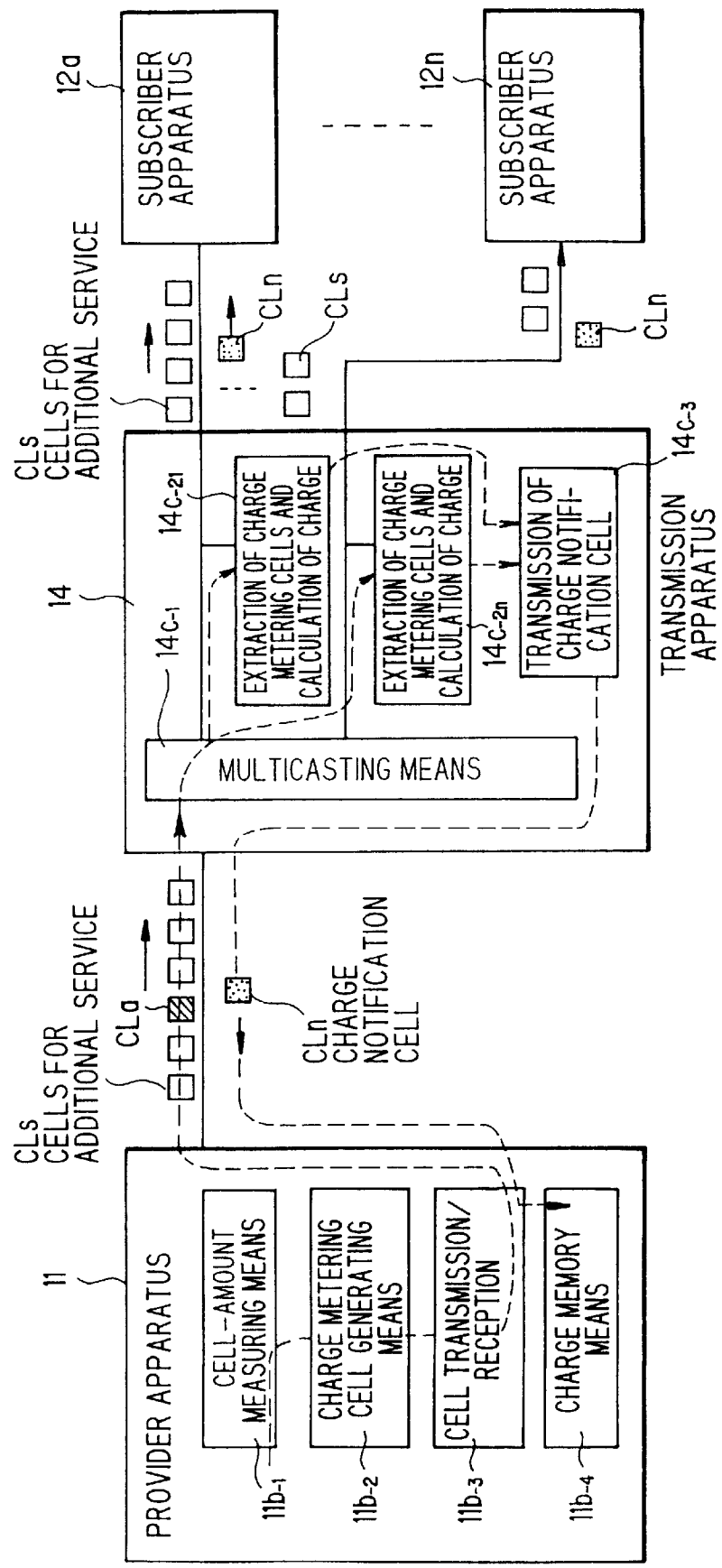
FIG. 3 is a diagram for describing an overview of a third aspect of the present invention.

FIG. 3 is a diagram for describing an overview of a third aspect of the present invention. The system shown in FIG. 3 includes the provider apparatus 11 for providing an additional service by means of ATM cells, the subscriber apparatus 12a~12n for receiving the additional service, and the transmission apparatus 14 provided between the provider apparatus 11 and the subscriber apparatus 12a~12n and equipped with an ATM switch and the like.

The provider apparatus 11 in FIG. 3 includes the means 11b-1 for measuring the amount of additional-service cells, the means 11b-2 for generating the charge metering cells CLa commensurate with amount of additional-service cells, the cell sending/receiving means 11b-3 for transmitting the charge metering cells CLa and the additional-service cells CLs and receiving the charge notification cells, and the means 11b-4 for storing the charge in regard to every subscriber apparatus. The transmission apparatus 14 includes multicasting means 14c-1 for multicasting, to the plurality of subscriber apparatus 12a~12n, the charge metering cells CLa and the additional-service cells CLs sent from the provider apparatus 11, means 14c-21 ~14c-2n for counting the charge metering cells CLa per each subscriber apparatus after multicasting and calculating charge in regard to each subscriber apparatus at multicasting of an additional service, and means 14c-3 for notifying the provider apparatus 11 and subscriber apparatus 12a~12n, by the charge notification cell CLn, of the charge in regard to each subscriber apparatus.

The cell-amount measuring means 11b-1 of the provider apparatus 11 measures the amount of the additional-service cells CLs, the charge metering cell generating means 11b-2 generates charge metering cells commensurate with amount of the additional-service cells, and the cell transmitting/receiving means 11b-3 transmits the additional-service cells CLs and the charge metering cells CLa to the transmission apparatus 14. The multicasting means 14c-1 of the transmission apparatus 14 multicasts, to the plurality of subscriber apparatus 12a~12n, the charge metering cells CLa and the additional-service cells CLs, the means 14c-21~14c-2n for extracting the charge metering cells and calculating the charge extract the charge metering cell CLa per each subscriber apparatus after multicasting and calculates the charge in regard to each subscriber apparatus at multicasting of the additional service, and the means 14c-3 for sending the charge notification cell notifies the provider apparatus 11 and subscriber apparatus 12a~12n, by the charge notification cell CLn, of the charge in regard to each subscriber apparatus.

In this case the transmission apparatus 14 notifies the provider apparatus 11 and the subscriber apparatus 12a~12n of the charge by communicating the charge notification cell CLn (a) whenever a connection ends, (b) periodically, (c) on a flat-rate basis or (d) when there is a charge notification request from the provider apparatus 11 or subscriber apparatus 12a~12n.

(B) First Embodiment (a) Overall Configuration

Figure 4:
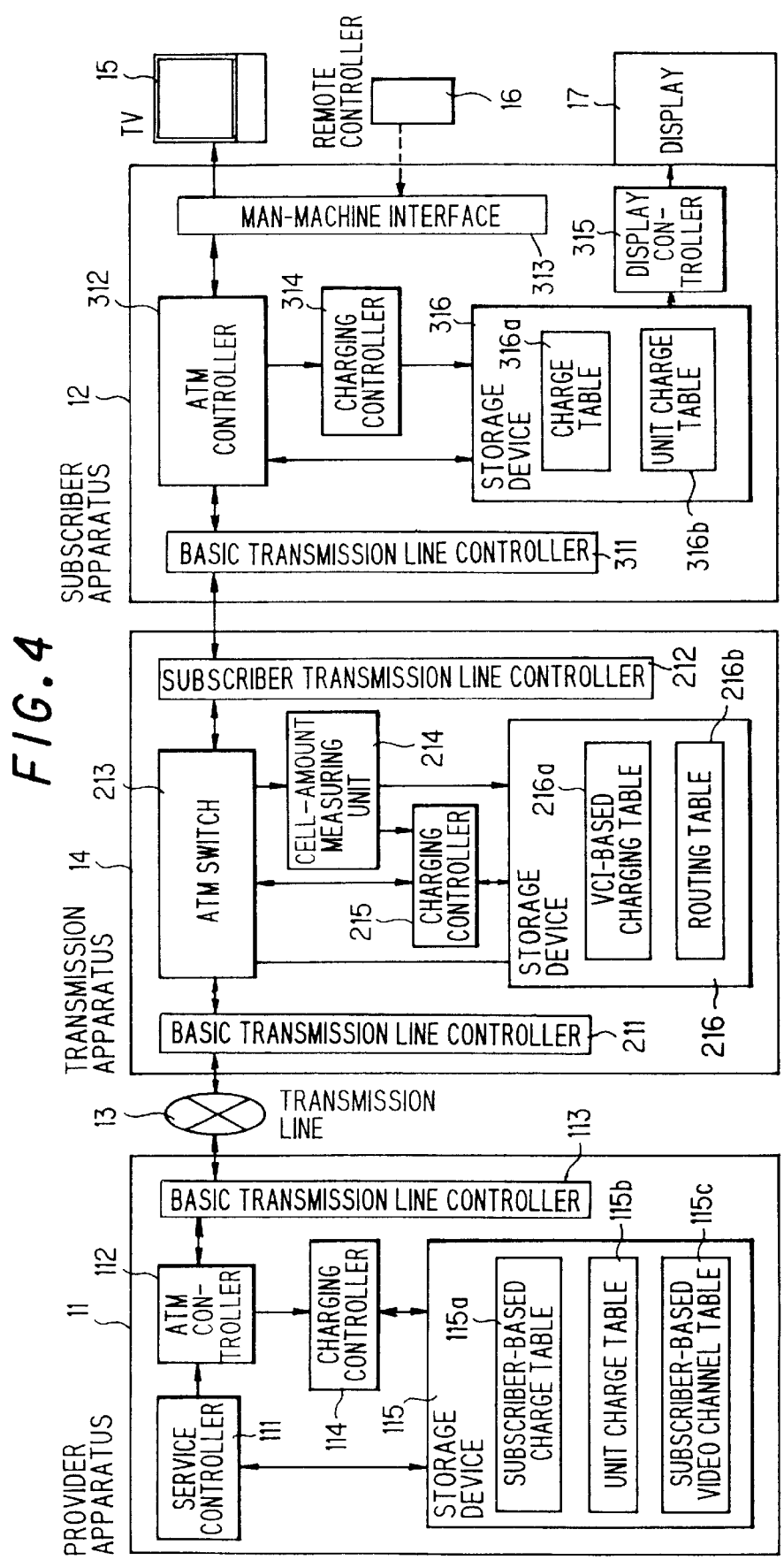
FIG. 4 is a block diagram illustrating an additional-service communication system according to a first embodiment of the present invention.

FIG. 4 is a block diagram illustrating an additional-service communication system according to a first embodiment of the present invention. As shown in FIG. 4, the system includes the provider apparatus 11 for providing a VOD service by means of ATM cells, a subscriber apparatus 12 for receiving this additional service, the transmission apparatus 14 provided between the provider apparatus 11 and the subscriber apparatus 12 and equipped with an ATM switch and the like, a TV (television) 15 for televising video supplied from the provider apparatus 11, a remote controller 16 for performing a variety of operations, i.e., for selecting, starting, switching and ending the VOD service, and a display unit 17 for displaying the charge for this service. Though only one subscriber apparatus 12 is illustrated, in actuality a plurality of subscriber apparatus would be connected to the transmission apparatus 14.

In the first embodiment, the transmission apparatus 14 is provided between the provider apparatus 11 and subscriber apparatus 12. The transmission apparatus 14 measures the amount of additional-service cells in regard to each subscriber apparatus, generates charge metering cells commensurate with the amount of cell usage and transmits the charge metering cells to the provider apparatus 11 and subscriber apparatus 12 via the transmission line 13. The provider apparatus 11 and subscriber apparatus 12 obtain the charge, which is to be paid by each subscriber, based upon the charge metering cells sent from the transmission apparatus 14.

The provider apparatus 11 includes a service controller 111 for communicating with the transmission apparatus 14 and subscriber apparatus 12 and controlling the provision of the VOD service, an ATM controller 112 for converting a video/control signal to ATM cells and converting ATM cells to a control signal, a basic transmission line controller 113 for converting ATM cells to a transmission signal, transmitting the signal over the transmission line 13 and converting a transmission signal received from the transmission line to ATM cells, a charging controller 114 for controlling various charge metering cells received by the provider apparatus, and a storage device 115 for registering various information regarding the provider apparatus. The storage device 115 has a charging table 115a for registering charge on a per-subscriber basis, a unit charge table 115b in which charge per charge metering cell is registered in advance, and a subscriber-based video channel table 115c.

The transmission apparatus 14 includes a basic transmission line controller 211 for converting a transmission signal received from the transmission line 13 to ATM cells and converting ATM cells to a transmission signal and transmitting the signal over the transmission line 13, a subscriber transmission line controller 212 for converting a transmission signal received from the subscriber apparatus 12 to ATM cells and converting ATM cells to a transmission signal and transmitting the signal to the subscriber apparatus, and an ATM switch 213 provided between the basic transmission line controller 211 and the subscriber transmission line controller 212 for routing the ATM cells to a prescribed path.

The transmission apparatus 14 further includes a cell-amount measuring unit 214 for measuring cell flow rate, in accordance with a VCI attached to cells, after routing has been performed in the ATM switch 213 to transmit an ATM cell received from the basic transmission line controller 211 to the subscriber transmission line controller 212, a charging controller 215 for controlling generation of various charge metering cells and insertion of the charge metering cells in the ATM switch 213, and a storage device 216 for registering various information concerning the transmission apparatus 14. The storage device 216 has a VCI-based charging table 216a for registering charging method and unit usage for a video source provided by the provider apparatus 11 (one charge metering cell is generated per unit usage), and a routing table 216b for converting the VPI/VCI of an input ATM cell to the VPI/VCI of an output ATM cell.

The subscriber apparatus 12 includes a subscriber transmission line controller 311 for converting a transmission signal received from the transmission apparatus 14 to ATM cells and converting ATM cells to a transmission signal, an ATM controller 312 for converting ATM cells to a video/ control signal and converting a control signal to ATM cells, a man-machine interface 313 for transmitting a video signal to the TV 15 and converting a VOD selection request from the remote controller 16 to a control signal, a charging controller 314 for calculating charge based upon charge metering cells, and a display controller 315 for displaying a charge, which has been calculated by the subscriber apparatus, on the display unit 17 attached to the subscriber apparatus. The display controller 315 has a charge table 316a for registering the charge to be paid by the subscriber apparatus, and a unit charge table 316b in which charge per charge metering cell is registered in advance.

(b) Various tables (b-1) VCI-based charging table

Figure 5:
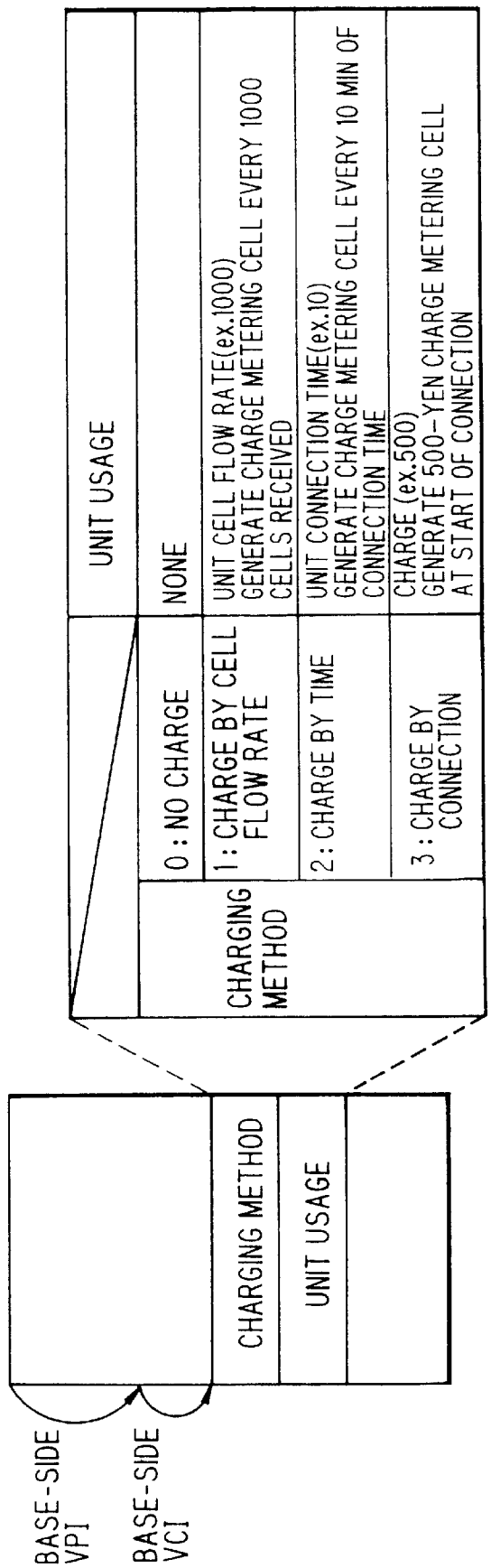
FIG. 5 is a diagram showing the content of a VCI-based charging table constituting a charging database in a transmission apparatus.

FIG. 5 is a diagram showing the content of the VCI-based charging table 216a in the transmission apparatus 14. The table is so constructed that charging method and unit usage in accordance with the VPI/VCI can be extracted from the table by indexing the table according to the base-side VPI/VCI of the video source provided by the provider apparatus 11. Methods of charging include (1) collecting no charge, (2) charging by cell flow rate, (3) charging by service provision time and (4) charging by connection. The unit usage for generating one charge metering cell is stipulated in conformity with the charging method. The stipulations in the table of FIG. 5 are such that one charge metering cell is generated whenever 1000 cells are received in the method of charging by cell flow rate, one charge metering cell is generated every ten minutes in the method of charging by service provision time, and a 500-yen charge metering cell is generated whenever a connection starts in the method of charging by connection.

The charging controller 215 in the transmission apparatus 14 refers to the VCI-based charging table 216a, obtains the charging method and unit usage of the video source provided by the provider apparatus 11 and generates the charge metering cells CLa based upon the charging method and unit usage. It should be noted that the video source and base-side VPI/VCI are fixed at 1:1.

(b-2) Routing table

Figures 6, 7, 8:
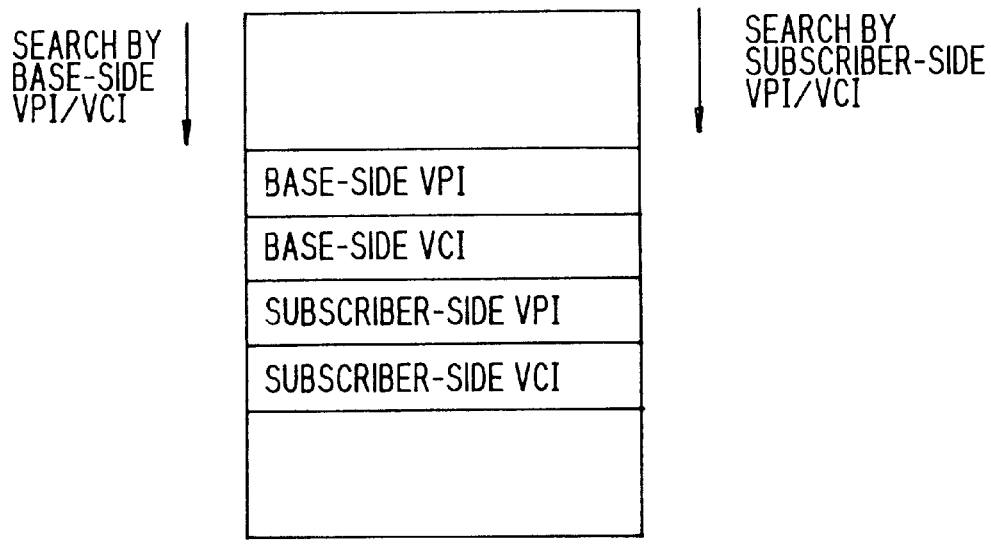
FIG. 6 is a diagram showing the content of a routing table in the transmission apparatus.
FIG. 7 is a diagram showing the content of unit charge table in a provider apparatus and subscriber apparatus.
FIG. 8 is a diagram showing the content of a charge table for storing charge in a subscriber apparatus.

FIG. 6 is a diagram showing the content of the routing table 216b that manages the cell routing information in the transmission apparatus 14. The subscriber-side VPI/VCI can be extracted by performing a search using the base-side VPI/VCI, and the base-side VPI/VCI can be extracted by performing a search using the subscriber-side VPI/VCI.

(b-3) Unit charge table

FIG. 7 is a diagram showing the content of the unit charge tables 115b, 316b for registering the unit charge necessary to calculate the charge in the provider apparatus 11 and subscriber apparatus 12. The unit charge indicates the charge per charge metering cell. In FIG. 7 the charge indicates ten yen per charge metering cell.

(b-4) Charge table

FIG. 8 is a diagram showing the content of the charge table 316a for storing charge in the subscriber apparatus 12. Whenever the charge metering cell CLa is received, the subscriber apparatus 12 reads out the up-to-the-moment total charge that has been stored in the charge table 316a and adds the unit charge to this total unit charge to update the total unit charge.

(b-5) Subscriber-based charge table

Figure 9:
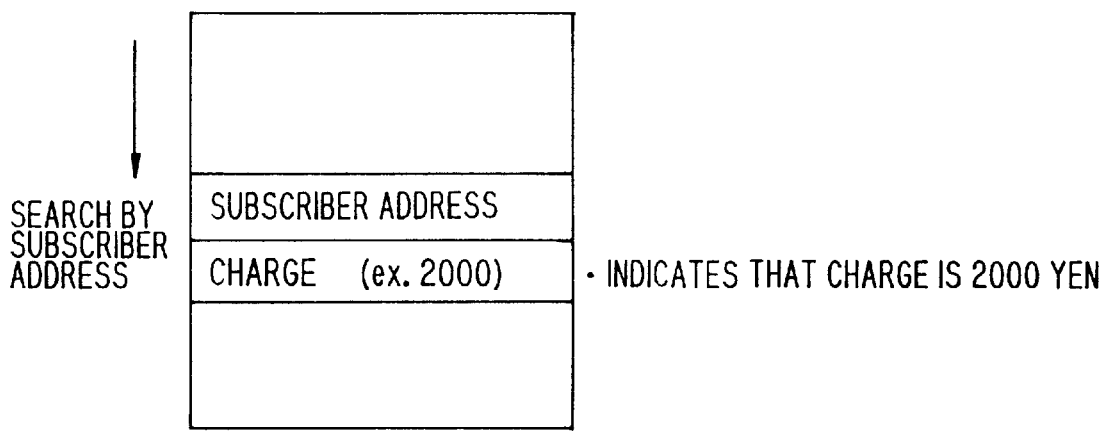
FIG. 9 is a diagram illustrating the content of a subscriber-based charge table in the provider apparatus.

FIG. 9 is a diagram illustrating the content of the subscriber-based charge table 115a provided in the provider apparatus 11 for storing charge on a per-subscriber basis.

The charging controller 114 obtains a charge area conforming to a subscriber address by using the table 115a, adds the unit charge to a charge, which has been stored in this area, whenever the charge metering cell is received, calculates the total charge for each subscriber and stores this value.

(b-6) Subscriber-based video channel table

Figure 10:
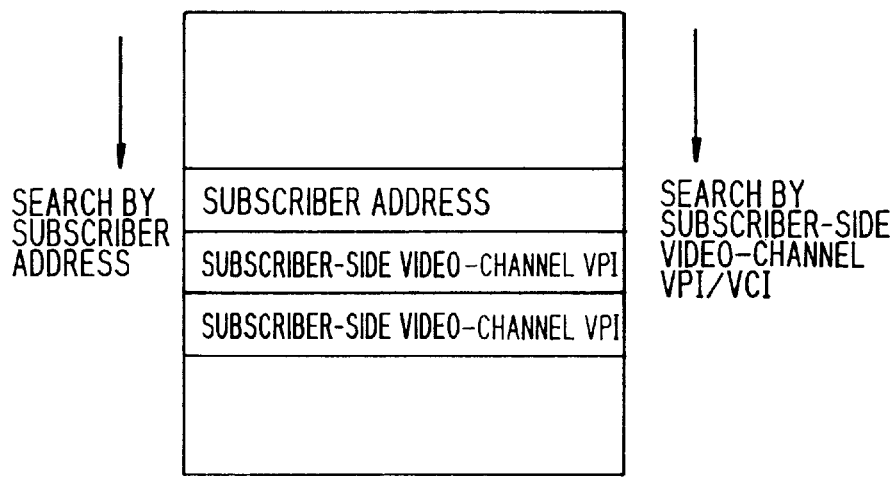
FIG. 10 is a diagram illustrating the content of a subscriber-based video channel table in the provider apparatus.

FIG. 10 is a diagram illustrating the content of a subscriber-based video channel table 115c for managing a video channel on per-subscriber basis. By performing a search based upon a subscriber address from the table, the VPI/VCI values of the subscriber-side video channel allocated in fixed fashion on a per-subscriber basis can be extracted. Further, a subscriber address can be extracted from the VPI/VCI values of the subscriber-side video channel.

(c) Cell format

An ATM cell is composed of a fixed-length block of 53 bytes of which five bytes constitute a header and 48 bytes an information field (also referred to as a "payload"). The header includes a generic flow control (GFC) used in flow control between links, a virtual channel identifier (VCI) for call identifying purposes in order that the destination of the cell will be understood even after data is broken down into blocks, a virtual path identifier (VPI) that identifies a path, payload type identification (PTI), cell-loss priority (CLP) and a header error control (HEC) code, which is a code for correcting errors in the header. OAM cell type and OAM function type are inserted into the first byte of the information field (payload).

Figure 11:
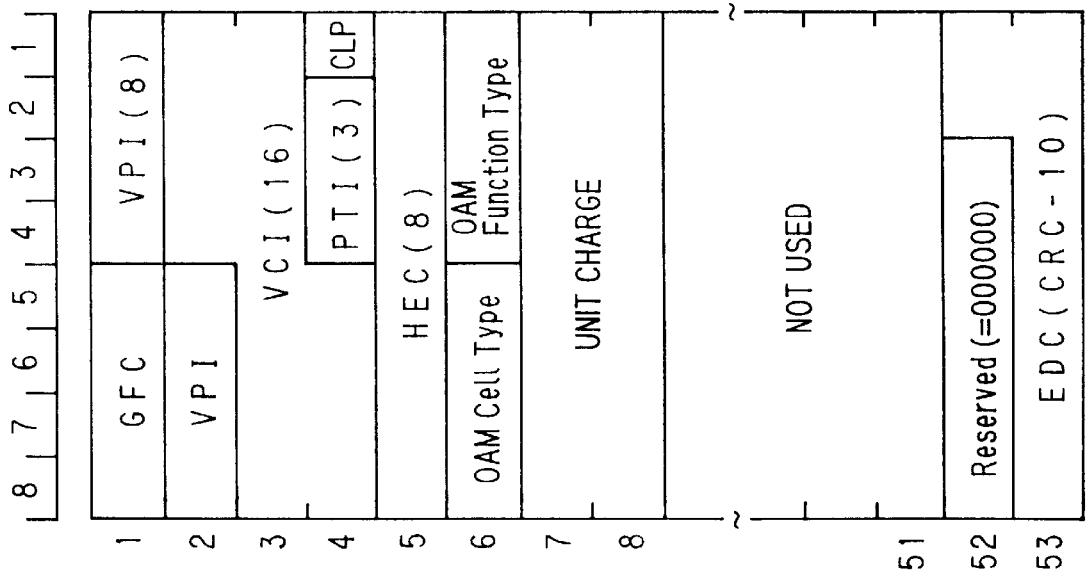
FIG. 11 shows the format of a charging cell (unit-charge notification cell)

FIG. 11 shows the format of a unit-charge notification cell by which the provider apparatus 11 notifies each subscriber apparatus 12 of the unit charge. That the cell is a charging cell is indicated by the OAM cell type (1001), and the fact that this is notification of the unit charge is indicated by the OAM function type (0001).

FIG. 12 shows the format of a unit-charge reception-completed notification cell by which the subscriber apparatus 12 notifies the provider apparatus 11 of the fact that reception of the unit-charge notification cell has been completed. That the cell is a charging cell is indicated by the OAM cell type (1001), and the fact that this is notification of completion of reception of the unit charge is indicated by the OAM function type (0010).

FIG. 13 shows the format of a charging database notification cell by which the provider apparatus 11 notifies the transmission apparatus 14 of the charging database. That the cell is a charging cell is indicated by the OAM cell type (1001), and the fact that this is for giving notification of the charging database is indicated by the 0AM function type (0011). Charge data of a maximum of seven items of video information (video sources) can be communicated by this charging database notification cell. The charge data include (1) the base-side VPI of the video information (video source), (2) the base-side VCI of the video information, (3) the charging method of the video information, and (4) the unit usage of the video information. The transmission apparatus 14 creates the VCI-based charging table 216a (FIG. 5) based upon the charging database notification cell and stores the table in the storage device 216.

Figure 14:
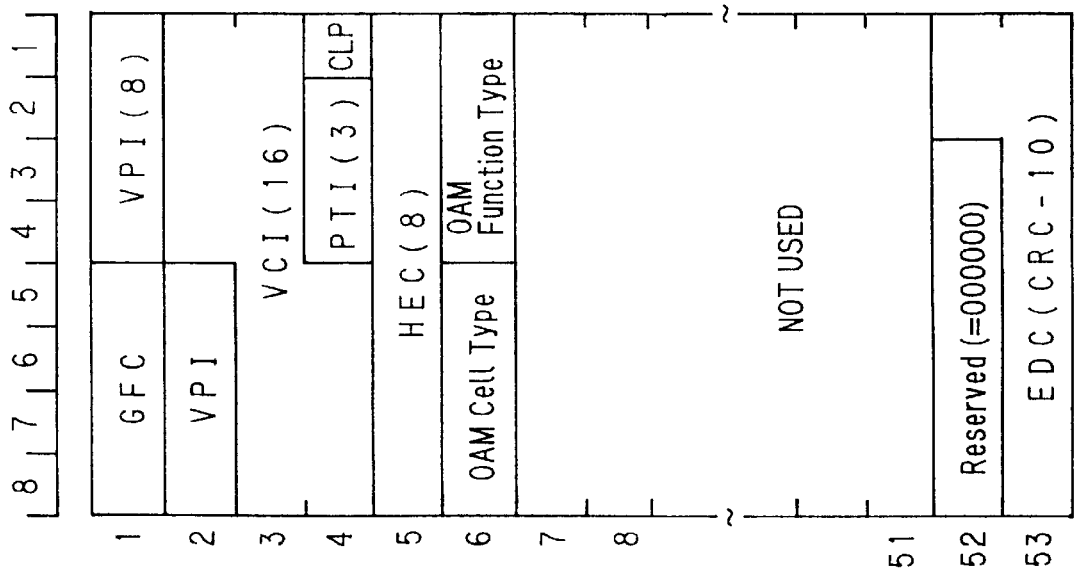
FIG. 14 shows the format of a charging cell (charging database registration-completed cell)

FIG. 14 shows the format of a charging database registration-completed cell by which the transmission apparatus 14 notifies the provider apparatus 11 of the fact that reception of the charging database notification cell has been completed. That the cell is a charging cell is indicated by the OAM cell type (1001), and the fact that this is notification of completion of registration of the charging database is indicated by the OAM function type (0100).

FIG. 15 shows he format of a charge metering cell sent from the transmission apparatus 14 to the provider apparatus 11 whenever a unit cell flow rate is received. That the cell is a charging cell is indicated by the OAM cell type (1001), and that this is a charge metering cell is indicated by the OAM function type (0101). Further, (1) the charge, (2) the subscriber-side video channel VPI and (3) the subscriber-side video channel VCI are sent by the payload of this charge metering cell.

When the charging controller 114 of the provider apparatus 11 receives a charge metering cell, the charging controller 114 refers to the subscriber-based video channel table 115c (FIG. 10) to obtain the subscriber address conforming to the subscriber-side video channel VPI/VCI, then refers to the subscriber-based charge table 115a (FIG. 9) to read out the charge corresponding to this subscriber address and add the unit charge to this charge.

Figure 16:
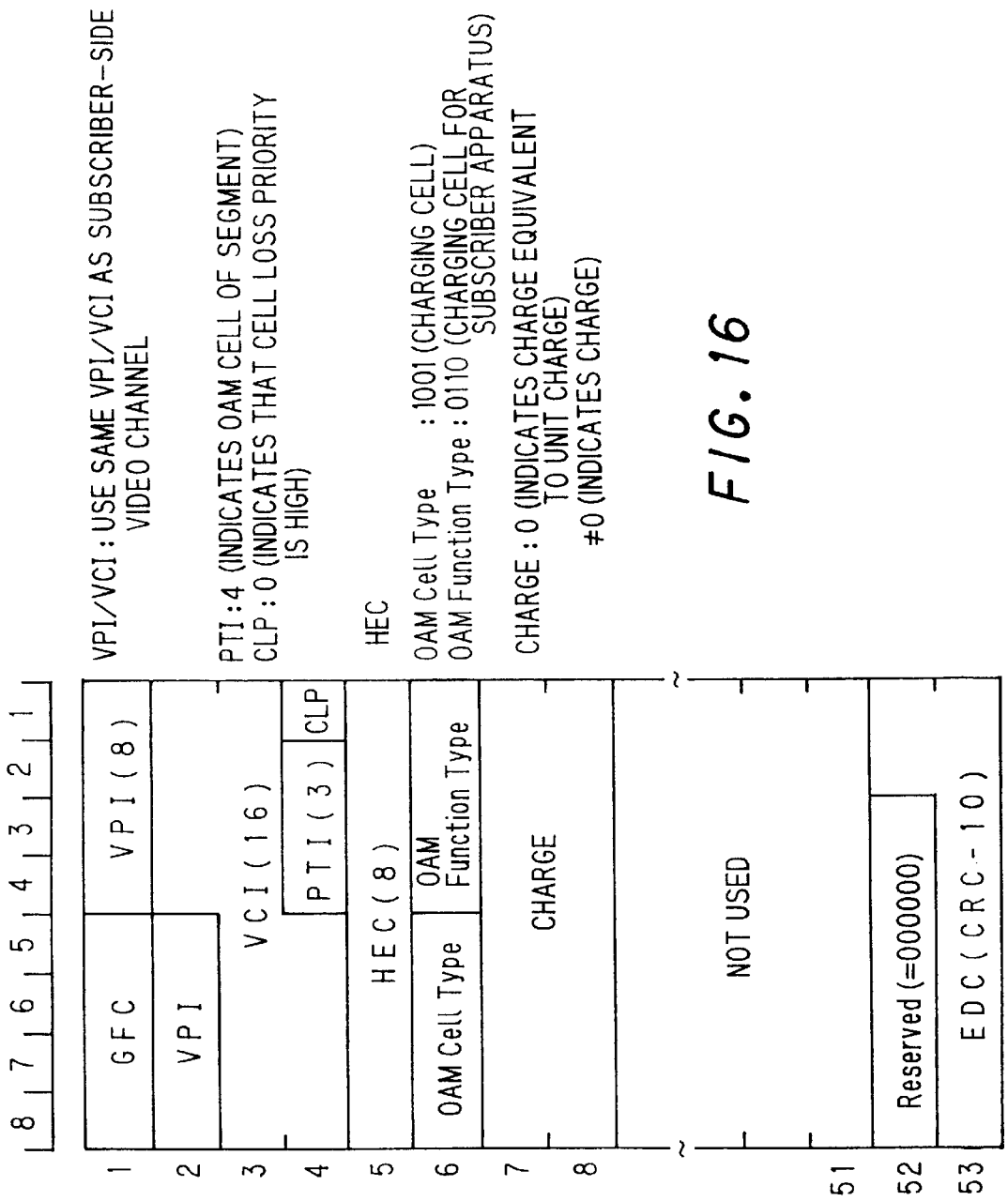
FIG. 16 shows the format of a charging cell (charge metering cell to subscriber apparatus)

FIG. 16 shows the format of a charge metering cell sent from the transmission apparatus 14 to the provider apparatus 12 whenever a unit cell flow rate is received. That the cell is a charging cell is indicated by the OAM cell type (1001), and that this is a charge metering cell for the subscriber apparatus is indicated by the OAM function type (0110).

(d) Processing for registration of unit charge

Figure 17:
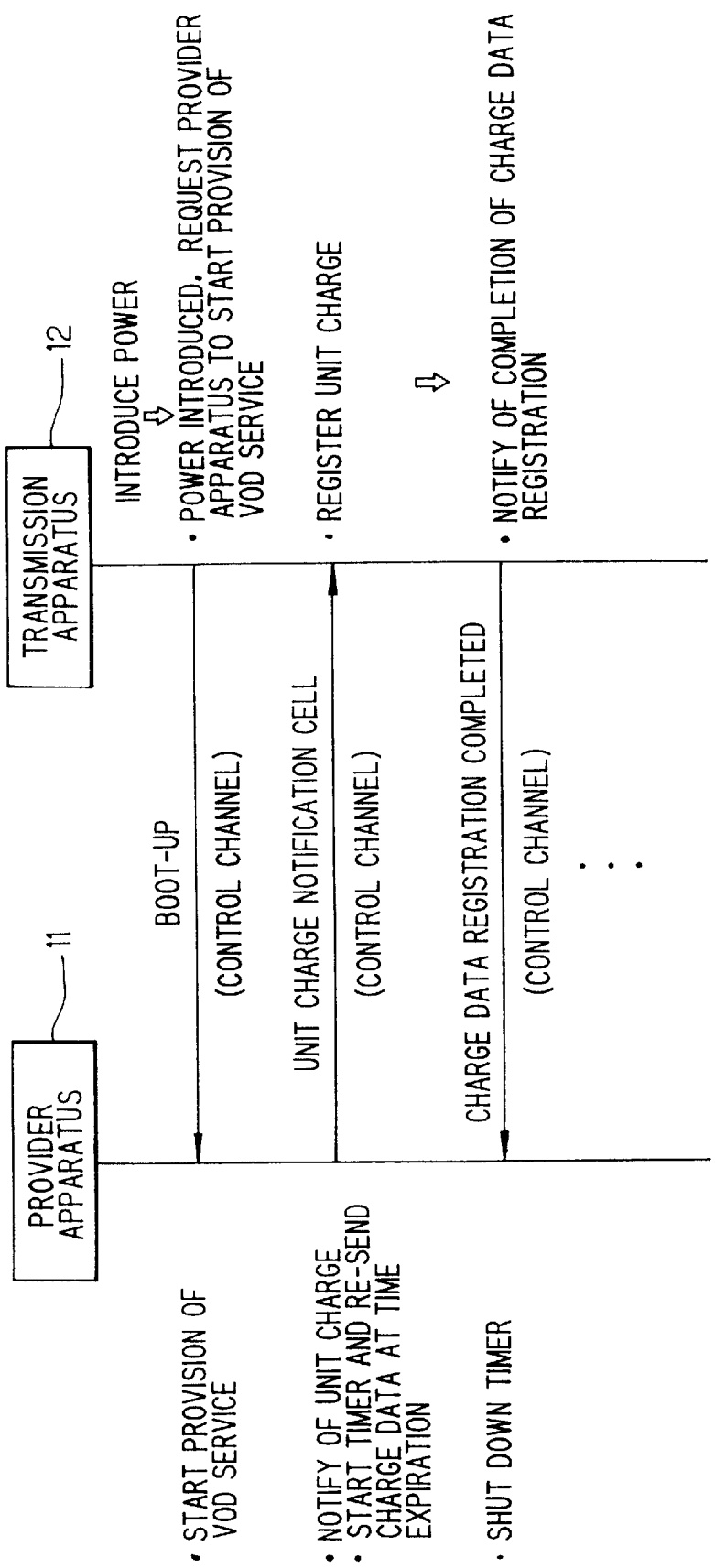
FIG. 17 is a sequence diagram showing the sequence for registering unit charge.
Figure 18:
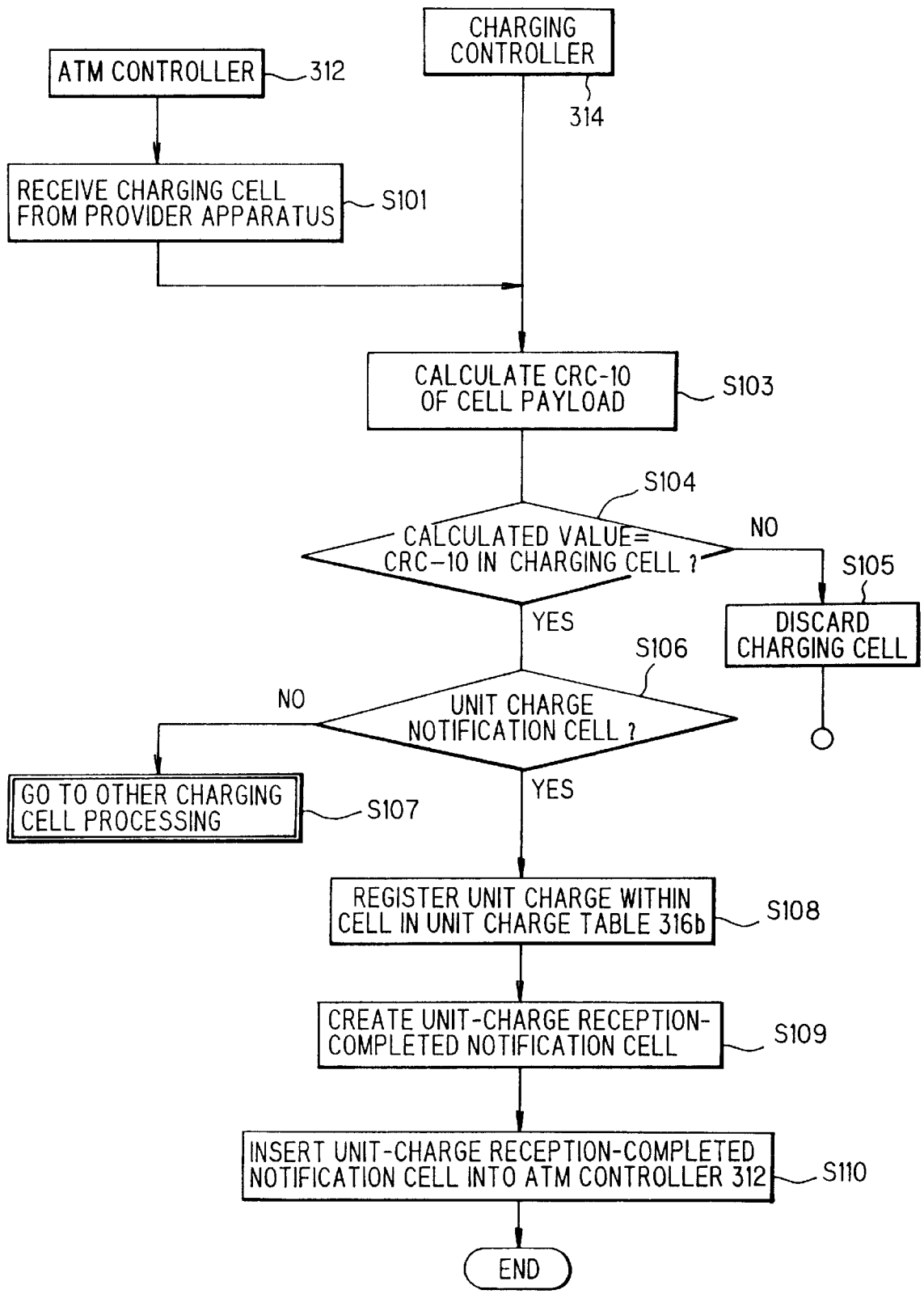
FIG. 18 is a flowchart of processing for setting unit charge.

FIG. 17 is a sequence diagram showing the sequence for registering in the subscriber apparatus 12 from the provider apparatus 11, and FIG. 18 is a flowchart of processing for registering unit charge in the subscriber apparatus.

When power is introduced to the subscriber apparatus 12, the latter uses a control channel between itself and the provider apparatus 11 to send a boot-up signal to the provider apparatus 11 and request the start of provision of the VOD service.

Upon receiving the boot-up signal, the provider apparatus 11 uses the control channel to notify the subscriber apparatus 12, by way of the unit charge notification cell (FIG. 11), of the unit charge per charging cell.

Thenceforth, upon receiving the charging cell (whether this cell is the unit charge notification cell is unknown) via the ATM controller 312 (step S101), the charging controller 314 of the subscriber apparatus 12 calculates the CRC of the cell payload (step 103) and determines whether the charge coincides with the CRC in the charging cell (step S104). If the two do not match, the charging controller 314 discards the charging cell (step S105) and waits for reception of the unit charge notification cell, which is sent again. If matching is achieved, however, the charging controller 314 refers to the OAM cell type and OAM function type that have been inserted into the first byte of the payload and determines whether the received cell is the unit charge notification cell (step S106). If the cell is not the unit charge notification cell, other charging cell processing is executed (step S107).

If the cell is the unit charge notification cell, then the charging controller 314 registers the received unit charge in the unit charge table 316b (step S108). Upon completion of registration, the charging controller 314 generates the unit-charge reception-completed notification cell (FIG. 12) (step S109) and enters the cell into the ATM controller 312 to notify the provider apparatus 11 (step S110).

The provider apparatus 11 starts a timer after the transmission of the unit charge notification cell. If the unit-charge reception-completed notification cell is not received upon elapse of a predetermined period of time, the unit charge notification cell is sent again. If the unit-charge reception-completed notification cell is received within the predetermined time, the timer is shut down.

(e) Registration of charging database

Figure 19:
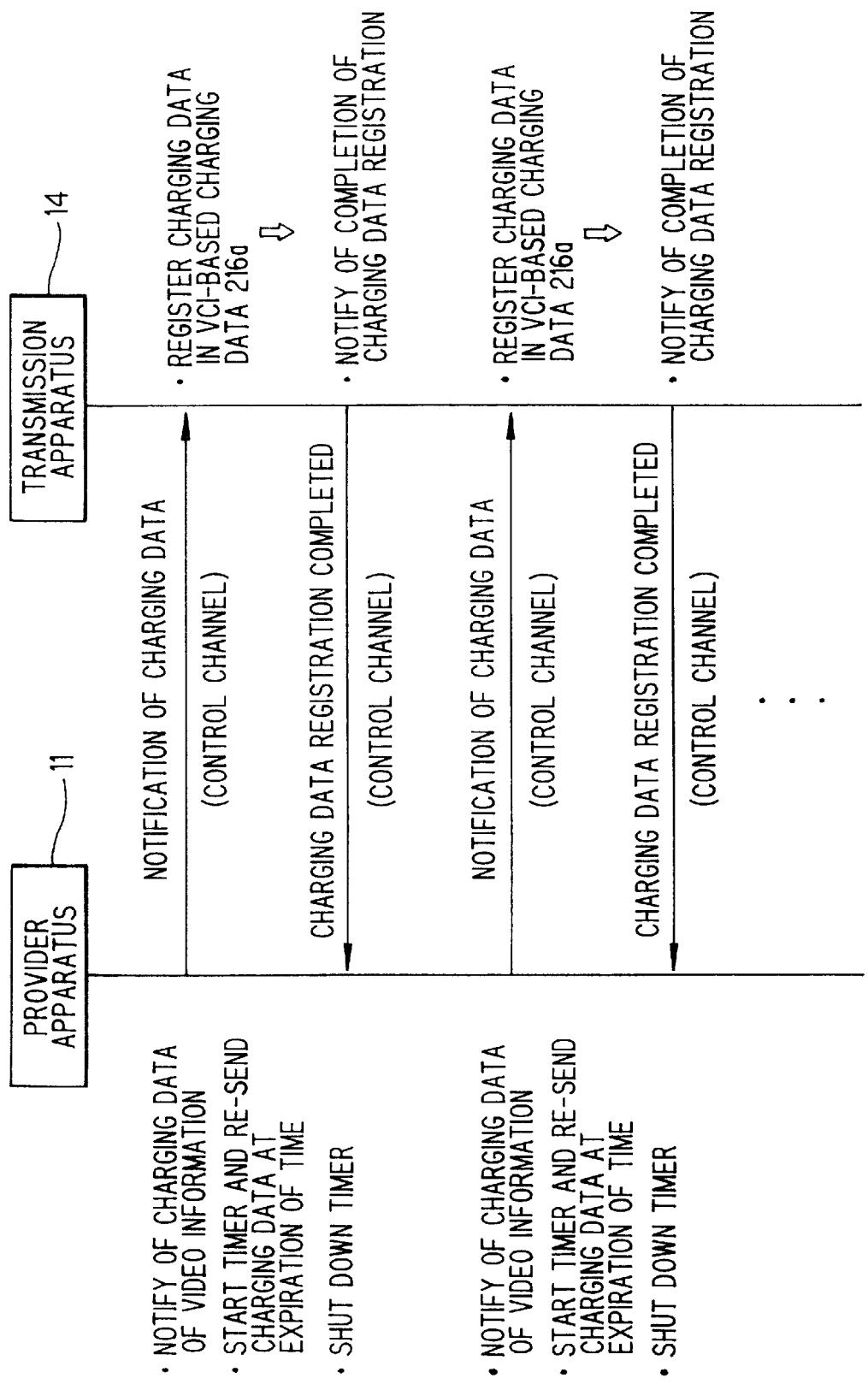
FIG. 19 is a sequence diagram showing the sequence for charging database registration.
Figure 20:
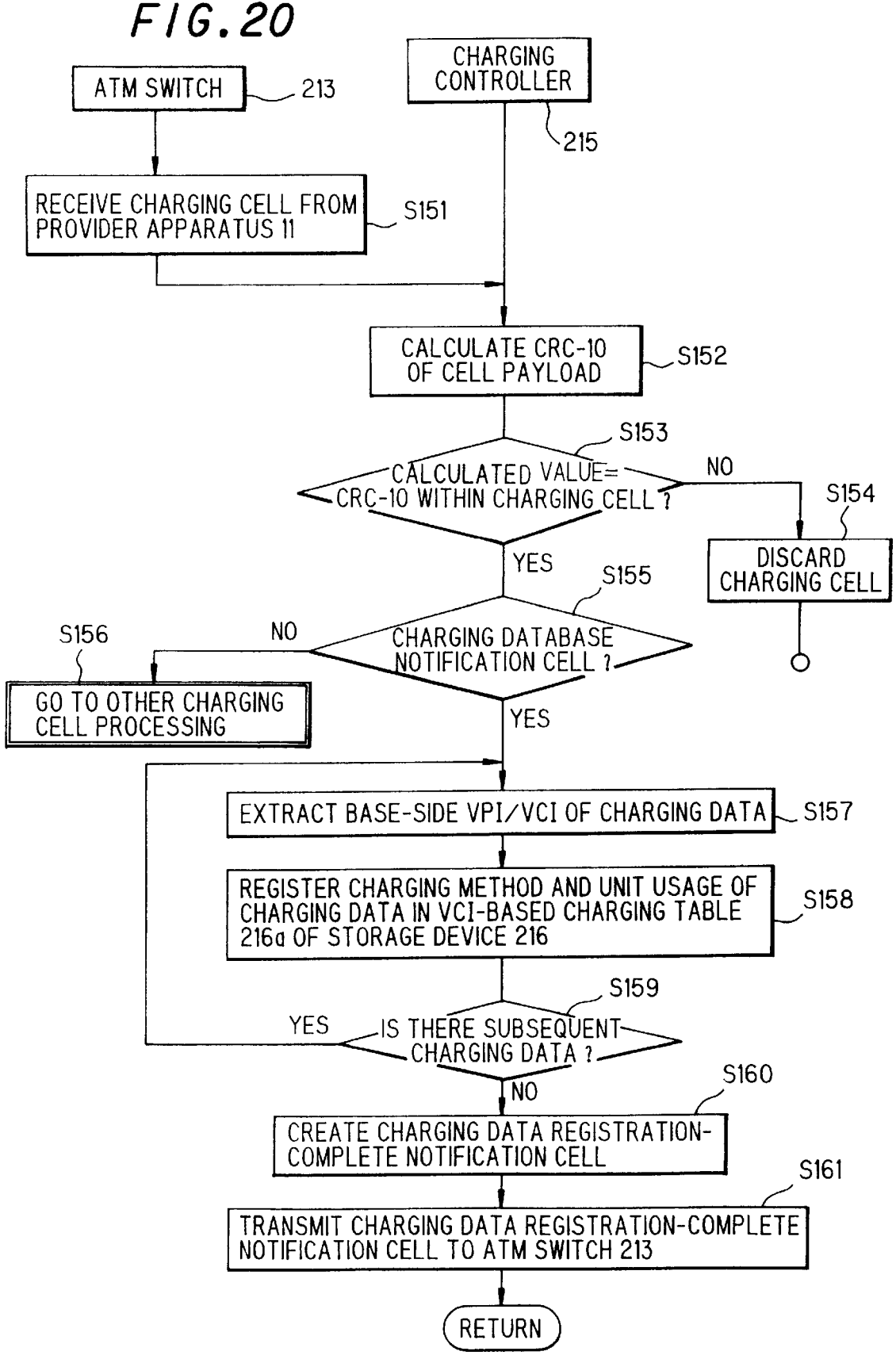
FIG. 20 is a flowchart of processing for setting a charging database.

FIG. 19 is a diagram for describing the sequence for charging database registration from the provider apparatus 11 to the transmission apparatus 14, and FIG. 20 is a flowchart of processing for describing the processing for charging database registration in the transmission apparatus 14.

The provider apparatus 11 uses the control channel between itself and the transmission apparatus 14 to send the transmission apparatus 14 the charging database notification cell (FIG. 13) to give notification of the charge data of each item of video information provided by the provider apparatus 11. The provider apparatus 11 starts a timer after the charging database notification cell. If the charging database registration-completed cell (FIG. 14) is not received upon elapse of a predetermined period of time, the charging database notification cell is sent again. If the charging database registration-completed cell is received within the predetermined time, the timer is shut down.

Upon receiving the charging cell (whether this cell is the charging database notification cell is unknown) via the ATM switch 213 (step S151), the charging controller 215 of the transmission apparatus 14 calculates the CRC of the cell payload (step S152) and determines whether the charge coincides with the CRC in the charging cell (step S153). If the two do not match, the charging controller 215 discards the charging cell (step S154) and waits for reception of the charging database notification cell, which is sent again. If matching is achieved, however, the charging controller 215 refers to the OAM cell type and OAM function type that have been inserted into the first byte of the payload and determines whether the received cell is the charging database notification cell (step S155). If the cell is not the charging database notification cell, other charging cell processing is executed (step S156).

If the cell is the charging database notification cell, then the charging controller 215 extracts the base-side VPI/VCI of the charge data from this cell (step S157) and registers the charge data charging method and the unit usage as a charging database in the VCI-based charging table 216a of the storage device 216 in correspondence with the base-side VPI/VCI (step S158). Since charge data of a maximum of seven items of video information are sent by one charging database notification cell, it is determined whether all charge data have been registered (step S159). If registration has not been completed, the processing from step S157 onward is repeated. If registration has been completed, then the charging database registration-completed cell (FIG. 14) is created (step S160) and entered into the ATM switch 213 to notify the provider apparatus 11 (step S161).

The charging controller 215 then waits for reception of the next charging database notification cell and, if the cell is received, executes the processing from step S151 onward. Furthermore, the provider apparatus 11 repeatedly transmits, by way of the charging database notification cells, the charge data of all video information provided by the provider apparatus.

(f) Generation of charge metering cell

Figure 21:
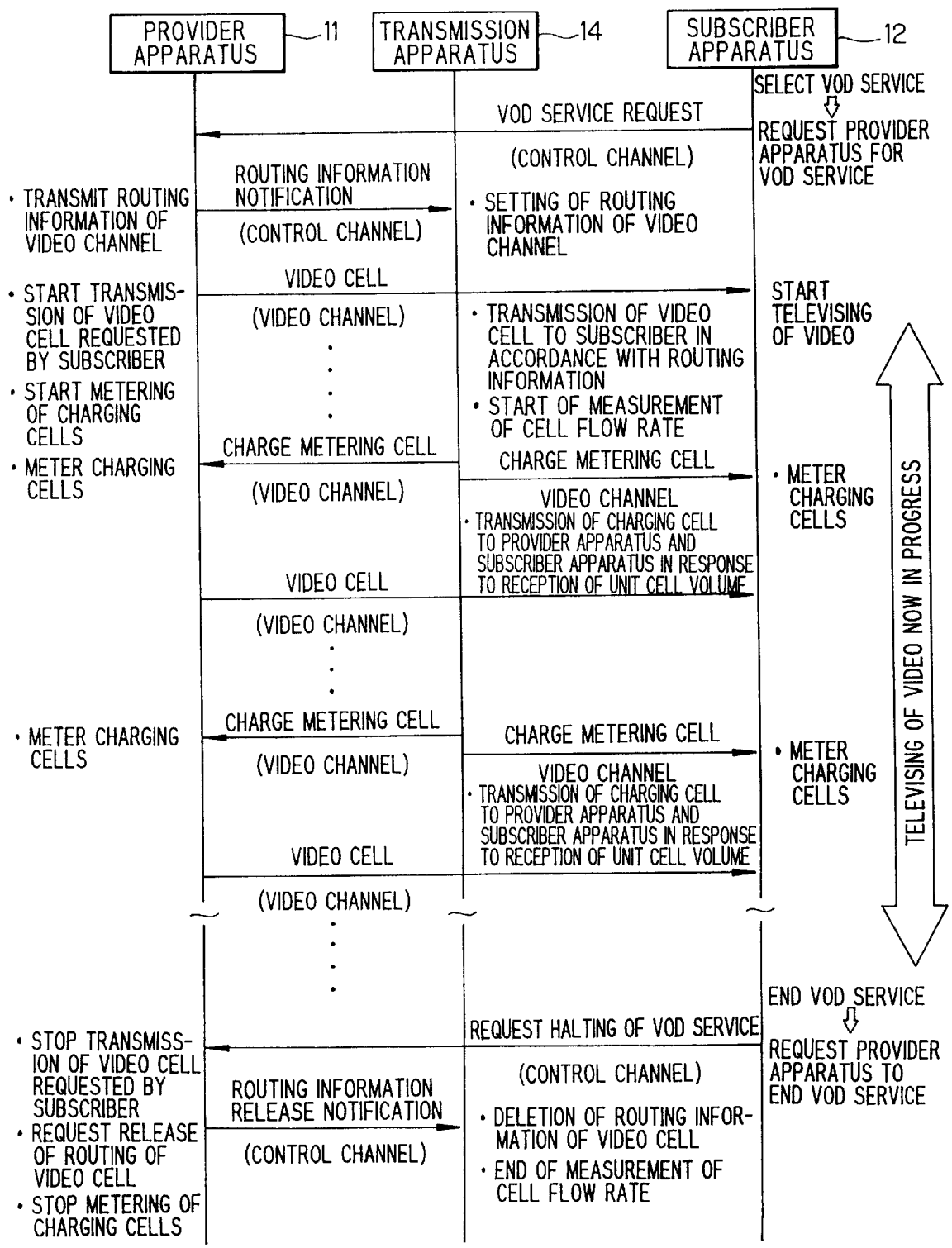
FIG. 21 is a sequence diagram showing the sequence for sending and receiving cells for charge metering.
Figure 22:
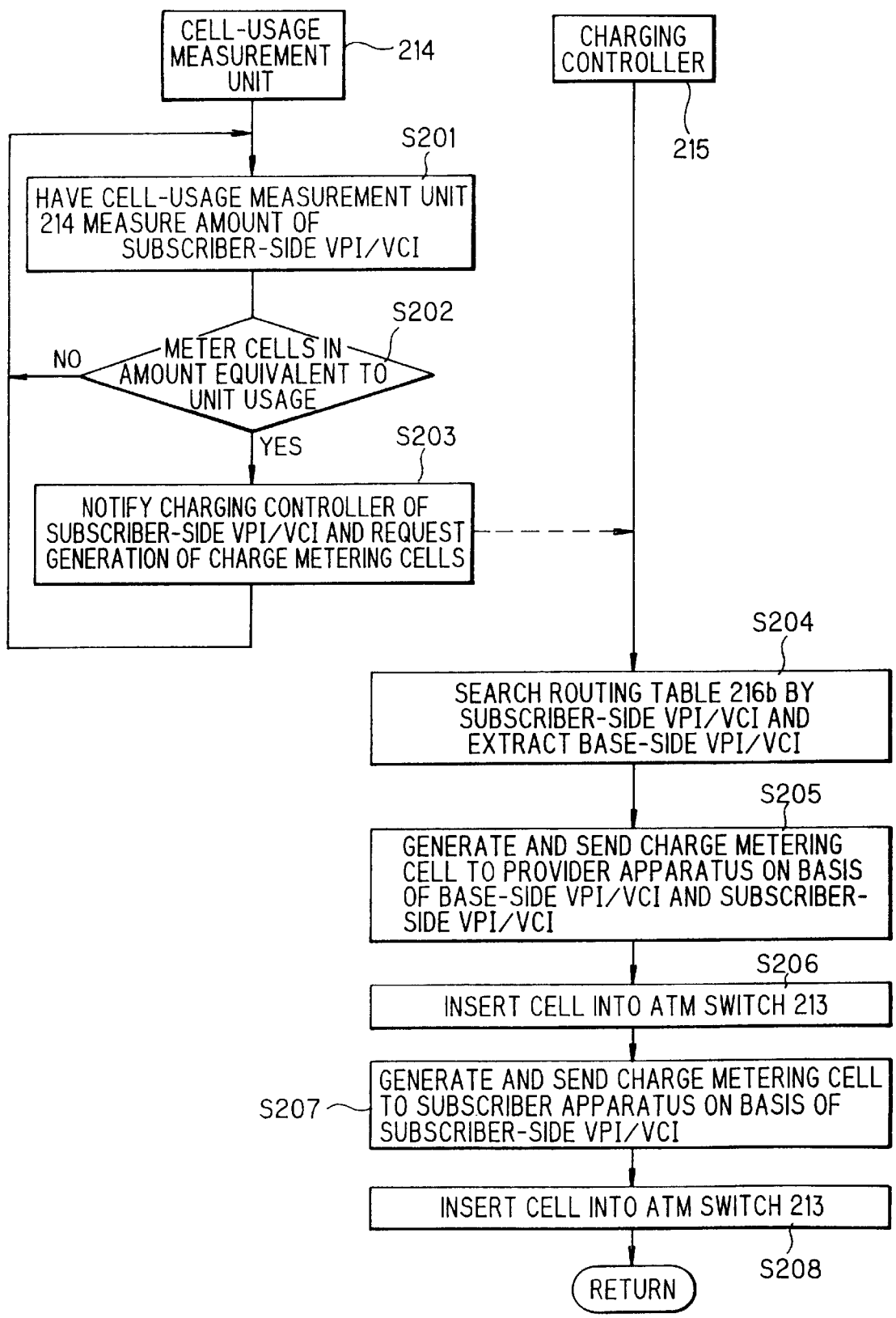
FIG. 22 is a flowchart of processing for generating charge metering cells in a transmission apparatus.

FIG. 21 is a diagram for describing the sequence for sending and receiving the charge metering cells, and FIG. 21 is a flowchart of processing for generating the charge metering cells in the transmission apparatus 14.

If the VOD service is selected by operating the remote controller 16, the subscriber apparatus 12 uses the control channel between itself and the provider apparatus 11 to send the provider apparatus 11 a request (video ID, subscriber address, etc.) for the VOD service via the transmission apparatus 14.

Upon receiving the VOD service request, the provider apparatus 11 refers to the subscriber-based video channel table 115c (FIG. 10) to obtain the subscriber-side VPI,/VCI, obtains the base-side VPI/VCI conforming to the video ID and creates routing information. Next, the provider apparatus 11 uses the control channel between itself and the transmission apparatus 14 to transmit the routing information to the transmission apparatus 14 accommodating the subscriber apparatus 12 and decides the path between the provider apparatus 11 and the subscriber apparatus 12. The routing information includes the corresponding relationship between the base-side VPI/VCI and subscriber-side VPI/VCI, and the transmission apparatus 14 stores this routing information in the routing table 216b (FIG. 6) of the storage device 216.

After the routing information is transmitted, the provider apparatus 11 converts the video-based cell designated by the subscriber apparatus 12 to a transmission signal (transmission frame) and starts transmission via the video channel. The VPI/VCI of the video-based cell is the base-side VPI/VCI.

The basic transmission line controller 211 of the transmission apparatus 14 accommodating the subscriber apparatus 12 executes transmission-frame terminating processing (processing for separating ATM cells from the transmission frame), and the ATM switch 213 refers to the routing table 216b to replace the base-side VPI/VCI of the video cell by subscriber-side VPI/VCI and the performs the routing of this cell. For every subscriber-side VPI,/VCI that has been set in the routing table 216b, the cell-amount measuring unit 214 measures the amount of cell usage commensurate with the charging method that has been registered in the VCI-based charging table 216a (FIG. 5) (step 201).

In a case where the cell flow rate charging method has been registered in the VCI-based charging table 216a as the charging method, the cell-amount measuring unit 214 notifies the charging controller 215 of the subscriber-side VPI/VCI values and requests generation of the charge metering cell whenever cells of an amount corresponding to the unit cell flow rate registered in the VCI-based charging table 216a are measured (steps S202, S203). In a case where the time charging method has been registered in the VCI-based charging table 216a as the charging method, the cell-amount measuring unit 214 notifies the charging controller 215 of the subscriber-side VPI/VCI values and requests generation of the charging cell whenever the prescribed unit connection time registered in the VCI-based charging table 216a elapses. In a case where the connection charging method has been registered in the VCI-based charging table 216a as the charging method, the cell-amount measuring unit 214 notifies the charging controller 215 of the subscriber-side VPI/VCI values and requests generation of the charging cell only when the initial cell of the cells of interest is measured.

The charging controller 215 refers to the routing table 216b using the subscriber-side VPI/VCI values sent from the cell-amount measuring unit 214 and extracts the base-side VPI/VCI from the table (step S204). Next, the charging controller 215 generates the charge metering cell (FIG. 15) (step S205), which is sent to the provider apparatus 11, based upon the base-side VPI/VCI and subscriber-side VPI/VCI and inserts the cell in the ATM switch 213 in such a manner that the cell will be transmitted to the provider apparatus 11 (step S206). As a result, the provider apparatus 11 receives the charging cell from the transmission apparatus 14. If the charge metering cell is received, then, in a manner described later, the charging controller 114 of the provider apparatus 11 refers to the subscriber-based video channel table 115 (FIG. 10) to obtain the subscriber address that conforms to the subscriber-side video-channel VPI/VCI, refers to the subscriber-based charge table 115a (FIG. 9) to read out the charge corresponding to this subscriber address and adds the unit charge to this charge.

Further, the charging controller 215 of the transmission apparatus 14 generates a charge metering cell regarding the subscriber apparatus 12 (step S207) based upon the subscriber-side VPI/VCI values communicated from the cell-amount measuring unit 214 and inserts this charge metering cell into the ATM switch 213 in such a manner that it will be sent to the subscriber apparatus 12 (step S208). As a result, the subscriber apparatus 12 receives the charge metering cell from the transmission apparatus 14. The transmission apparatus 14 updates the subscriber charge and displays the updated charge on the display unit 17 whenever the charge metering cell is received.

The control described above is repeated for as long as video cells are being transmitted from the provider apparatus 11 to the subscriber apparatus 12.

If termination of the VOD service is selected by operating the remote controller 16, the subscriber apparatus 12 uses the control channel between itself and the provider apparatus 11 to send the provider apparatus 11 a VOD service termination request (video ID, subscriber address, etc.) via the transmission apparatus 14. Upon receiving the VOD service termination request, the provider apparatus 11 halts the transmission of the video cells and transmits a routing-information release notification to the transmission apparatus 14 via the control channel. In response to the routing-information release notification, the transmission apparatus 14 deletes the relevant routing information from the routing table 216b.

(g) Charging processing (g-1) Charging processing by provider apparatus

Figure 23:
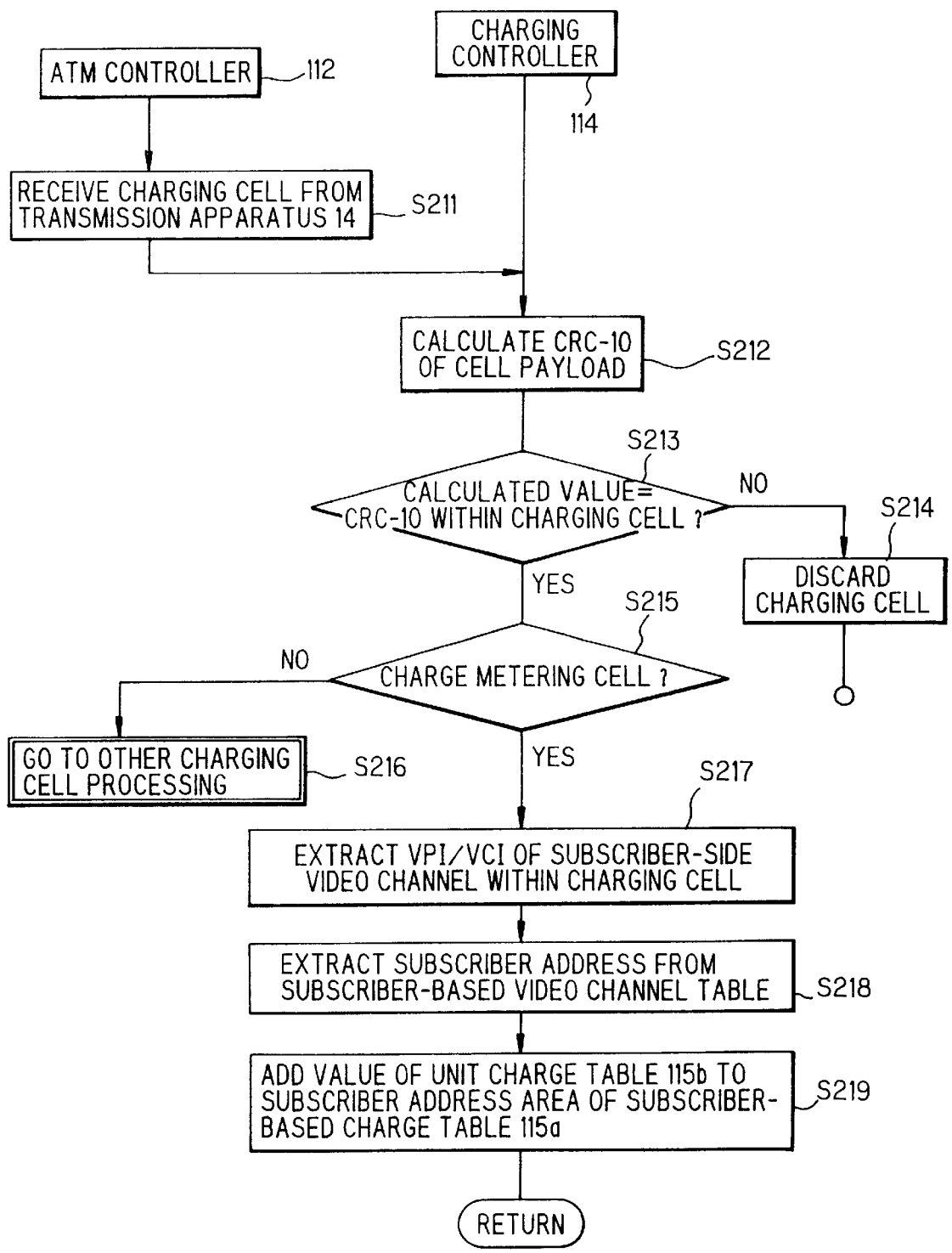
FIG. 23 is a flowchart of processing for metering charge metering cells in a provider apparatus.

FIG. 23 is a flowchart of charging processing executed by the provider apparatus.

Upon receiving the charging cell (whether this cell is the charge metering cell is unknown) via the ATM controller 112 (step S211), the charging controller 114 of the provider apparatus 11 calculates the CRC of the cell payload (step S212) and determines whether the charge coincides with the CRC in the charging cell (step S214). If the two do not match, the charging controller 114 discards the charging cell (step S214). If matching is achieved, however, the charging controller 114 refers to the OAM cell type and OAM function type that have been inserted into the first byte of the payload and determines whether the received cell is the charge metering cell (step S215). If the cell is not the unit charge notification cell, the charging controller 114 executes other charging processing (step S216).

If the cell is the charge metering cell, then the charging controller 114 extracts the subscriber-side video-channel VPI/VCI in the charge metering cell (step S217) and refers to the subscriber-based video channel table 115c (FIG. 10) to obtain the subscriber address corresponding to the subscriber-side video-channel VPI/VCI (step S218). Next, the charging controller 114 refers to the subscriber-based charge table 115a (FIG. 9) to read out the charge corresponding to this subscriber address and adds the unit charge stored in the unit charge table 115b to this charge value, thereby updating the charge (step S219). The charging controller 114 thenceforth repeats the foregoing processing whenever the charge metering cell is received.

(g-2) Charging processing by subscriber apparatus

Figure 24:
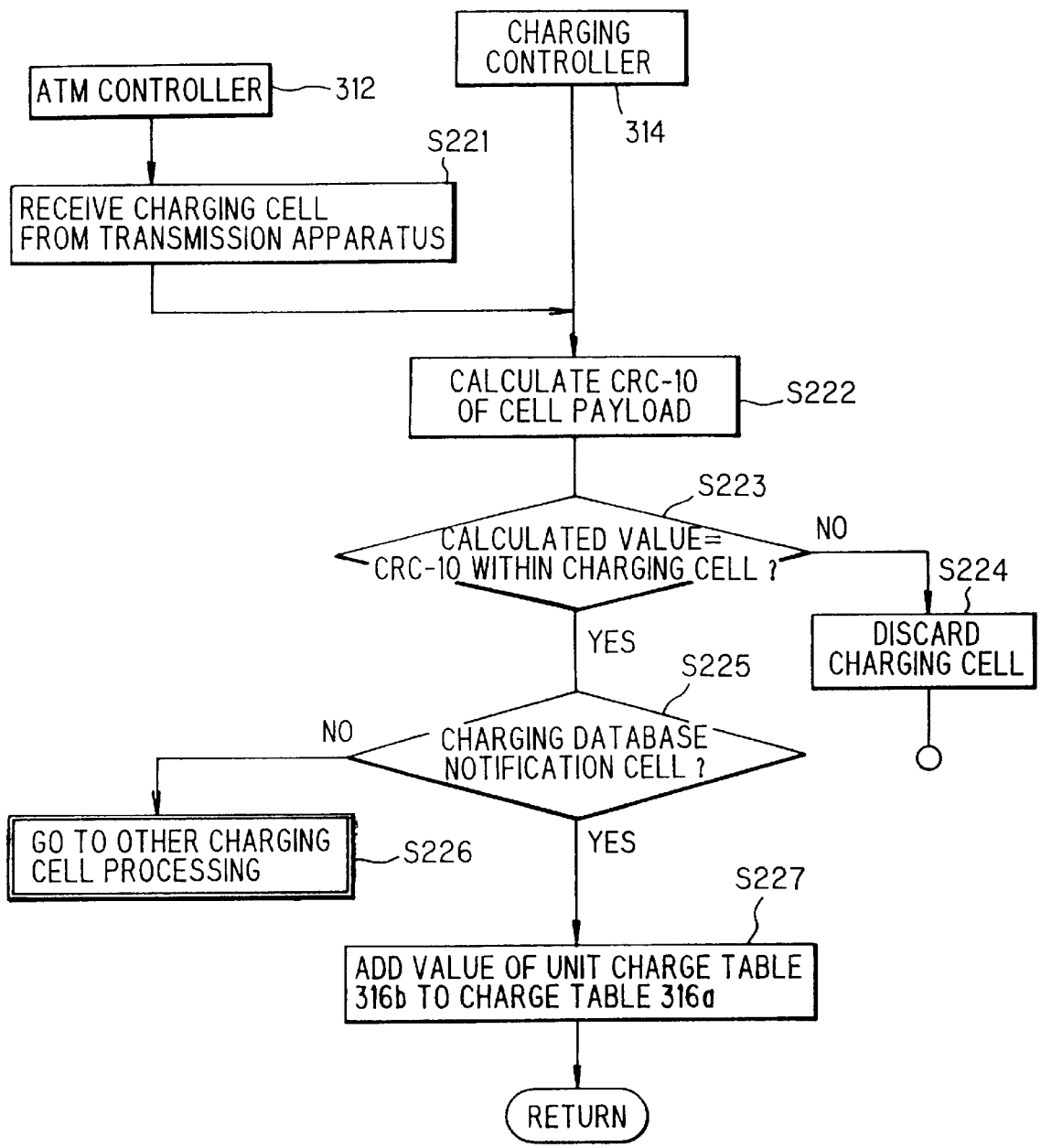
FIG. 24 is a flowchart of processing for metering charge metering cells in a subscriber apparatus.

FIG. 24 is a flowchart of charging processing executed by the subscriber apparatus.

Upon receiving the charging cell (whether this cell is the charge metering cell is unknown) via the ATM controller 312 (step S221), the charging controller 314 of the subscriber apparatus 12 calculates the CRC of the cell payload (step S222) and determines whether the charge coincides with the CRC in the charging cell (step S223). If the two do not match, the charging controller 314 discards the charging cell (step S224). If matching is achieved, however, the charging controller 314 refers to the OAM cell type and OAM function type that have been inserted into the first byte of the payload and determines whether the received cell is the charge metering cell (step S225). If the cell is not the unit charge notification cell, the charging controller 314 executes other charging processing (step S226).

If the cell is the charge metering cell, then the charging controller 314 reads the charge out of the charge table 316a (FIG. 8) and adds the unit charge stored in the unit charge table 316b (FIG. 7) to this charge value, thereby updating the charge (step S227). The charging controller 314 thenceforth repeats the foregoing processing whenever the charge metering cell is received.

The display controller 315 displays the charge held in the charge table 316a on the display unit 17 at all times, thereby making it possible for the subscriber to ascertain the charge in real-time. In this case the total charge concerning a given period of time and the charge for a VOD service currently being received can each be stored in the charge table 316a in advance and both values can be displayed.

(C) Second Embodiment (a) Overall Configuration

Figure 25:
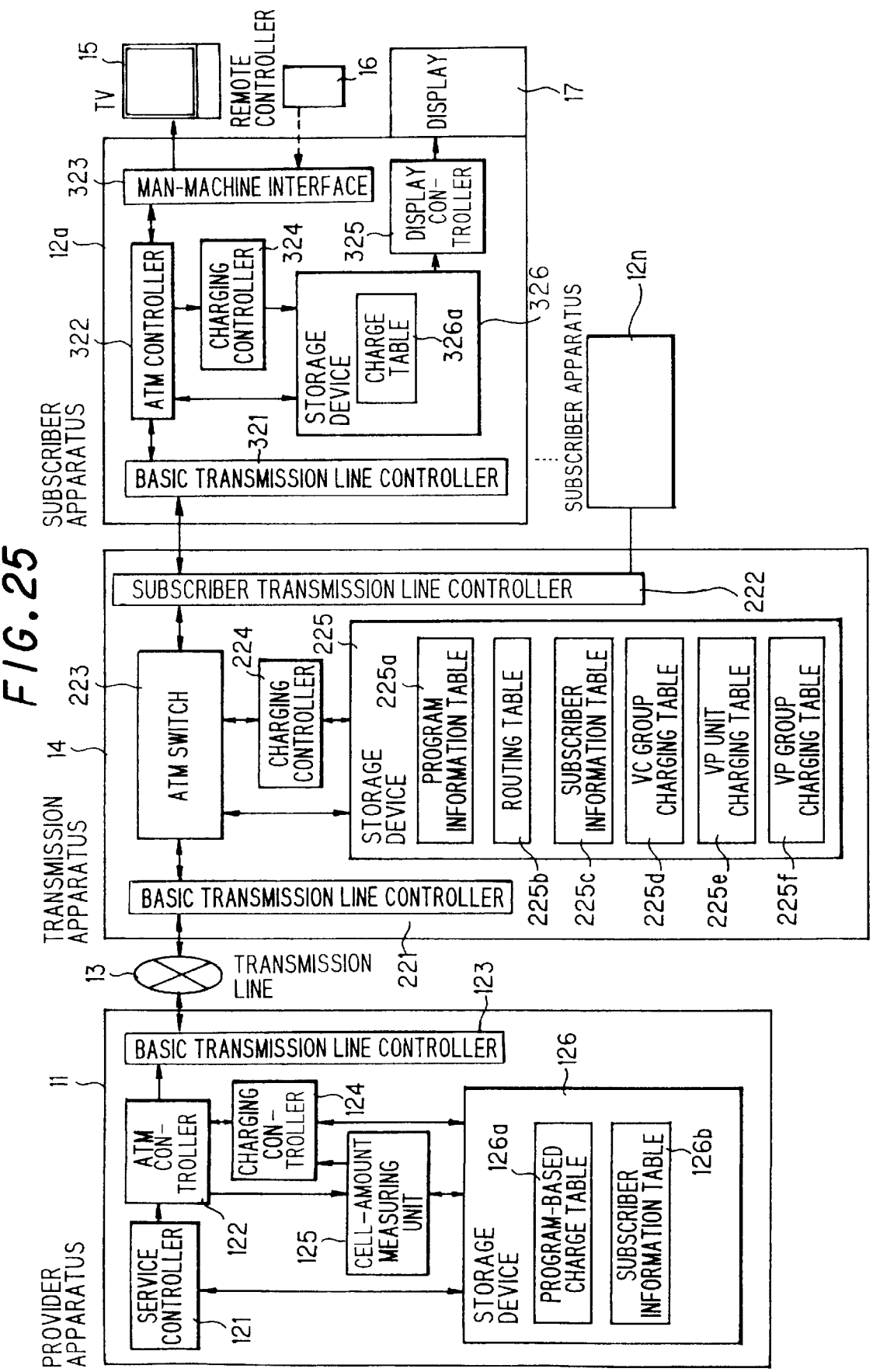
FIG. 25 is a block diagram illustrating an additional-service communication system according to a second embodiment of the present invention.

FIG. 25 is a block diagram illustrating an additional-service communication system according to a second embodiment of the present invention. As shown in FIG. 25, the system includes the provider apparatus 11 for providing a digital broadcast service by means of ATM cells, subscriber apparatus 12a~12n for receiving the digital broadcast service, the transmission apparatus 14 provided between the provider apparatus 11 and the subscriber apparatus 12a~12n and equipped with an ATM switch and the like, the TV (television) 15 for televising video supplied from the provider apparatus 11, the remote controller 16 for performing a variety of operations, i.e., for selecting, starting, switching and ending the digital broadcast service, and the display unit 17 for displaying the charge for this service.

In the second embodiment, the provider apparatus 11 measures amount of additional-service cells (the cells for the digital broadcast), generates charge metering cells commensurate with cell usage and transmits the charge metering cells to the transmission apparatus 14. The transmission apparatus 14 calculates and stores the charge, which is due from each of the subscriber apparatus 12a~12n, based upon the charge metering cells and, in response to a request from the provider apparatus 11, notifies the provider apparatus 11 of the charge for each subscriber by way of the charge notification cell. Further, the transmission apparatus 14 multicasts the charge metering cells and additional-service cells to the plurality of subscriber apparatus 12a~12n, meters the charge metering cells for each of the subscriber apparatus, meters the charges for each of the subscribers at multicasting of the additional service, stores the charges and, in response to a request from the provider apparatus, notifies the provider apparatus 11 of the charges regarding each of the subscribers by way of the charge notification cell.

The provider apparatus 11 includes a service controller 121 for communicating with the transmission apparatus 14 and subscriber apparatus 12a~12n and controlling the provision of the digital broadcast service, an ATM controller 122 for converting a video/control signal to ATM cells, converting ATM cells to a control signal and extracting various charging cells, a basic transmission line controller 123 for converting ATM cells to a transmission signal, transmitting the signal over the transmission line 13 and converting a transmission signal received from the transmission line to ATM cells, a charging controller 124 for generating various charges cells, entering these cells into the ATM controller 122, extracting various charging cells from the ATM controller 122 and analyzing the charging cells, a cell-amount measuring unit 125 for measuring, on a per-VCI basis, the amount of image cells that flow from the ATM controller 122 to the basic transmission line controller 123, and a storage device 126 for registering various information in regard to the provider apparatus. The storage device 126 has a program-based charging table 126a for managing charging information for each program of a digital broadcast, and a subscriber information table 126b for managing information (subscriber address, charge, etc.) on a per-subscriber basis.

The transmission apparatus 14 includes a basic transmission line controller 221 for converting a transmission signal received from the transmission line 13 to ATM cells, converting ATM cells to a transmission signal and transmitting the signal over the transmission line, a subscriber transmission line controller 222 for converting transmission signals received from the subscriber apparatus 12a~12n to ATM cells, converting ATM cells to transmission signals and transmitting the signals to the subscriber apparatus 12a~12n, an ATM switch 223 provided between the basic transmission line controller 221 and the subscriber transmission line controller 222 for routing ATM cells, a charging controller 224 for generating various charges cells, entering these cells into the ATM controlller 223, extracting charging cells from the ATM controller 223 and analyzing the charging cells, and a storage device 225 for storing various information in regard to the transmission apparatus 14. The storage device 225 includes a program information table 225a for registering the program-by-program VPI/VCI of the digital broadcast provided by the provider apparatus 11, a routing table 225b for converting the VPI/VCI of an input ATM cell to the VPI/VCI of an output ATM cell, a subscriber information table 225c for managing charging information of each subscriber accommodated by the transmission apparatus, a VC group charging table 225d for managing charging information in VC group units of subscribers accommodated by the transmission apparatus, a VP unit charging table 225e for managing charging information in VP units of subscribers accommodated by the transmission apparatus, and a VP group charging table 225f for managing charging information of VP group units of subscribers accommodated by the transmission apparatus.

Each of the subscriber apparatus 12a~12n includes a subscriber transmission line controller 321 for converting a transmission signal received from the transmission apparatus 14 to ATM cells and converting ATM cells to a transmission signal, an ATM controller 322 for converting ATM cells to a video (image)/control signal, converting a control signal to ATM cells and extracting a charge metering cell and the like, a man-machine interface 323 for transmitting an image signal to the TV 15 and converting a digital-broadcast selection request from the remote controller 16 to a control signal, a charging controller 324 for calculating charge based upon charge metering cells received by the subscriber apparatus, a display controller 325 for displaying a charge, which has been calculated by the subscriber apparatus, on the display unit 17 attached to the subscriber apparatus, and a storage device 326 for registering various information in regard to the subscriber apparatus. The storage device 326 has a charge table for storing the charge due from the subscriber apparatus.

(b) various tables (b-1) Program-based charge table

Figure 26:
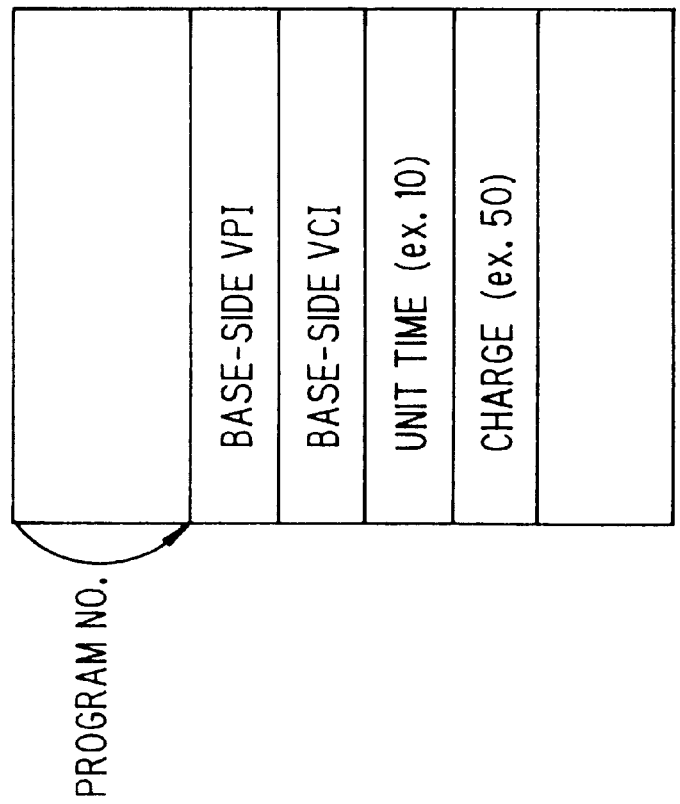
FIG. 26 is a diagram illustrating the content of a program-based charging table, which is located in the provider apparatus, for a digital broadcast.

FIG. 26 is a diagram illustrating the content of the program-based charging table 126a, which serves as a charging database, provided in the provider apparatus 11. By indexing the table based upon the program numbers of a digital broadcast, it is possible to extract (1) the base-side VPI/VCI for the program number, (2) the unit time for generation of charge metering cells (one charge metering cell is created whenever this unit time elapses), and (3) the unit charge (the charge per charge metering cell). It should be noted that the program number and base-side VPI/VCI are fixed at 1:1 beforehand.

The charging controller 124 of the provider apparatus 11 generates one charge metering cell, and transmits this cell to the transmission apparatus 14, whenever a unit time's worth of digital broadcast cells is transmitted to the transmission apparatus 14.

(b-2) Subscriber information table (provider apparatus)

Figure 27:
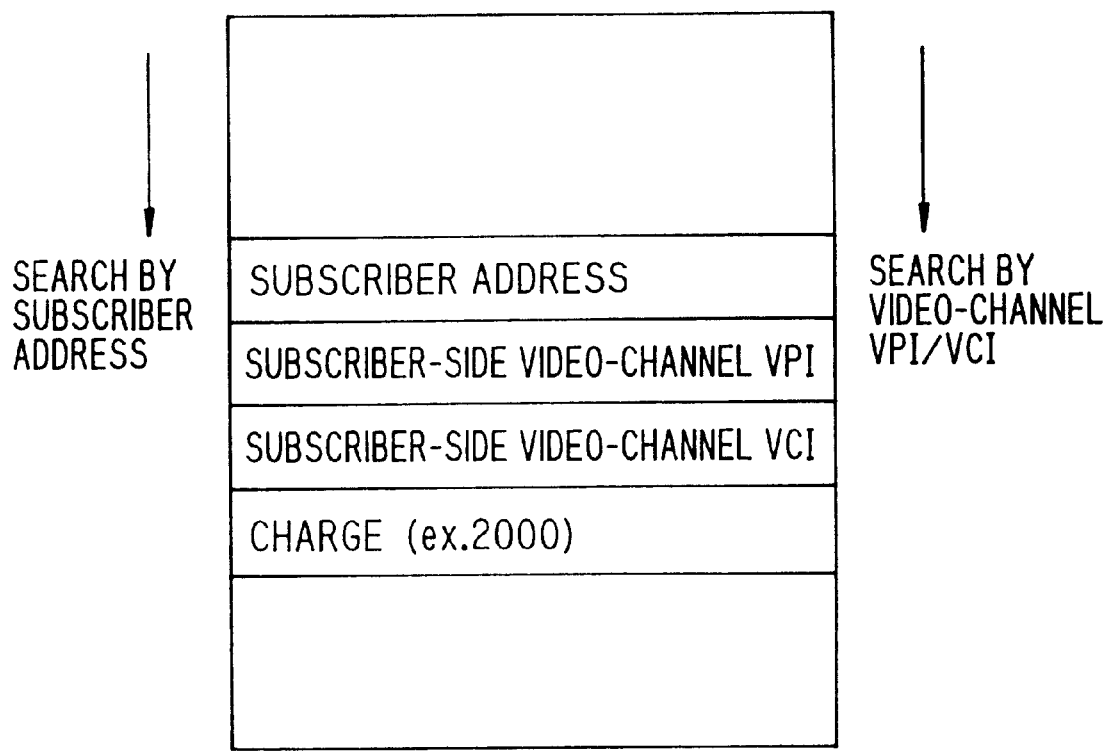
FIG. 27 is a diagram illustrating the content of a subscriber information table in the provider apparatus.

FIG. 27 is a diagram illustrating the content of the subscriber information table 126b provided in the provider apparatus 11 for managing the information of each subscriber apparatus. The area (charge) corresponding to a subscriber can be obtained by searching the subscriber information table 126b using the subscriber address or subscriber-side video-channel VPI/VCI. Further, the subscriber-side video-channel VPI/VCI is obtained from the subscriber address. Conversely, the subscriber address is obtained from the subscriber-side video-channel VPI/VCI. The corresponding relationship between the subscriber address and subscriber-side video-channel VPI/VCI values is established beforehand at the time the contract agreement is signed.

The charging controller 124 reads the charge (the total charge) corresponding to the subscriber out of the subscriber information table 126b whenever a charge notification cell is received from the transmission apparatus 14 and adds the charge of which notification has been given by the charge notification cell to the total charge, thereby updating the total charge.

(b-3) Program information table

Figure 28:
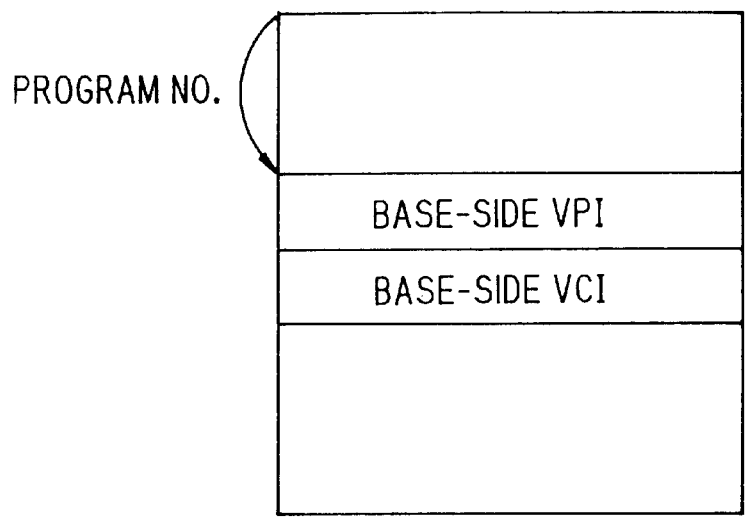
FIG. 28 is a diagram illustrating the content of a digital-broadcast program information table in a transmission apparatus.

FIG. 28 is a diagram illustrating the content of the program information table 225a for managing the base-side VPI/VCI of the digital broadcast in the transmission apparatus 14. The base-side VPI/VCI corresponding to the program number can be extracted by searching the table using the program number of the digital broadcast. The program information table 225a is created based upon the program information sent from the provider apparatus 11.

(b-4) Routing table

Figure 29:
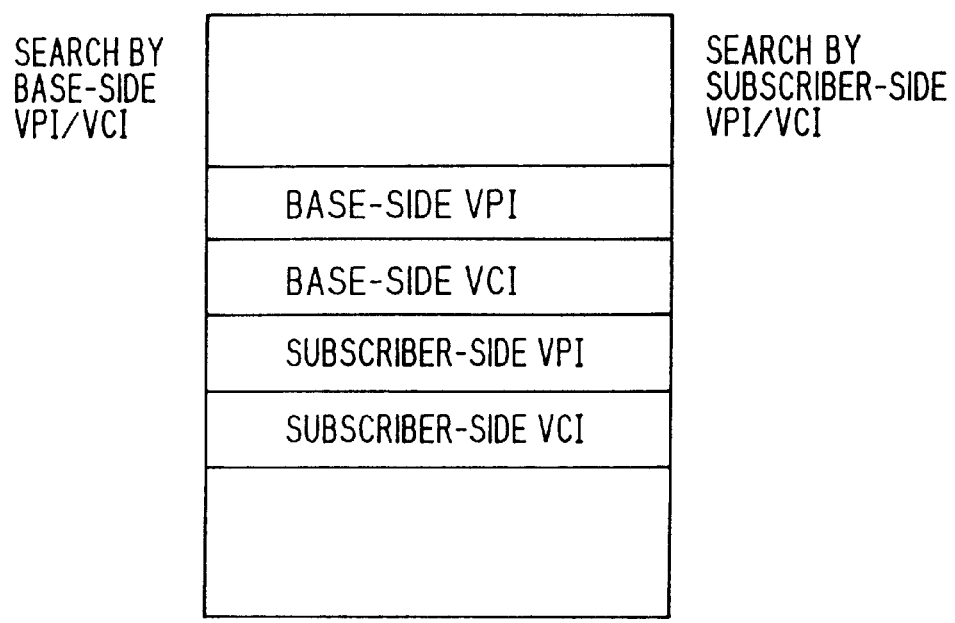
FIG. 29 is a diagram illustrating the content of a routing table in the transmission apparatus.

FIG. 29 is a diagram illustrating the content of the routing table 225b that manages the routing information in the transmission apparatus 14. The subscriber-side VPI/VCI can be extracted by searching the table using the base-side VPI/VCI, and the base-side VPI/VCI can be extracted by searching the table using the subscriber-side VPI/VCI.

(b-5) Subscriber information table (transmission apparatus)

Figure 30:
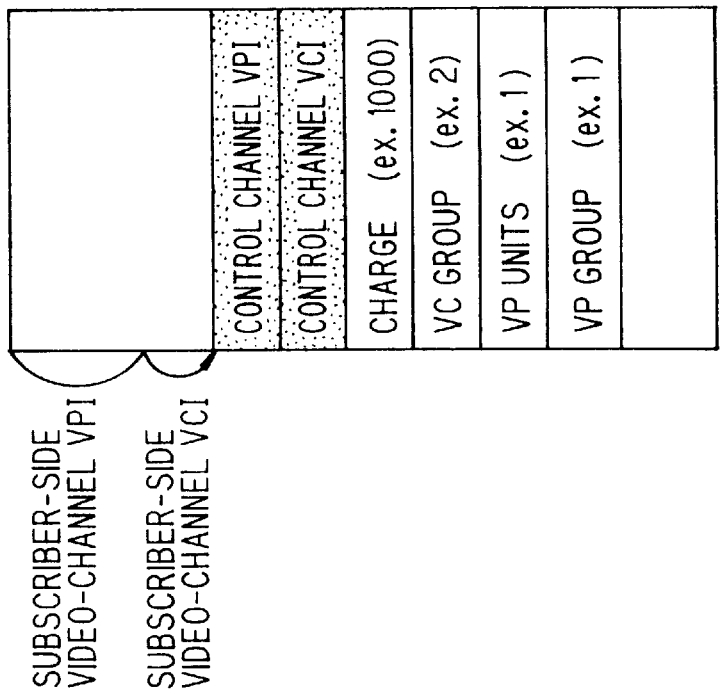
FIG. 30 is a diagram illustrating the content of a subscriber information table in the transmission apparatus.

FIG. 30 is a diagram illustrating the content of a subscriber information table 225c provided in the transmission apparatus 14. A subscriber-based area conforming to the subscriber-side video-channel VPI/VCI can be specified by referring to this table, and it is possible to extract (1) a subscriber charge, (2) the VPI/VCI of a control channel for digital-broadcast program switching, (3) the VC group number, (4) the VP unit charge indicator and (5) the VP group number. Further, the subscriber-side video-channel VPI/VCI can be obtained from the VPI/VCI of the control channel for program switching.

If the VC group number is 0, this means that there is no request for charge counting of the VC group. If the VC group number is not 0, however, e.g., if the number is 2, then this stipulates a request for charge counting in VC group 2. If the VP unit charge indicator is 1, a request for charge counting in VP units is stipulated. If the VP unit charge indicator is 0, this means that there is no request for charge counting in VP units. If the VP group number is 0, this means that there is no request for charge counting of the VP group. If the VP group number is not 0, however, e.g., if the number is 1, then this stipulates a request for charge counting in VP group 1.

Whenever charge metering cell is received from the provider apparatus 11, the charging controller 224 extracts the charge from the area, adds the unit charge to this charge to update the charge and stores the updated charge in the same area again. Further, the charging controller 224 refers to the VC group number, VP unit charge indicator and VP group number and decides whether to calculate the charge of each VC group, the charge of each VP unit and the charge of each VP group.

As will be described later, the controller (not shown) of the ATM switch 223 obtains the subscriber-side video-channel VPI/VCI conforming to the VPI/VCI of the program switching control channel, creates the routing information of the video channel and sets the routing information in the routing table 225b.

(b-6) VC group charging table

Figure 31:
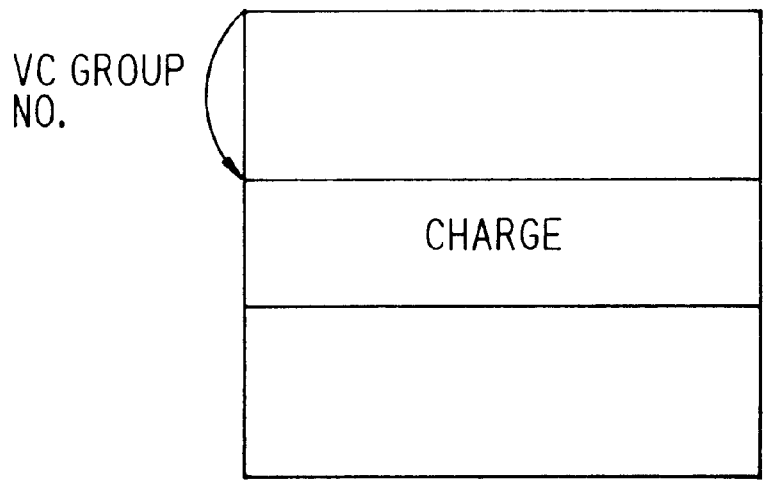
FIG. 31 is a diagram illustrating the content of a VC group charging table in the transmission apparatus.

FIG. 31 is a diagram illustrating the content of the VC group charging table 225d provided in the transmission apparatus 14. The charge corresponding to the VC group can be extracted by searching this table using the VC group number. In a case where there is a request for charge counting by VC group, the charging controller 224 reads the VC group charge out of this table based upon the VC group number whenever a charge metering cell is received, updates this charge and stores the updated charge in the same area.

(b-7) VP unit charging table

Figure 32:
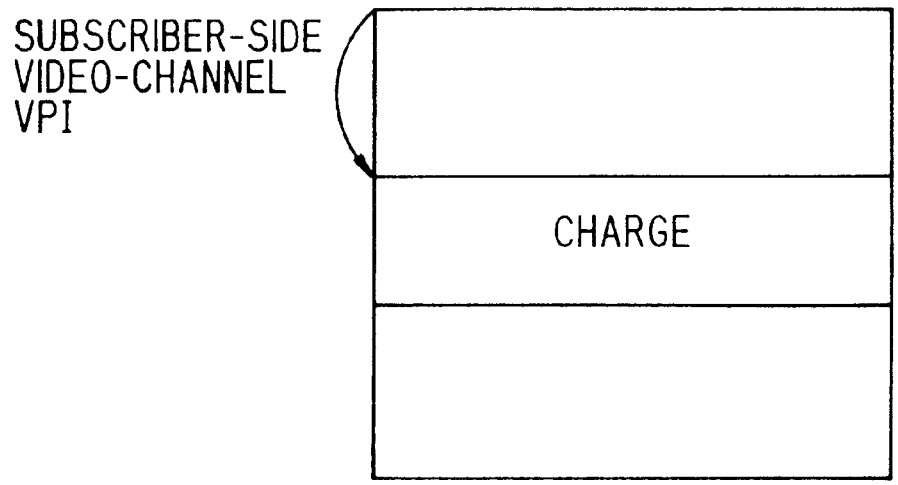
FIG. 32 is a diagram illustrating the content of a VP unit charging table in the transmission apparatus.

FIG. 32 is a diagram illustrating the content of the VP unit charging table 225e provided in the transmission apparatus 14. The charge corresponding to the VPI can be extracted by searching this table using the subscriber-side video-channel VPI. In a case where there is a request for charge counting in VP units, the charging controller 224 reads the charge out of this table based upon the subscriber-side video-channel VPI whenever a charge metering cell is received, updates this charge and stores the updated charge in the same area.

(b-8) VP group charging table

Figures 33, 34:
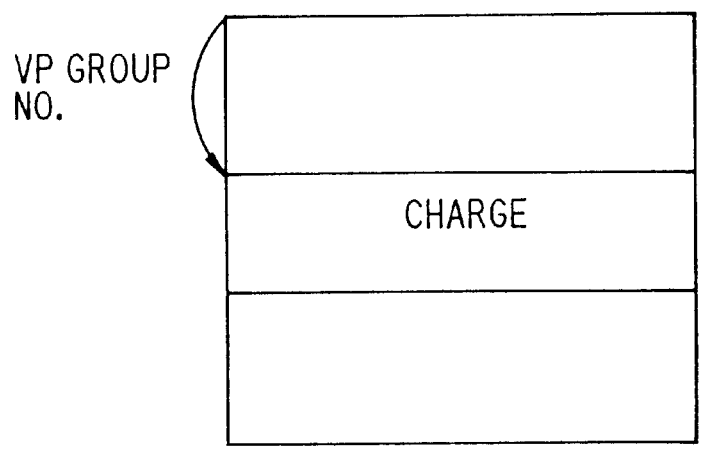
FIG. 33 is a diagram illustrating the content of a VP group charging table in the transmission apparatus.
FIG. 34 is a diagram illustrating the content of a charge table in the subscriber apparatus.

FIG. 33 is a diagram illustrating the content of the VP group charging table 225f provided in the transmission apparatus 14. The charge concerning the VP group can be extracted by searching this table using the VP group number. In a case where there is a request for charge counting by VP group, the charging controller 224 reads the VP group charge out of this table based upon the VP group number whenever a charge metering cell is received, updates this charge and stores the updated charge in the same area.

(b-9) Charge table

FIG. 34 is a diagram showing the content of the charge table 326a for storing charge in the subscriber apparatus 12. Whenever the charge notification cell is received, the charging controller 324 reads the charge out of the charge table 326a and adds the unit charge of which it has been notified by the charge notification cell to this unit charge to update the same.

(c) Cell format

Figure 35:
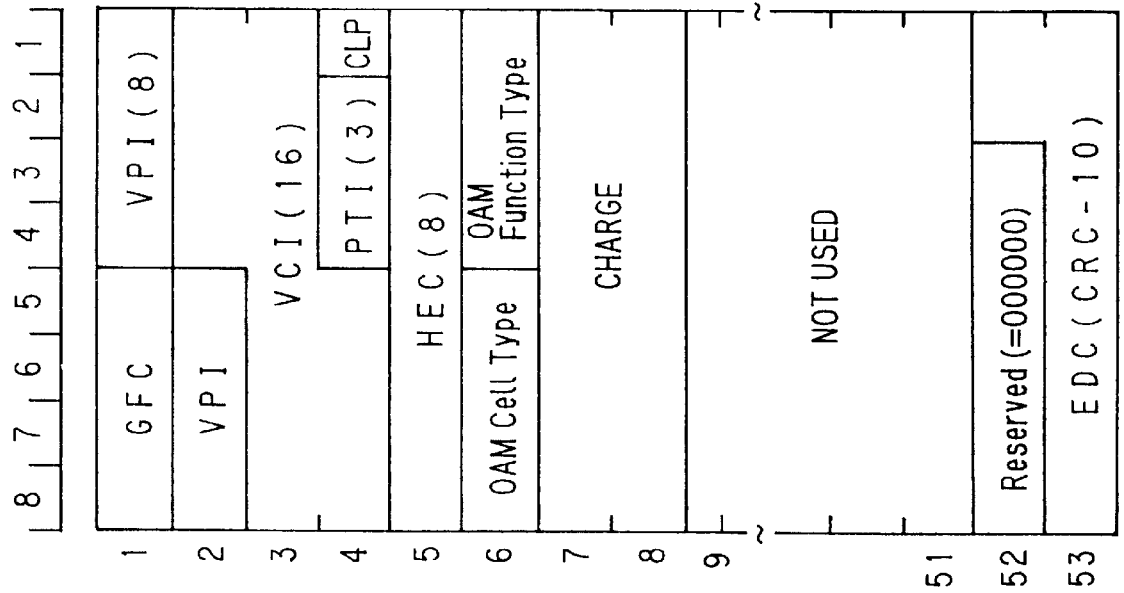
FIG. 35 shows the format of a charging cell (charge metering cell)

FIG. 35 shows the format of a charge metering cell by which the provider apparatus 11 notifies the transmission apparatus 14 of the charge whenever a unit of time elapses. That the cell is a charging cell is indicated by the OAM cell type (1001), and the fact that this is a charge metering cell is indicated by the OAM function type (1001). Charge per charge metering cell has been inserted into the payload of the charge metering cell.

Figure 36:
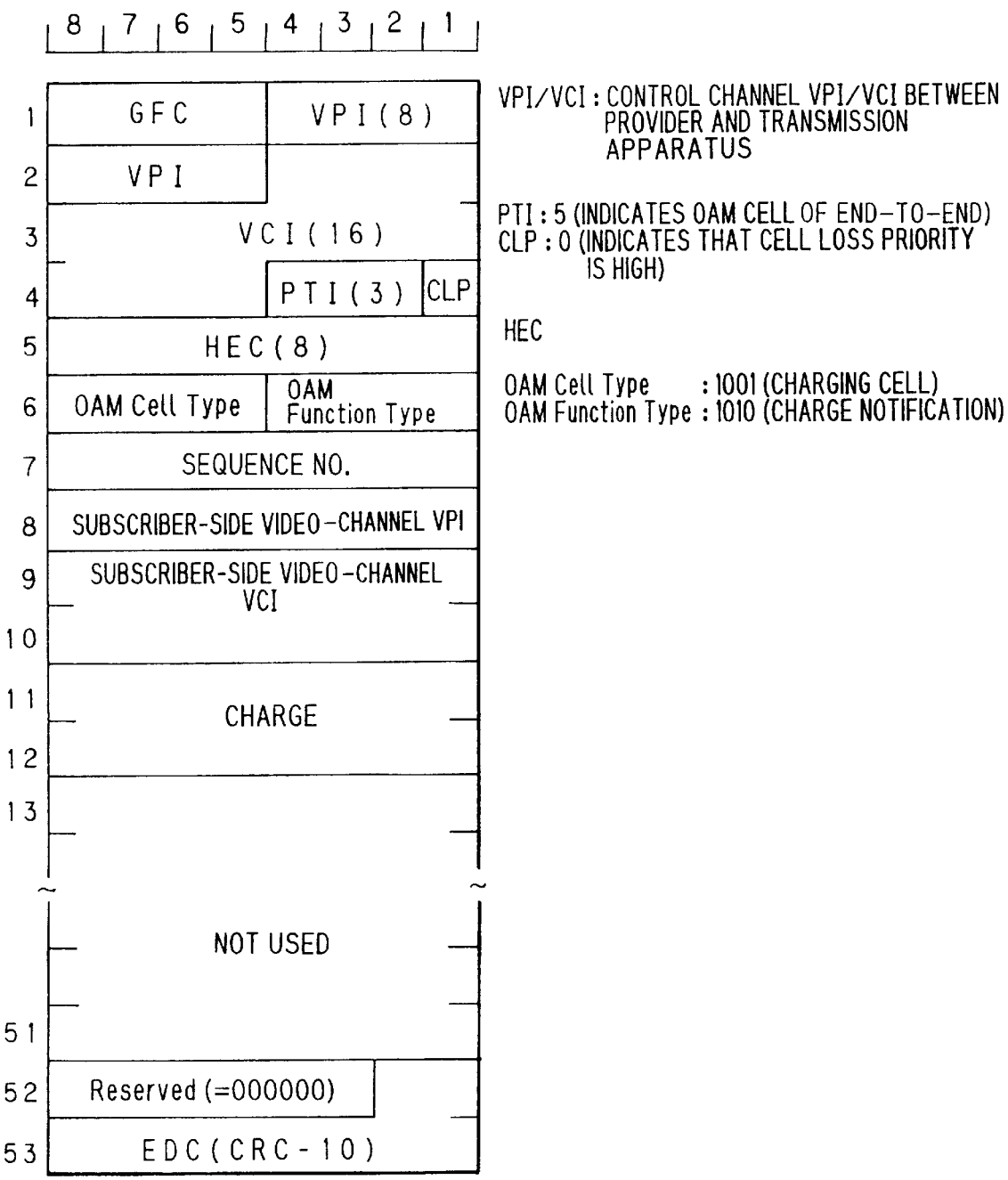
FIG. 36 shows the format of a charging cell (charge notification cell)

FIG. 36 shows the format of a charge notification cell by which the transmission apparatus 14 notifies the provider apparatus 11 and the subscriber apparatus 12a~12n of the charge for each subscriber. That the cell is a charging cell is indicated by the OAM cell type (1001), and the fact that this is notification of the charge is indicated by the OAM function type (1010). The sequence number, subscriber-side video-channel VPI/VCI and charge are inserted into the payload of the charge notification cell.

FIG. 37 shows the format of a charge reception-completed notification cell by which the provider apparatus 11 and subscriber apparatus 12a~12n notify the transmission apparatus 14 of the fact that reception of the charge notification cell has been completed. That the cell is a charging cell is indicated by the OAM cell type (1001), and the fact that this is notification of completion of reception of the charge is indicated by the OAM function type (1011). A sequence number identical with the service number that has been inserted into the payload of the charge notification cell is inserted into the payload of the charge reception-completed notification cell.

Figure 38:
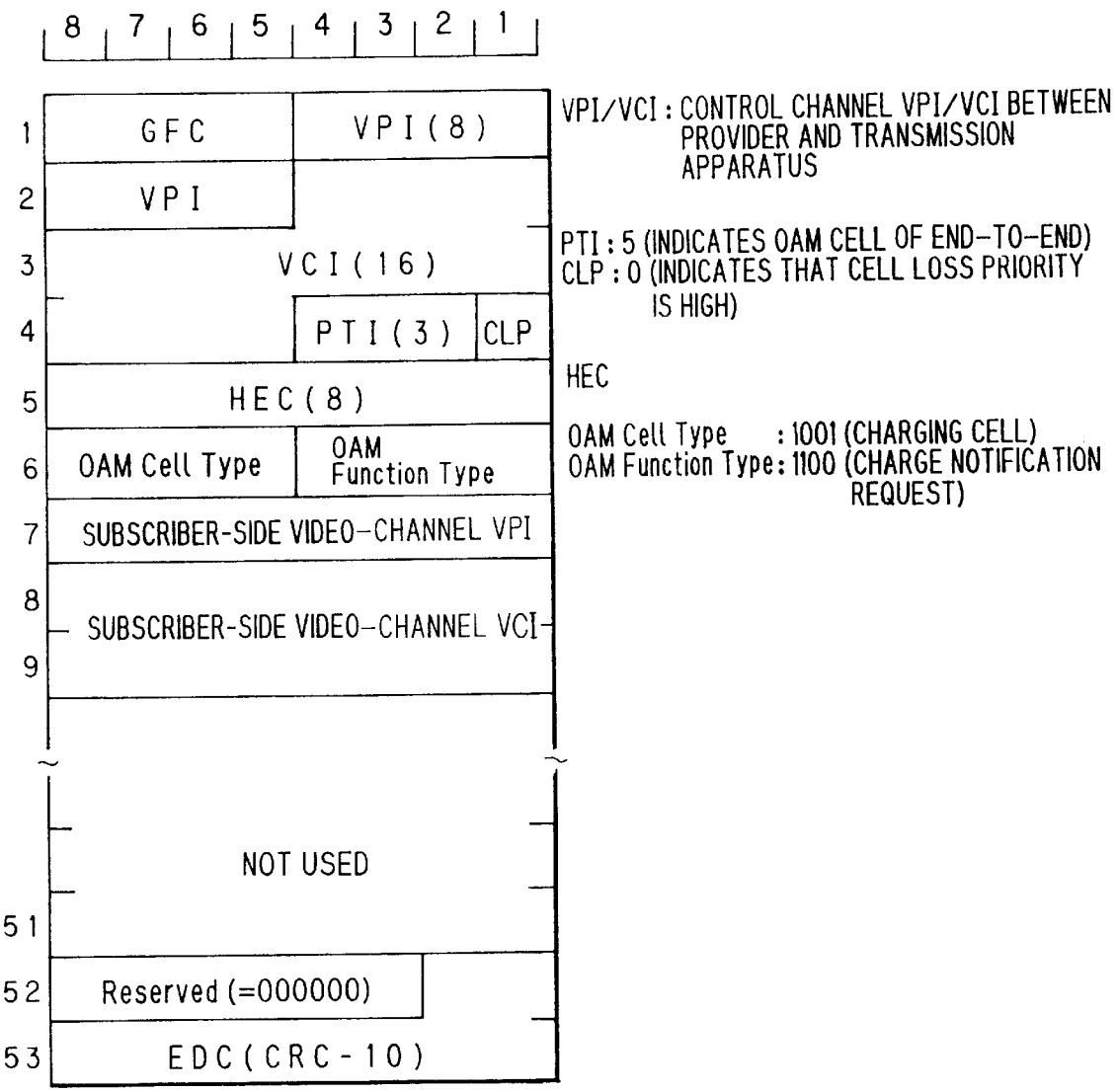
FIG. 38 shows the format of a charging cell (charge notification request cell)

FIG. 38 shows the format of a charge notification request cell by which the provider apparatus 11 requests the transmission apparatus 14 for notification of charge on a per-subscriber basis. That the cell is a charging cell is indicated by the OAM cell type (1001), and the fact that this is for requesting notification of charge is indicated by the OAM function type (1100). The subscriber-side video-channel VPI/VCI of a subscriber wishing to be notified of the charge is inserted into the payload of this charge notification request cell.

(d) Generation and sending/receiving of charge measurement cells

Figure 39:
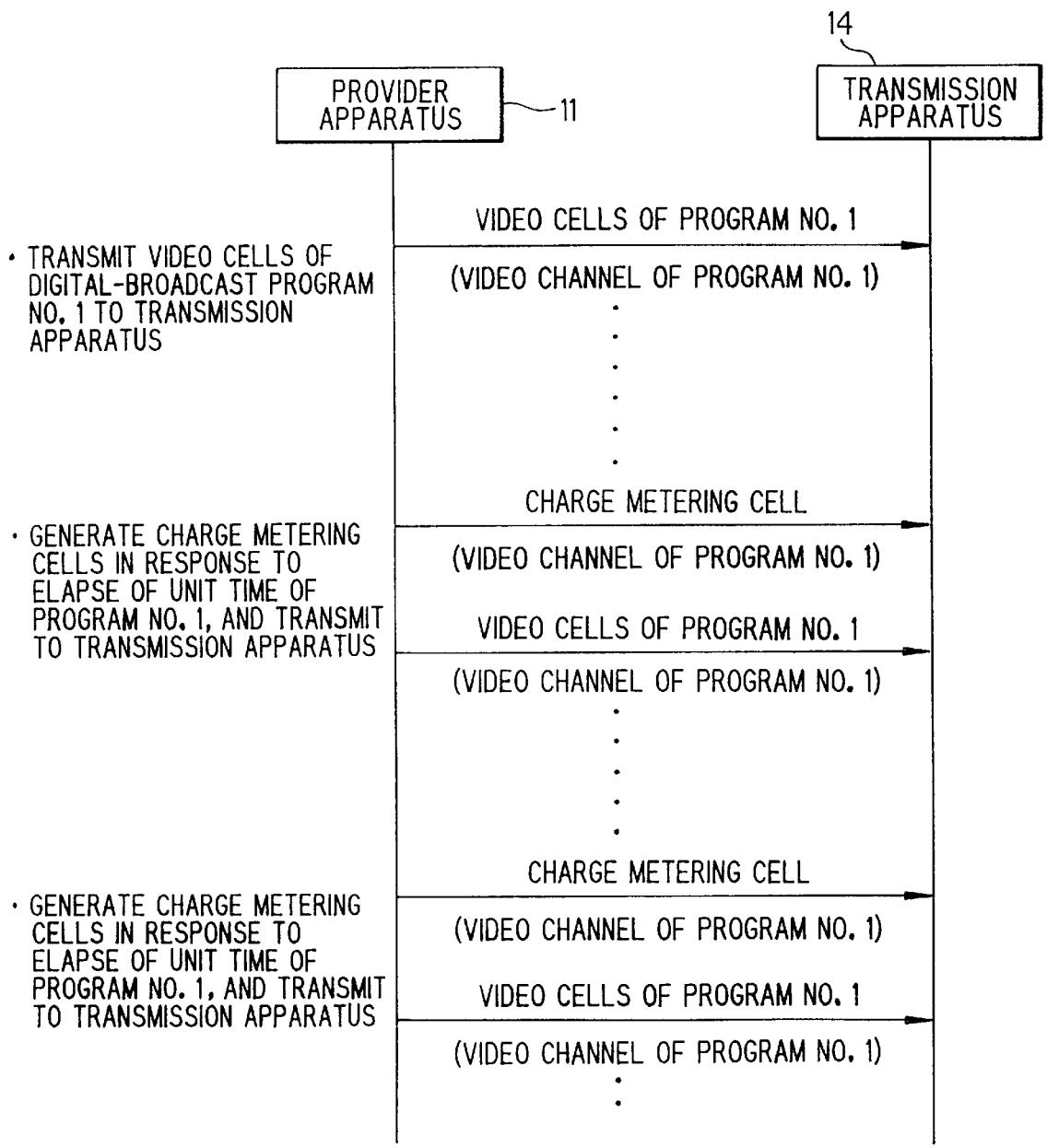
FIG. 39 is a sequence diagram showing the sequence for generating/transmitting charge metering cells.
Figure 40:
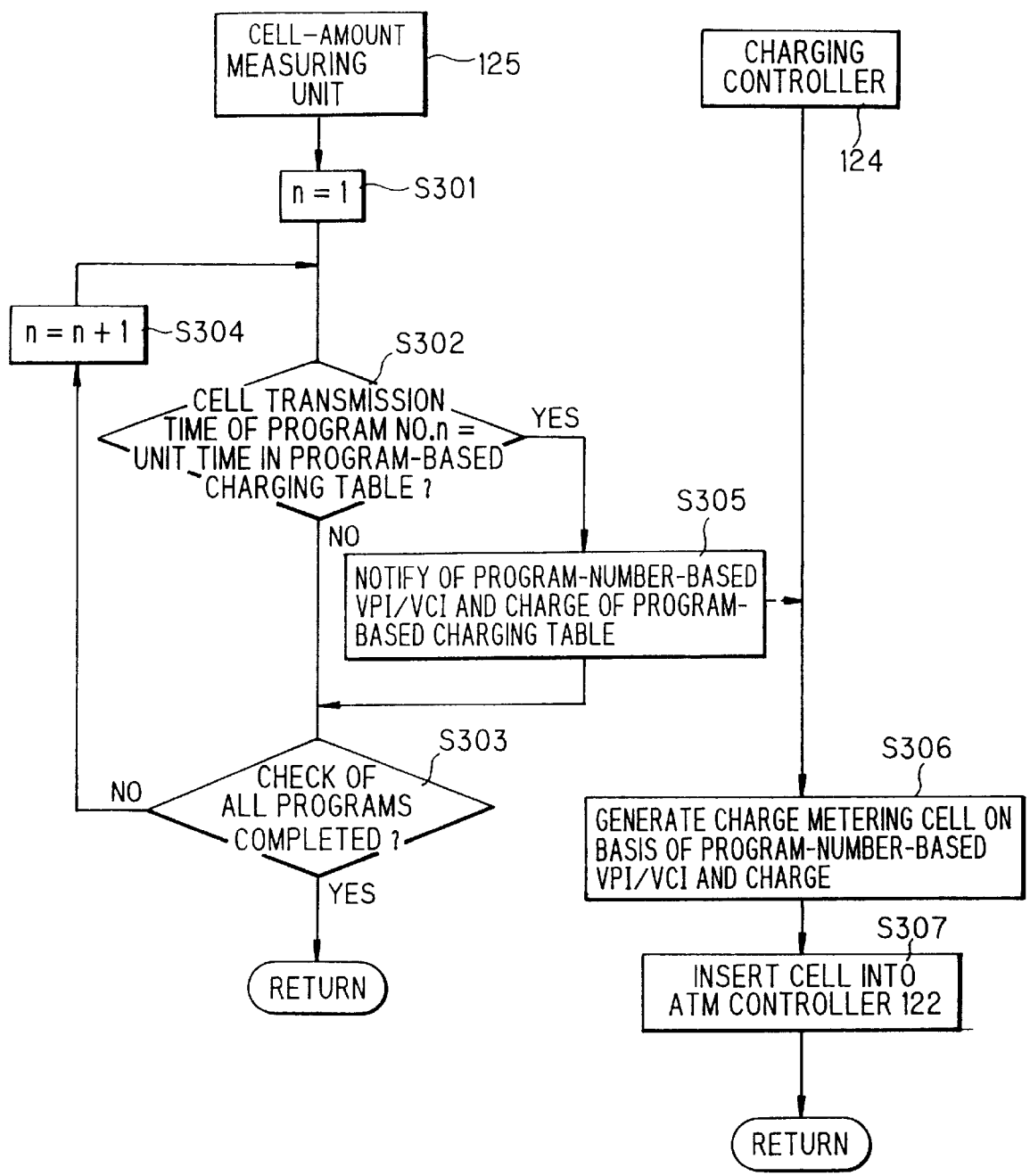
FIG. 40 is a flowchart of processing for generating/transmitting charge metering cells in the provider apparatus.

FIG. 39 is a diagram for describing the sequence for sending/receiving charge metering cells, and FIG. 40 is a flowchart of processing for generating charge metering cells in the provider apparatus.

For every program of a digital broadcast provided, the provider apparatus 11 registers the base-side VPI/VCI values, the unit time and the charge in the program-based charge table 126a (FIG. 26) in advance and manages these as a charging database. Further, using the control channel between itself and the transmission apparatus 14, the provider apparatus 11 notifies the transmission apparatus 14 of the digital-broadcast program information. This information includes the program number and the base-side VPI/VCI values. Upon receiving this program information, therefore, the transmission apparatus 14 registers the base-side VPI/VCI in the program information table 225a of the storage device 225 in correspondence with the program number.

Under these conditions the provider apparatus 11 transmits digital broadcast video of each channel number to the transmission apparatus 14 by ATM cells to which the base-side VPI/VCI conforming to the program has been attached. In concurrence with the transmission of the ATM cells (video cells), the cell-amount measuring unit 125 of the provider apparatus 11 establishes the relation n=1 and determines whether cell transmission time has exceeded the unit time of each program registered in the program-based charge table 126a (steps S301~S304). In case of a program number for which the unit time has been exceeded, the cell-amount measuring unit 125 notifies the charging controller 124 of the base-side VPI/VCI values (program-based VPI/VCI values) and charge and requests generation of a charge metering cell (step S305). The cell-amount measuring unit 125 executes the foregoing processing with regard to all programs. If processing with regard to all programs is finished, the cell-amount measuring unit 125 repeats processing from step S302 onward.

The charging controller 124 generates a charge metering cell (FIG. 35) from the base-side VPI/VCI values and charge of which it has been notified (step S306) and enters this cell into the ATM controller 122 (step S307). The ATM controller 122 sends this charging cell, together with a video cell, to the transmission line leading to the transmission apparatus 14. As a result, the transmission apparatus 14 receives charge metering cells, at regular time periods, classified by digital broadcast program. The operation described above is then repeated.

Only the digital broadcast program of program number 1 is described in the sequence diagram of FIG. 39. However, charge metering cells are transmitted to the transmission apparatus 14 by the same sequence all with regard to all other digital programs being provided.

(e) Digital-broadcast program switching

Figure 41:
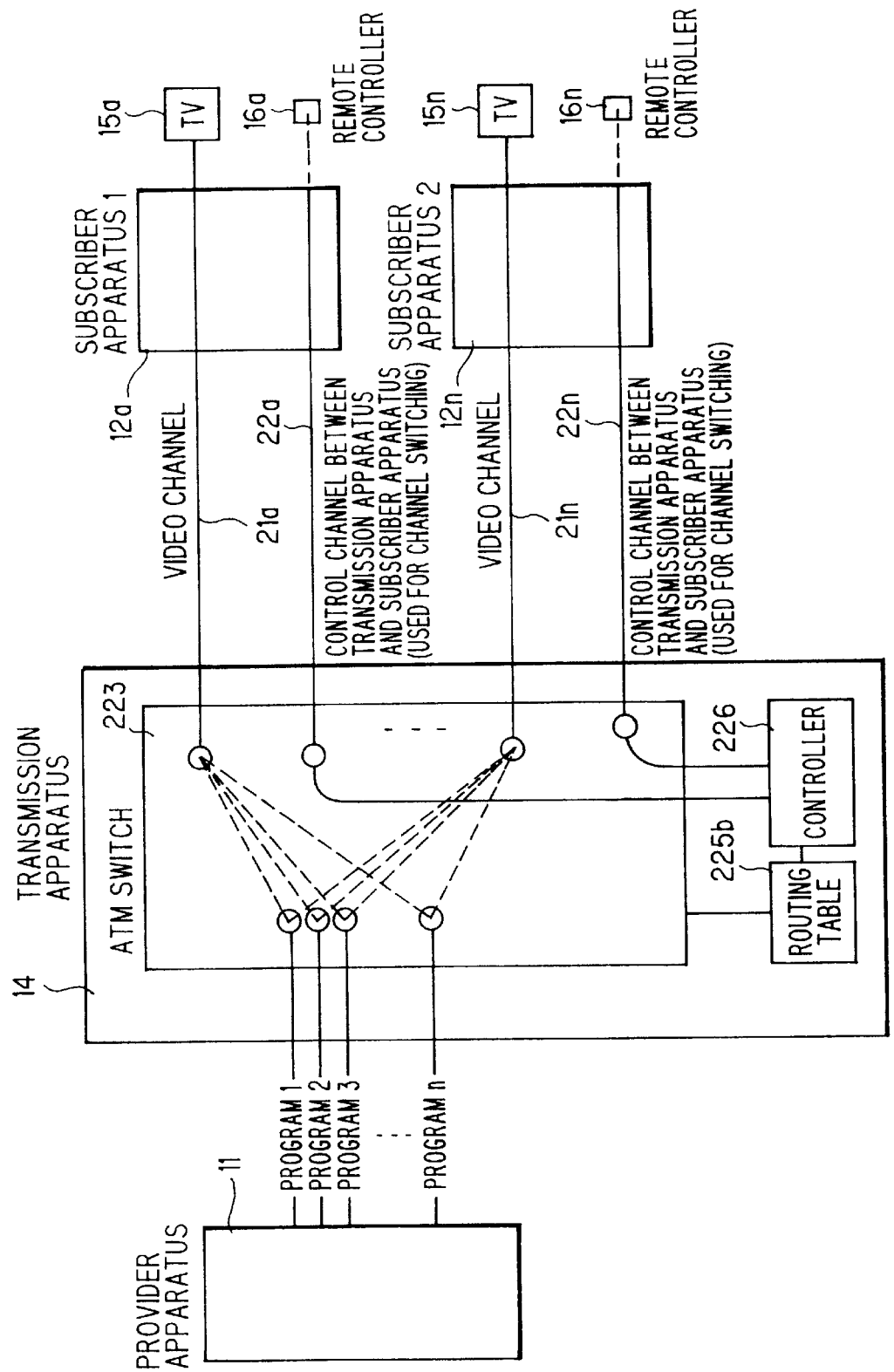
FIG. 41 is a diagram for describing digital-broadcast program switching.

FIG. 41 is a diagram for describing digital-broadcast program switching. Shown in FIG. 41 are the provider apparatus 11, the subscriber apparatus 12a~12n, the transmission apparatus 14, televisions 15a~15n and remote controllers 16a~16n. The transmission apparatus 14 includes the ATM switch 223, the routing table 225b and a controller 226. Also shown are video channels 21a~21n and program switching control channels 22a~22n between the transmission apparatus 14 and subscriber apparatus.

The provider apparatus 11 transmits program broadcast cells of the respective digital broadcasts (program 1~program n) to the transmission apparatus 14 at all times regardless of whether or not there is a service connection request from the subscriber apparatus 12a~12n. Program switching of digital broadcasts is carried out by the transmission apparatus 14 in accordance with a request from a subscriber apparatus. In other words, the controller 22 of the transmission apparatus 14 performs program switching control based upon a program switching request sent from the subscriber apparatus 12a~12n via the control channels 22a~22n between the transmission apparatus and subscriber apparatus.

Upon receiving a request for provision of a digital broadcast service from the subscriber apparatus 12a~12n, the provider apparatus 11 designates the control channel between the transmission apparatus 14 and the subscriber apparatus 12a~12n and requests connection of the control channel. This makes possible communication control between the transmission apparatus 14 and the subscriber apparatus 12a~12n via the designated control channel so that a program changeover request of a digital program can be made from the subscriber apparatus 12a~12n.

Figure 42:
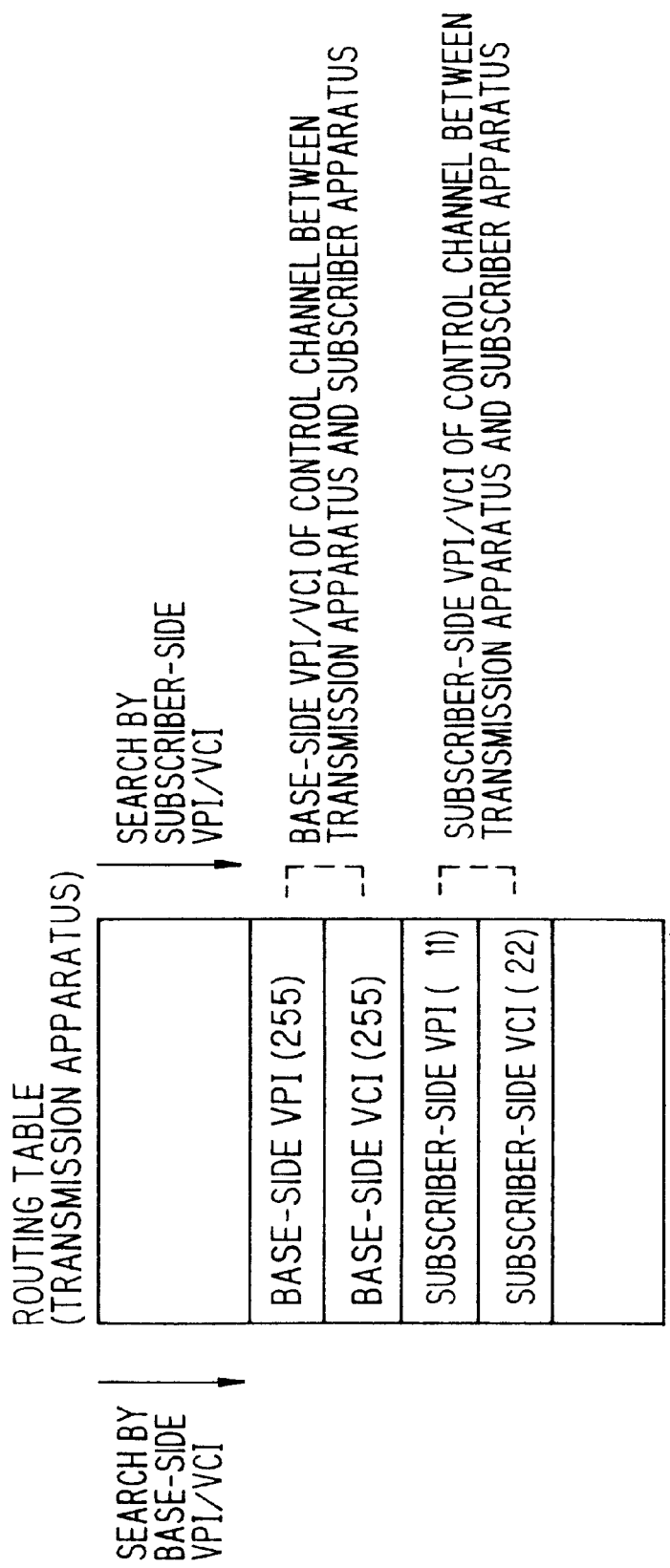
FIG. 42 is a diagram for describing routing information of a control channel.

For example, it is decided beforehand that a cell of base-side VPI/VCI values of 255/255 is the cell for a control-channel connection request between the transmission apparatus and subscriber apparatus. If the controller 226 of the transmission apparatus 14 receives the cell for a control-channel connection request between the transmission apparatus 14 and subscriber apparatus 12a~12n from the provider apparatus 11, then the controller 226 sets the routing information of the control channel in the routing table 225b, as shown in FIG. 42. It is assumed that the subscriber-side VPI/VCI values of the control channel between the transmission apparatus and subscriber contained in the connection request cell are 11/22. As a result, if an ATM cell of control channel VPI/VCI=11/22 is subsequently received from the subscriber apparatus, the controller 226 receives (terminates) this ATM cell and executes processing conforming to the control information contained in this ATM cell.

It is required that the subscriber-side VPI/VCI of the control channel between the transmission apparatus and subscriber be distributed beforehand in fixed fashion in conformity with the subscriber apparatus in the same manner as the subscriber-side VPI/VCI of the video channel so that the subscriber apparatus can be identified by this subscriber-side VPI/VCI. Further, in order to decide which video-channel routing information is to be rewritten in response to a request from which control channel (subscriber apparatus), it is required that the subscriber-side VPI/VCI of the control channel between the transmission apparatus and subscriber be made to correspond to the subscriber-side VPI/VCI of the video channel. To this end, the subscriber-side VPI/VCI of the control channel is registered in the subscriber information table 225c in correspondence with the subscriber-side VPI/VCI of the video channel, as shown in FIG. 30.

(f) Measurement processing and multicast control of charge metering cell

Figure 43:
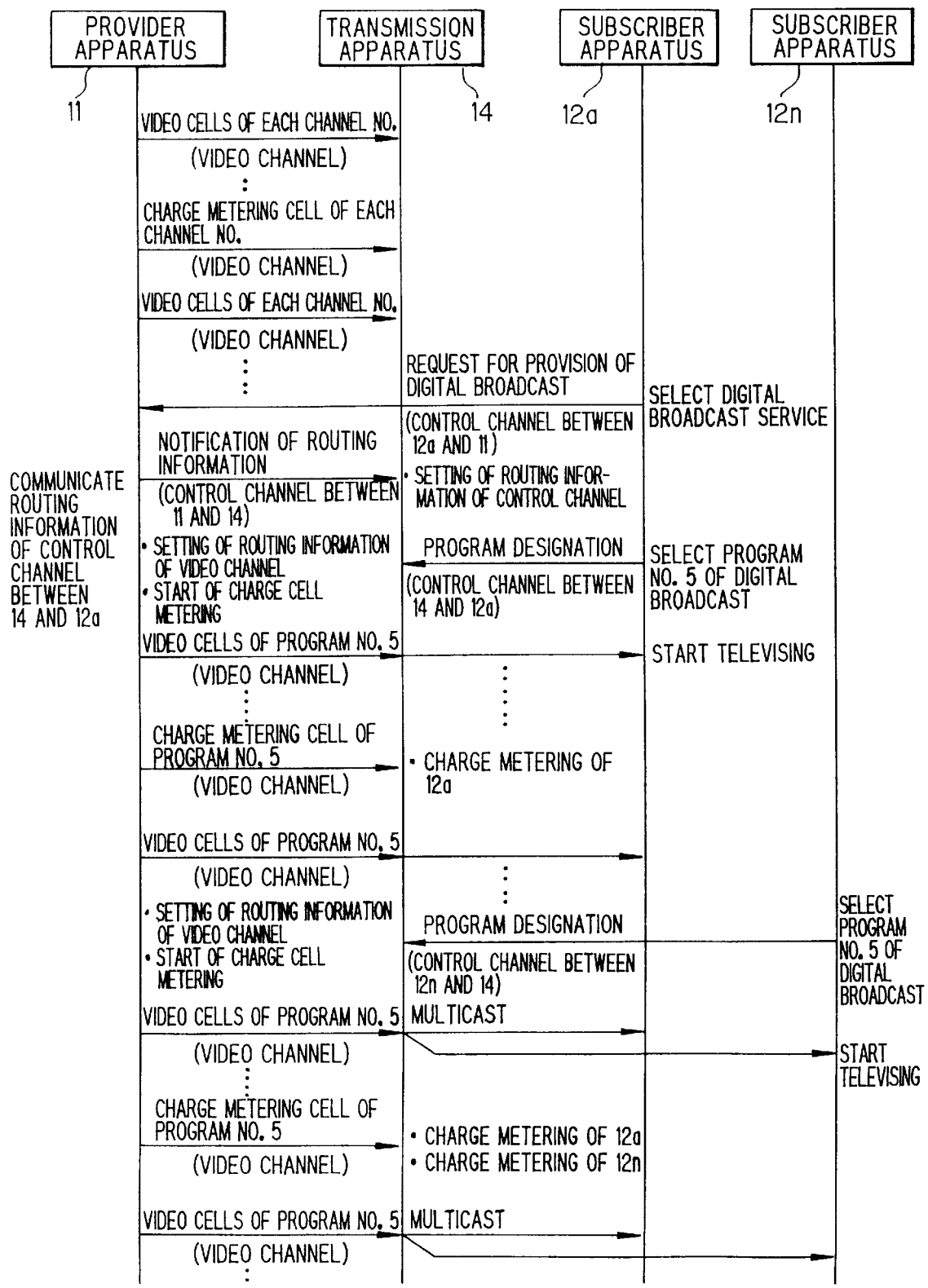
FIG. 43 is a sequence diagram showing a sequence from start of a digital broadcast service to metering of charge.
Figure 44:
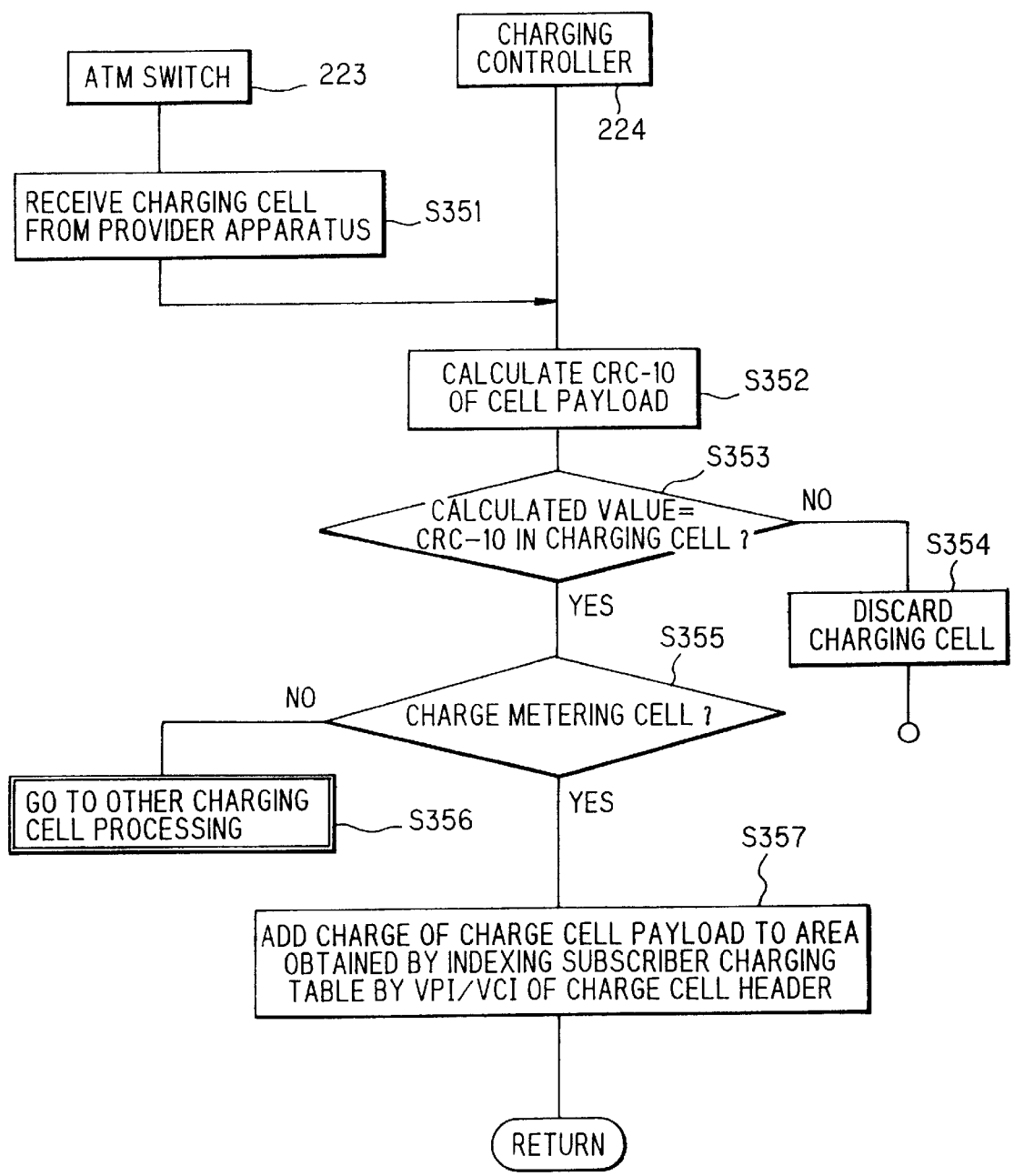
FIG. 44 is a flowchart of processing for metering charge in the transmission apparatus.

FIG. 43 is a sequence diagram for describing a charge measuring sequence in the transmission apparatus 14, and FIG. 44 is a flowchart of processing for measuring charge in the transmission apparatus.

When the remote controller 16 of the subscriber apparatus 12a is operated to select a prescribed a digital broadcast program, the subscriber apparatus 12a uses the control channel between itself and the provider apparatus to transmit a request for provision of the digital broadcast service. In response to this request, the provider apparatus 11 indicates, to the transmission apparatus 14, a control channel between the transmission apparatus 14 and the subscriber apparatus 12a and requests the connection of this control channel (notification of control-channel routing information in FIG. 43). As a result, the transmission apparatus 14 sets the routing information of the control channel (see FIG. 42).

The subscriber apparatus 12a thenceforth uses the control channel to send the transmission apparatus 14, by means of a cell, the digital-broadcast program number, e.g., program number 5, that has been selected by the remote controller 16. It should be noted that the VPI/VCI of this cell is the control channel VPI/VCI of subscriber 12a.

If this cell is received, the controller in the ATM switch 223 (1) obtains the base-side VPI/VCI conforming to the program number 5 from the program information table 225a (FIG. 28), (2) refers to the subscriber information table 225c (FIG. 30) to obtain the subscriber-side video-channel VPI/VCI corresponding to the control-channel VPI/VCI, and (3) sets the routing information of the video channel for which the subscriber-side video-channel VPI/VCI has been correlated with the base-side VPI/VCI in the routing table 225b. Thereafter, on the basis of the routing information of this video channel, control starts in such a manner that the video cell and charge metering cell of program number 5 sent from the provider apparatus 11 are routed to the subscriber apparatus 12a.

Further, the charging controller 224 starts extracting the charge metering cell for every subscriber-side VPI/VCI set in the routing table. As the result of the foregoing operation, the video cells of program number 5 of the digital broadcast start flowing from the transmission apparatus 14 to the subscriber apparatus 12a and, at the same time, measurement of the charge metering cells starts.

Whenever the charging controller 224 extracts a charge metering cell having the subscriber-side video-channel VPI/VCI of the subscriber apparatus 12a via the ATM switch 223, the charging controller 224 reads the charge regarding this subscriber out of the subscriber information table 225c (FIG. 30), adds the charge (the unit charge) within the charge metering cell to this charge and stores the sum in the subscriber information table 225c. The foregoing operation is then repeated and the charges regarding each of the subscribers are accumulated in the subscriber information table 225c. In other words, upon receiving the charging cell (the fact that this is a charge metering cell is not known) from the provider apparatus 11 via the ATM switch 223 (step S351), the charging controller calculates the CRC of the cell payload (step S352), determines whether the calculated value agrees with the CRC in the charging cell (step S353) and discards the charging cell if the two do not agree (step S354).

If agreement is detected, the charging controller refers to the OAM cell type and OAM function type that have been inserted into the first byte of the payload and determines whether the received cell is a charge metering cell (step S355). If the cell is not a charge metering cell, the charging controller executes other charging processing (step S356). If the cell is a charge metering cell, the charging controller 224 reads the charge for this subscriber out of the subscriber information table 225c (FIG. 30), adds the charge (the unit charge) within the charge metering cell to this charge and stores the sum in the subscriber information table 225c (step S357). The above-described processing is then repeated.

Multicasting

There are occasions where, when a digital broadcast service of program number 5 is thus provided to the subscriber apparatus 12a, a request for provision of the digital broadcast service of program number 5 is sent to the transmission apparatus 14 from another subscriber apparatus 12n via a channel for digital broadcast control. In such case the controller of the ATM switch 223 sets the routing information of the video channel (the corresponding relationship between the base-side VPI/VCI and subscriber-side video-channel VPI/VCI of the subscriber apparatus 12n of program number 5) in the routing table 225b and starts multicasting control in such a manner that a video cell and charge metering cell having the base-side VPI/VCI of program number 5 are routed to the subscriber apparatus 12a, 12n in the same manner as described above. As a result, the video cells of program number 5 of the digital broadcast begin flowing from the transmission apparatus 14 to the subscriber apparatus 12n and measurement of charge starts as well.

Whenever the charging controller 224 of the transmission apparatus 14 extracts a charge metering cell having the subscriber-side video-channel VPI/VCI of the subscriber apparatus 12n, the charging controller 224 reads the charge regarding this subscriber out of the subscriber information table 225c (FIG. 30), adds the charge (the unit charge) within the charge metering cell to this charge and stores the sum in the subscriber information table 225c.

The foregoing multicasting control is then repeated and the charges regarding each of the subscribers 12a, 13n are accumulated in the subscriber information table 225c.

(g) Charge notification processing

Figure 45:
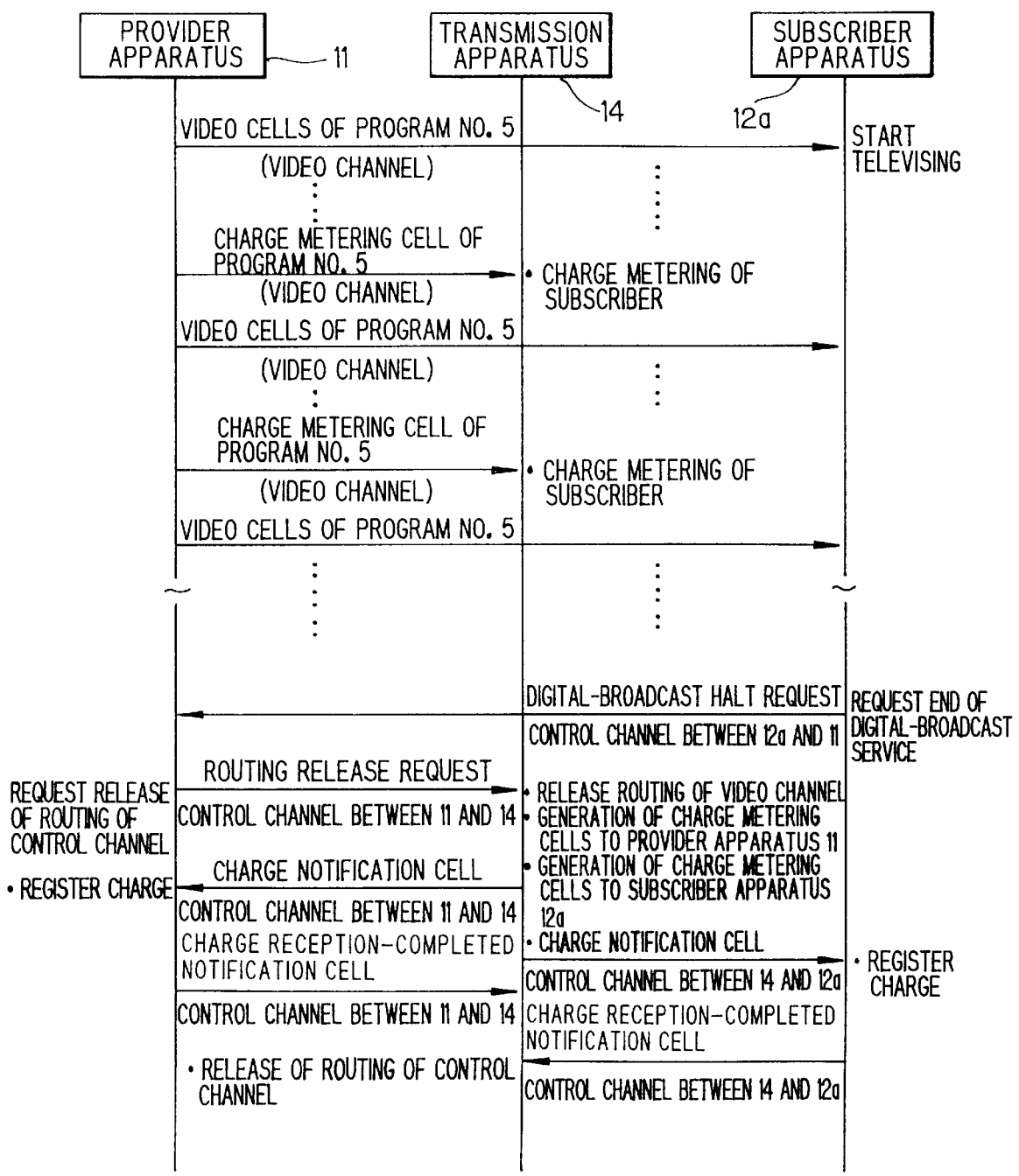
FIG. 45 is a sequence diagram showing a charge notification sequence.
Figure 46:
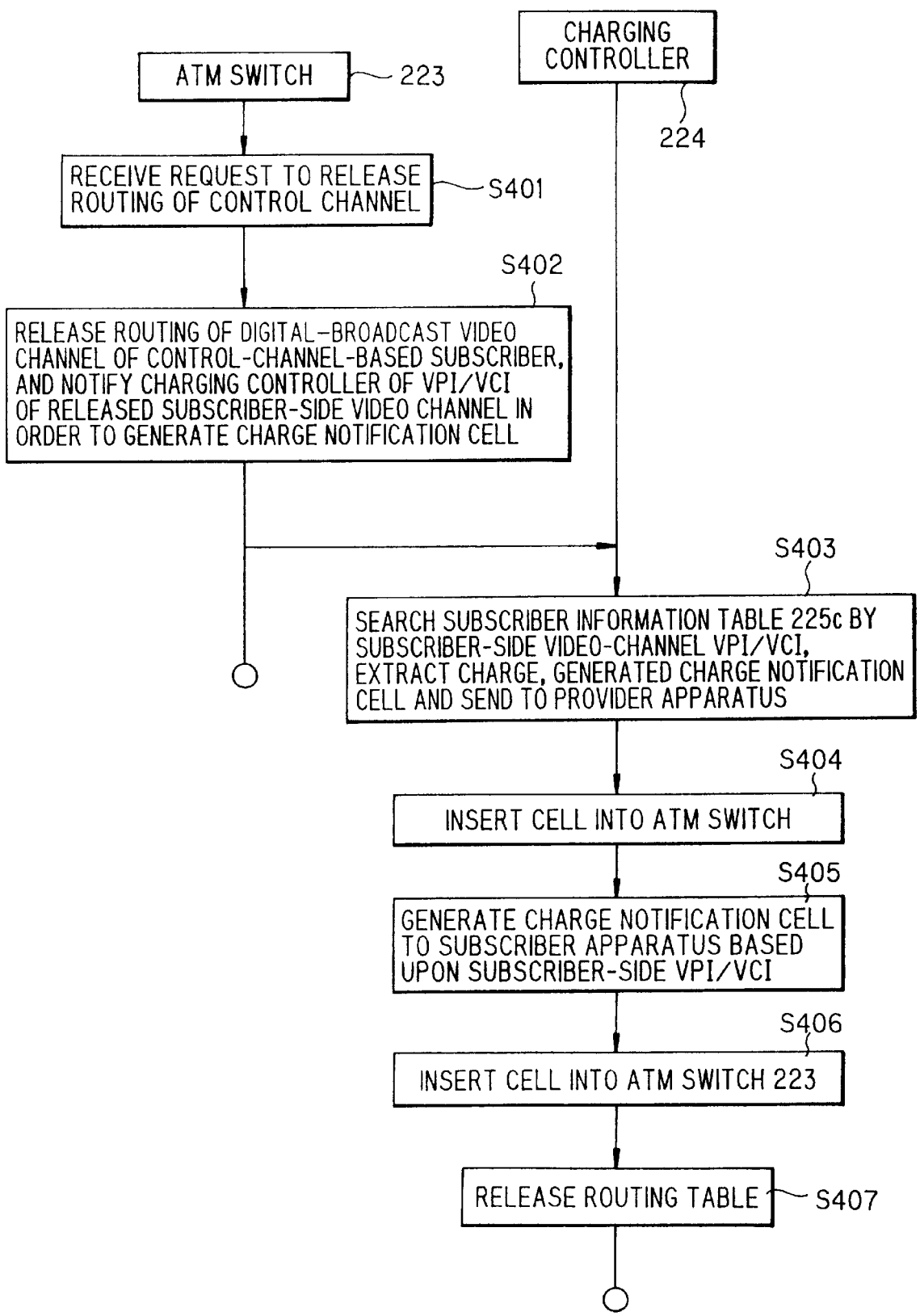
FIG. 46 is a flowchart of processing for generating a charge notification cell in the transmission apparatus.

FIG. 45 is a sequence diagram for describing a charge notification sequence through which the transmission apparatus 14 notifies the provider apparatus 11 of the charge, and FIG. 46 is a flowchart of processing for charge notification.

The provider apparatus 11 transmits the video cell of program number 5 to the subscriber apparatus 12a and transmits the charge metering cell to the transmission apparatus 14, and the transmission apparatus 14 executes charge measurement processing based upon the charge metering cell.

If termination of the digital broadcast service is selected by operating the remote controller under these conditions, the subscriber apparatus 12a uses the control channel between itself and the provider apparatus 11 to send the provider apparatus 11 a request for ending the digital broadcast service. If this request is received, the provider apparatus 11 sends the transmission apparatus 14 a request to release the digital-broadcast control channel between the transmission apparatus 14 and the subscriber apparatus 12a. Upon receiving this request to release the digital-broadcast control channel (step S401), the ATM switch 223 of the transmission apparatus 14 deletes the routing information of the video channel for the cell of program number 5 from the routing table 225b. As a result, the cells of the program number 5 stop flowing into the subscriber apparatus 12a, and so do the charging cells. Consequently, measurement stops as well. Further, the ATM switch 223 instructs the charging controller 224 to generate a charge notification cell in order to notify the provider apparatus 11 and subscriber apparatus 12a of the charge measured by this connection. More specifically, the ATM switch 223 notifies the charging controller 224 of the subscriber-side video-channel VPI/VCI deleted from the routing table 225b and instructs it to generate the charge notification cell (step S402).

On the basis of the subscriber-side video-channel VPI/VCI, the charging controller 224 reads the charge out of the subscriber information table 225c (FIG. 30), generates the charge notification cell (see FIG. 36) (step S403), enters the charge notification cell into the ATM switch 223 and transmits the cell to the provider apparatus 11 (step S404). It should be noted that (1) the sequence number, (2) the subscriber-side video-channel VPI/VCI and (3) the charge are inserted into the payload of the charge notification cell.

If the cell received is the charge notification cell, the ATM controller 122 of the provider apparatus 11 delivers the received charge notification cell to the charging controller 124. The latter goes to the subscriber information table 126b (FIG. 27) to obtain the charge corresponding to the subscriber-side video-channel VPI/VCI contained in the charge notification cell, adds the charge of which it has been notified to this charge and stores the sum in the subscriber information table 126b. The charging controller 124 thenceforth generates the charge reception-completed notification cell, which is obtained by inserting the sequence number contained in the charge notification cell (FIG. 37) into the payload, and transmits this cell to the transmission apparatus 14. As a result of the operation described above, the provider apparatus 11 manages charge on a subscriber by subscriber and makes it possible to charge on a per-subscriber basis.

Next, the charging controller 224 generates the charge notification cell (see FIG. 36) to notify the subscriber apparatus of the charge (step S405), enters this charge notification cell into the ATM switch 223 and transmits the cell to the subscriber apparatus 12a (step S406). If the cell received is the charge notification cell, the ATM controller 322 of the subscriber apparatus 12a delivers the received charge notification cell to the charging controller 324. The latter reads out the charge that has been stored in the charge table 326a, adds the charge of which it has been notified to this charge and stores the sum in the charge table 326a. The charging controller 324 thenceforth generates the charge reception-completed cell and sends this cell to the transmission apparatus 14. The display controller 325 causes the display unit 17 to constantly display the charge that has been stored in the charge table 326a so that the subscriber is capable of ascertaining the charge in real-time.

If the charge reception-completed cell is received from the subscriber apparatus 12a, the ATM switch 223 of the transmission apparatus 14 deletes the routing information of the control channel between the transmission apparatus 14 and the subscriber apparatus 12a from the routing table 225b.

The foregoing is a case in which the charge notification cell is sent from the transmission apparatus 14 to a subscriber apparatus, which proceeds to calculate the charge. However, an arrangement can be adopted in which charge metering cells sent by the provider apparatus 11 are received by the subscriber apparatus and the charge regarding the subscriber apparatus is calculated based upon the number of charge metering cells received.

(h) Sequence numbers

In the second embodiment, the timing at which a charge measured by the transmission apparatus 14 is communicated to the provider apparatus 11 is the end of the digital broadcast. The transmission apparatus 14 generates a charge notification cell to which the VPI/VCI of the control channel between the provider apparatus and transmission apparatus has been attached, and the provider apparatus 11 is informed of the charge by this cell. Thereafter, in order to verify that the provider apparatus 11 has accepted the charge notification cell, the transmission apparatus 14 waits for the charge reception-completed notification cell from the provider apparatus 11. In a case where the charge reception-completed notification cell could not be received upon elapse of a fixed period of time, the transmission apparatus 14 re-sends the charge notification cell.

If a plurality of subscriber apparatus put an end to the digital broadcast simultaneously, the transmission apparatus 14 transmits a plurality of charge notification cells to the provider apparatus 11 and waits for reception of a plurality charge reception-completed notification cells. Under these circumstances, it is required that charge notification cells and charge reception-completed notification cells be correlated. The reason is that when the provider apparatus 11 cannot receive a charge notification cell normally, it cannot tell from which subscriber the charge could not be received. Accordingly, in the present invention, a sequence number is inserted into each cell in order to establish correspondence between the charge notification cells and charge reception-completed notification cells.

(i) Measurement of charge in VC group units, VP units and VP group units

Figure 47:
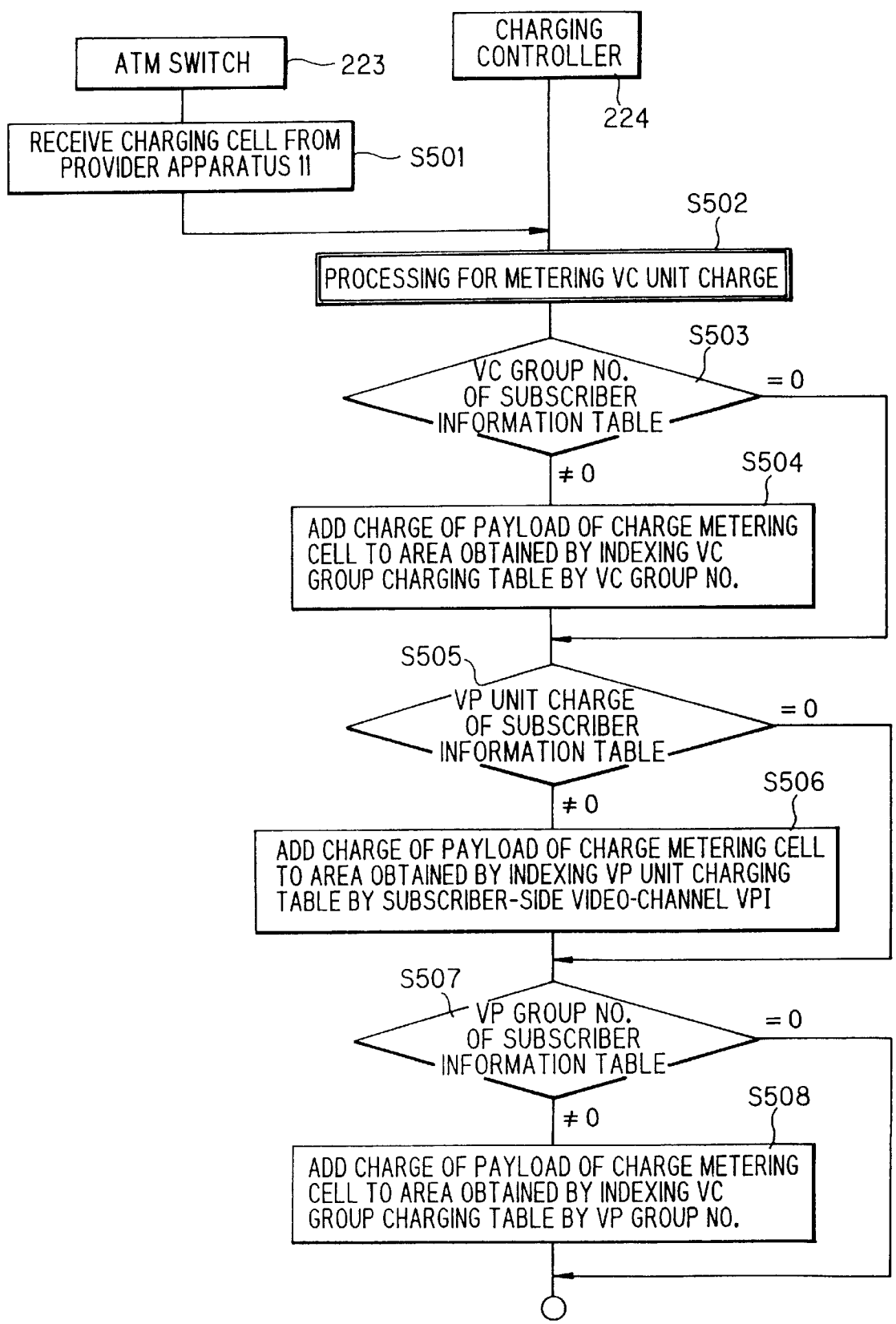
FIG. 47 is a flowchart of processing for metering charge in VC group units, VP units and VP group units in the transmission apparatus.

FIG. 47 is a flowchart of processing for measuring charge in VC group units, VP units and VP group units.

Measurement of charge in VC group units

In a case where a plurality of subscriber apparatus are located in one household, measurement of charge on a per-household basis is appropriate. In order to accomplish this, a plurality of subscriber apparatus are grouped according to the VC of the subscriber-side video channel and the charging cells are counted. A method of performing this will now be described (see FIG. 47).

A method of measuring charge by VC unit (subscriber unit) has been described with reference to the sequence diagram of FIG. 43 and the flowchart of FIG. 44. The charge on the per-VC basis is added to the charge in the subscriber information table 225c (FIG. 30) to update the same (steps S501~S502), after which the charging controller 224 checks the VC group number that has been stored in the VC group area of the subscriber information table 225c (step S503). If the VC group number is other than 0, charge measurement by VC group is requested. Accordingly, the charging controller 224 reads the charge conforming to this VC group number out of the VC group charging table 225d, adds the charge contained in the payload of the charge metering cell to this charge to update the same and stores the updated charge again in the original area of the VC group charging table 225d (step S504). As a result of these operations, the charges regarding a plurality of subscriber apparatus assembled as a VC group are calculated are stored in the VC group charging table 225d. This makes it possible to charge on a per-VC group basis.

Measurement of charge in VP units

If a service is provided upon making the values of VP regarding a plurality of subscriber apparatus the same value in a case where a plurality of subscriber apparatus are located in one household, measurement of charge on a per-VP basis is sought. In order to accomplish this, measurement of charge on a per-household basis is appropriate. In order to accomplish this, a plurality of subscriber apparatus are grouped according to the VP of the subscriber-side video channel and the charging cells are counted on a per-VP basis. A method of performing this will now be described (see FIG. 47).

After the processing of step S504 (FIG. 47) is executed or in a case where the VC group number is found to be 0 at step S503, the charging controller 224 checks the VP unit charge indicator that has been stored in the VP unit charging area of the subscriber information table 225c (step S505). In a case where the value of the VP unit charge indicator is 1, charge measurement in by VP is requested. Accordingly, the charging controller 224 reads the charge conforming to this subscriber-side video-channel VPI out of the VP unit charge table 225e, adds the charge contained in the payload of the charge metering cell to this charge to update the same and stores the updated charge again in the original area of the VP unit charge table 225e (step S506). As a result of these operations, the charges regarding a plurality of subscriber apparatus having the same VPI are calculated are stored in the VP unit charge table 225e. This makes it possible to charge on a per-VPI group basis.

Measurement of charge in VP group units

In a case where a plurality of subscriber apparatus are located in one household, measurement of charge on a per-household basis is appropriate. In order to accomplish this, a plurality of subscriber apparatus are grouped according to the VC of the subscriber-side video channel and the charging cells are counted. A method of performing this will now be described (see FIG. 47).

After the processing of step S506 is executed or in a case where the VP unit charge indicator is found to be 0 at step S505, the charging controller 224 checks the VP group number that has been stored in the VP group area of the subscriber information table 225c (step S507). If the VP group number is other than 0, charge measurement by VC group is requested. Accordingly, the charging controller 224 reads the charge conforming to this VP group number out of the VP group charging table 225f, adds the charge contained in the payload of the charge metering cell to this charge to update the same and stores the updated charge again in the original area of the VP group charging table 225f (step S508). As a result of these operations, the charges regarding a plurality of subscriber apparatus assembled as a VP group are calculated and stored in the VP group charging table 225f. This makes it possible to charge on a per-VP group basis.

(j) Charge notification processing at reception of charge notification request

Figure 48:
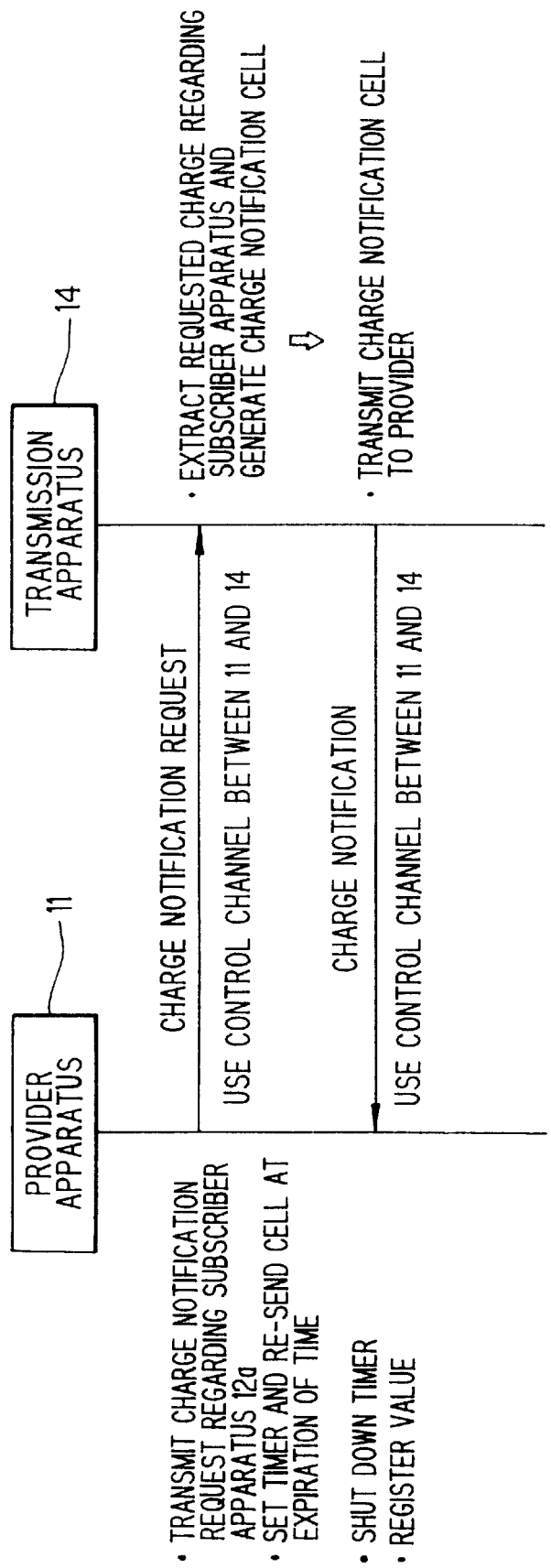
FIG. 48 is a sequence diagram showing a charge notification sequence when a charge notification request is received.
Figure 49:
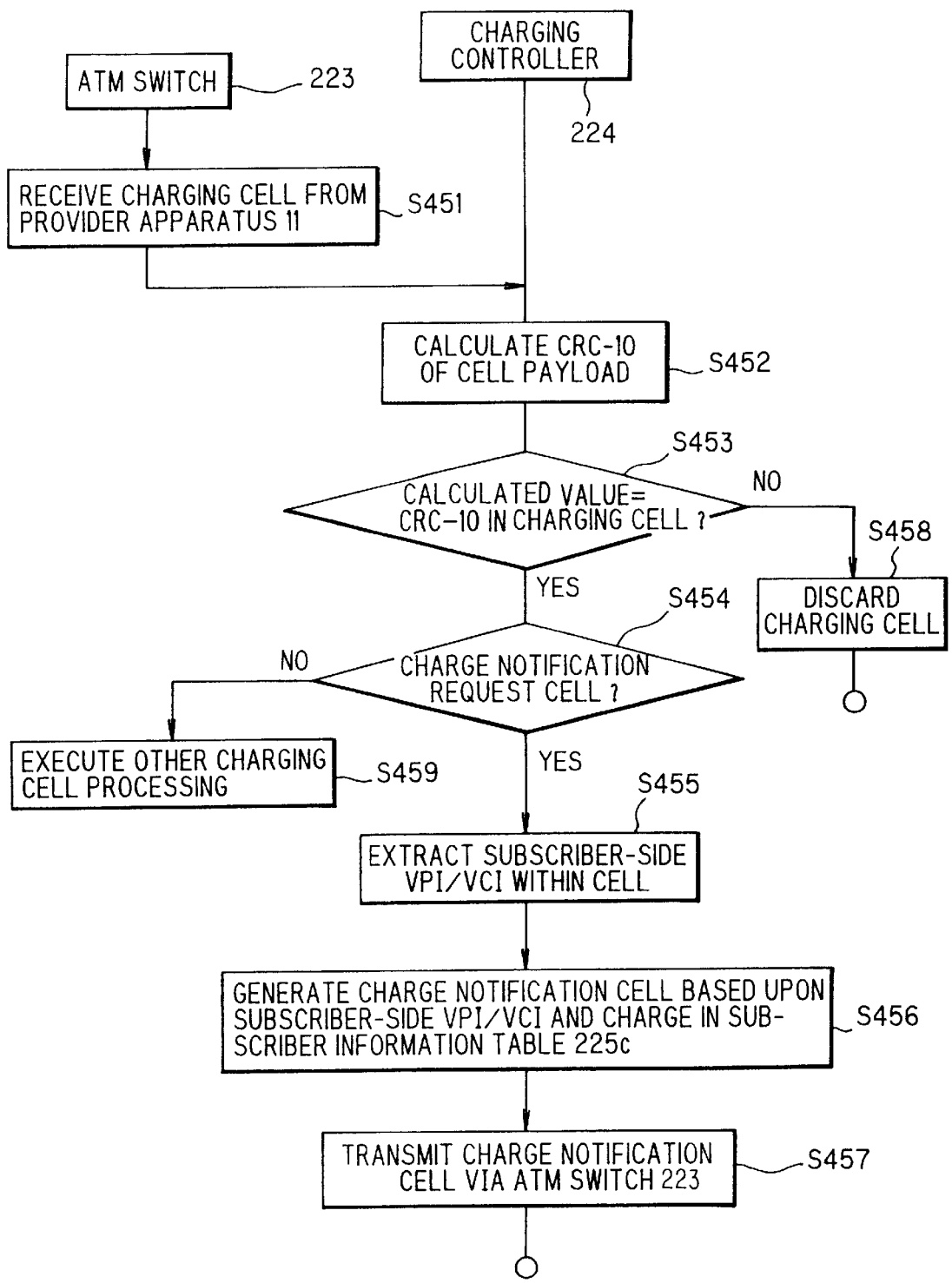
FIG. 49 is a flowchart of charge notification processing in response to a charge notification request.

FIG. 48 is a diagram for describing a charge notification sequence when a charge notification request is received, and FIG. 49 is a flowchart of charge notification processing when the charge notification request is received.

The charging controller 124 of the provider apparatus 11 generates the charge notification request cell (FIG. 38) for requesting the charge regarding the subscriber apparatus 12a and sends this cell to the transmission apparatus 14 via the ATM controller 122 using the control channel between the provider apparatus 11 and the transmission apparatus 14. Further, the charging controller 124 starts a timer to determine whether the charge notification cell is received within a predetermined period of time.

The ATM switch 223 of the transmission apparatus 14 extracts a charging cell (whether this cell is the charge notification request cell is unknown) and notifies the charging controller 224 of the content of the charging cell received (step S451). The charging controller 224 searches the content of the charging cell received and, if the calculated CRC matches the CRC within the charging cell (steps S452~S453) and this cell is the charge notification request cell (step S454), then the charging controller 224 extracts the charge conforming to the subscriber-side VPI/VCI values within the cell from the subscriber information table 225c, generates the charge notification cell (FIG. 36) on the basis of the subscriber-side VPI/VCI values and charge value (steps S455~S456) and sends this charge notification cell to the provider apparatus 11 via the ATM switch 223 using the control channel between the provider apparatus 11 and the transmission apparatus 14 (step S457). If the CRCs do not match, the cell is discarded (step S458). If the cell is not the cell notification request cell, then other processing is executed (step S459).

If the charge notification cell is received, the charging controller 124 of the provider apparatus 11 shuts down the timer and updates the charge due form the subscriber. If the charge notification cell is not received within the set time period, the charge notification request cell is transmitted again.

(D) Third Embodiment

Figure 50:
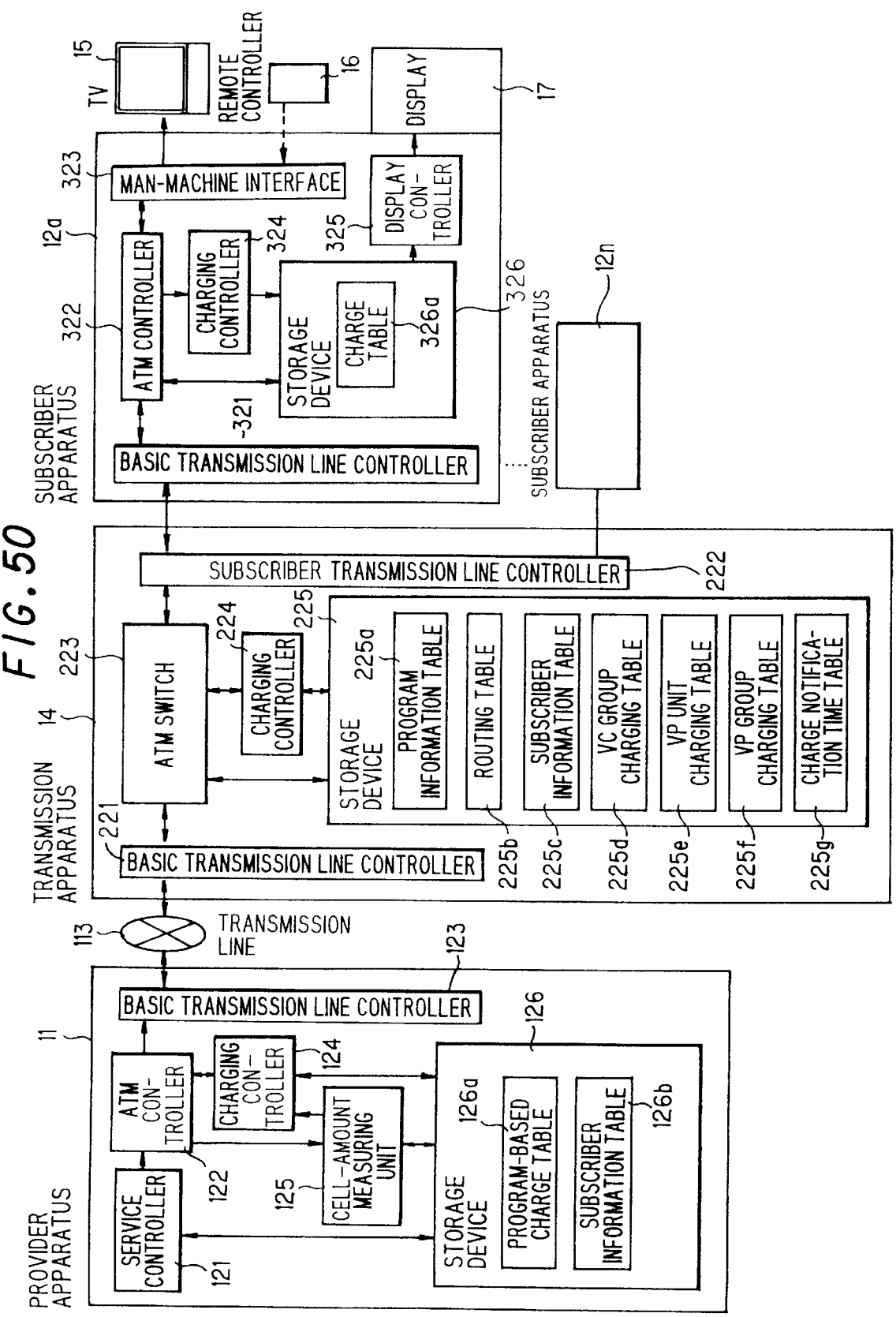
FIG. 50 is a block diagram illustrating an additional-service communication system according to a third embodiment of the present invention.

FIG. 50 is a block diagram illustrating an additional-service communication system according to a third embodiment of the present invention. In the second embodiment described above, the provider apparatus or each subscriber apparatus is notified of the charge value of the subscriber, which has been calculated by the transmission apparatus, by means of the charge notification cell at the end of the digital broadcast service (at the end of the connection) or when notification has been requested. In the third embodiment described below, the charge values due from all of the subscriber apparatus are transmitted to the provider apparatus when the charge notification time arrives.

Elements in FIG. 50 identical with those of the second embodiment shown in FIG. 25 are designated by like reference characters. The third embodiment differs from the second embodiment in that the storage device 225 of the transmission apparatus 14 is newly provided with a charge notification time table 225g for registering the time at which the provider apparatus 11 is to be notified of the charge. As shown in FIG. 51, the charge notification time table 225g has date, hour and minute rows. The transmission apparatus 14 transmits the charges of all subscriber apparatus to the provider apparatus 11 by charge notification cells at the time designated by the hour and minute rows every day if the day row is 0 and or on any of the first through 31st days of the month every month if the day row is 1~31.

Figure 52:
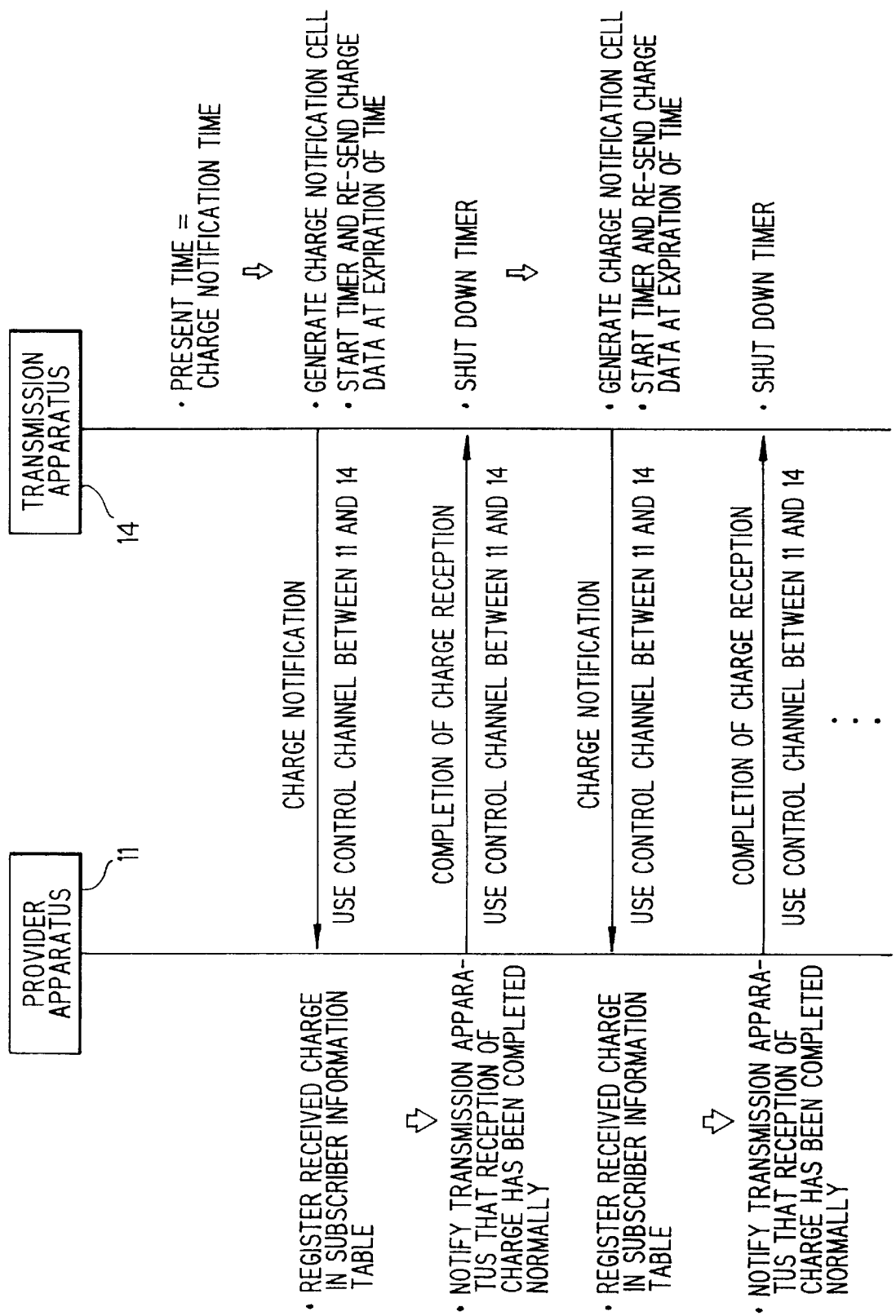
FIG. 52 is a sequence diagram showing a charge notification sequence according to the third embodiment.
Figure 53:
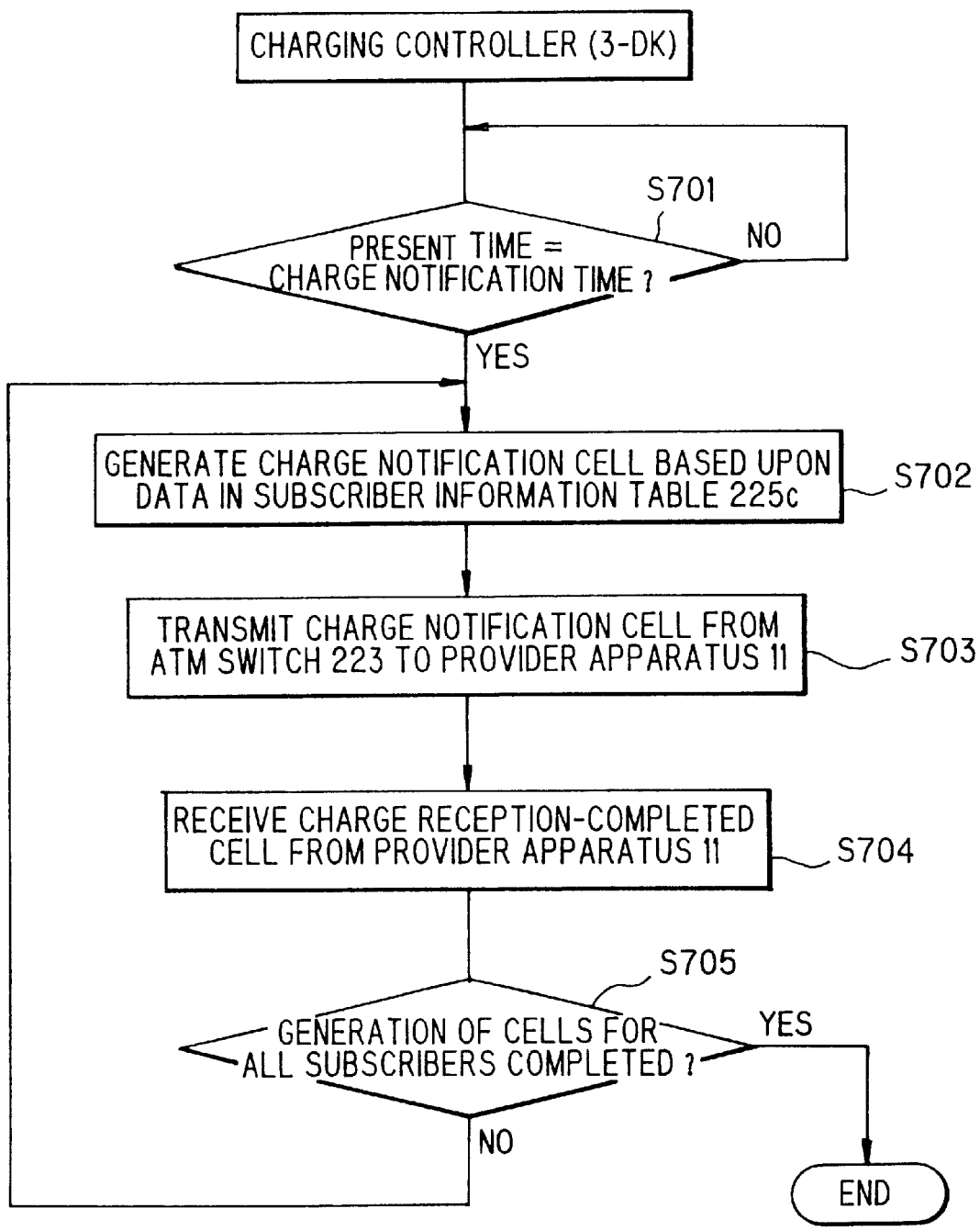
FIG. 53 is a flowchart of processing through which the transmission apparatus periodically notifies the provider apparatus of the charge.

FIG. 52 is a diagram for describing the sequence of the third embodiment, and FIG. 53 is a flowchart of processing for charge notification performed by the transmission apparatus according to the third embodiment.

The method of measuring charge per subscriber apparatus in the transmission apparatus 14 is similar to that illustrated in the second embodiment.

The charging controller 224 of the transmission apparatus 14 constantly performs monitoring to determine whether the present time is the time that has been set in the charge notification time table 225g (step S701). When the present time is the set time, the charging controller 224 refers to the subscriber information table 225c, generates the charge notification cell (step S702) and transmits the charge notification cell to the provider apparatus 11 using the control channel between the provider apparatus 11 and the transmission apparatus 14 (step S703). Further, the charging controller 224 starts a timer and performs monitoring to determine whether the charge reception-completed notification cell is received within a predetermined period of time. The provider apparatus 11 updates the charge for each subscriber apparatus through a method similar to that of the second embodiment and transmits the charge reception-completed notification cell to the transmission apparatus.

If the charge reception-completed notification cell is received via the ATM switch 223 (step S704), the charging controller 224 of the transmission apparatus 14 shuts down the timer and thenceforth determines whether charges of a number equivalent to the total number of subscriber apparatus have been transmitted (step S705). If these are not received, then the charging controller 224 repeats the processing from step S702 onward to send the provider apparatus 11 the charges regarding all of the subscriber apparatus. If the charge reception-completed notification cell is not received within the set period of time, the charging controller 224 sends the charge notification cell again.

(E) Fourth Embodiment

Figure 54:
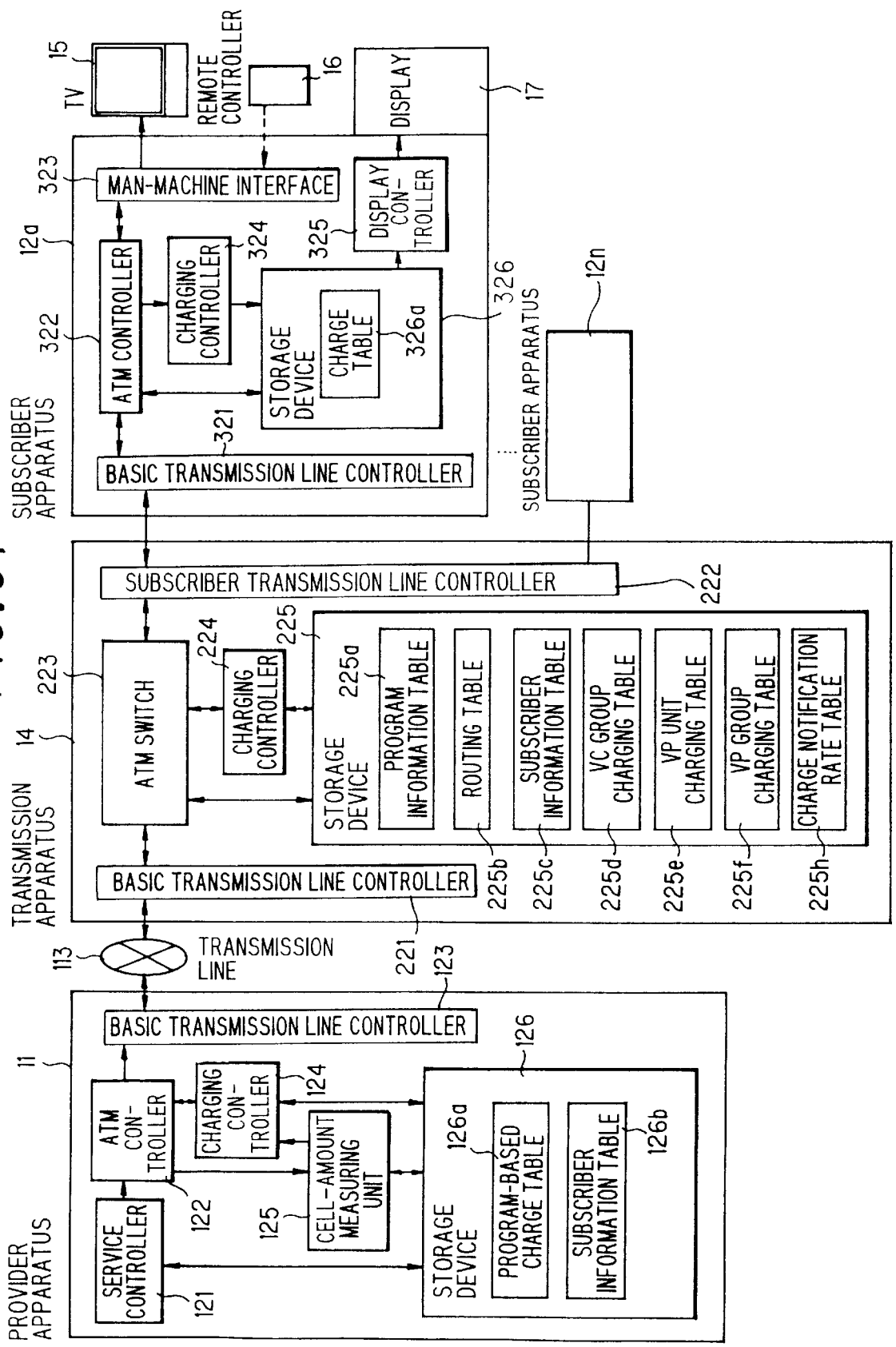
FIG. 54 is a block diagram illustrating an additional-service communication system according to a fourth embodiment of the present invention.

FIG. 54 is a block diagram illustrating an additional-service communication system according to a fourth embodiment of the present invention. In the second embodiment described above, the provider apparatus or each subscriber apparatus is notified of the charge value of the subscriber, which has been calculated by the transmission apparatus, by means of the charge notification cell at the end of the digital broadcast service (at the end of the connection) or when notification has been requested. In the fourth embodiment described below, the charge notification cell is transmitted to the provider apparatus whenever the charge regarding a subscriber attains a set fee.

Elements in FIG. 54 identical with those of the second embodiment shown in FIG. 25 are designated by like reference characters. The fourth embodiment differs from the second embodiment in that the storage device 225 of the transmission apparatus 14 is newly provided with a charge notification fee table 225h. As shown in FIG. 55, a notification fee (charge) is registered in the charge notification fee table 225h. When the charge regarding each subscriber apparatus attains the notification fee, the transmission apparatus 14 generates the charge notification cell and transmits the cell to the provider apparatus 11.

Figure 56:
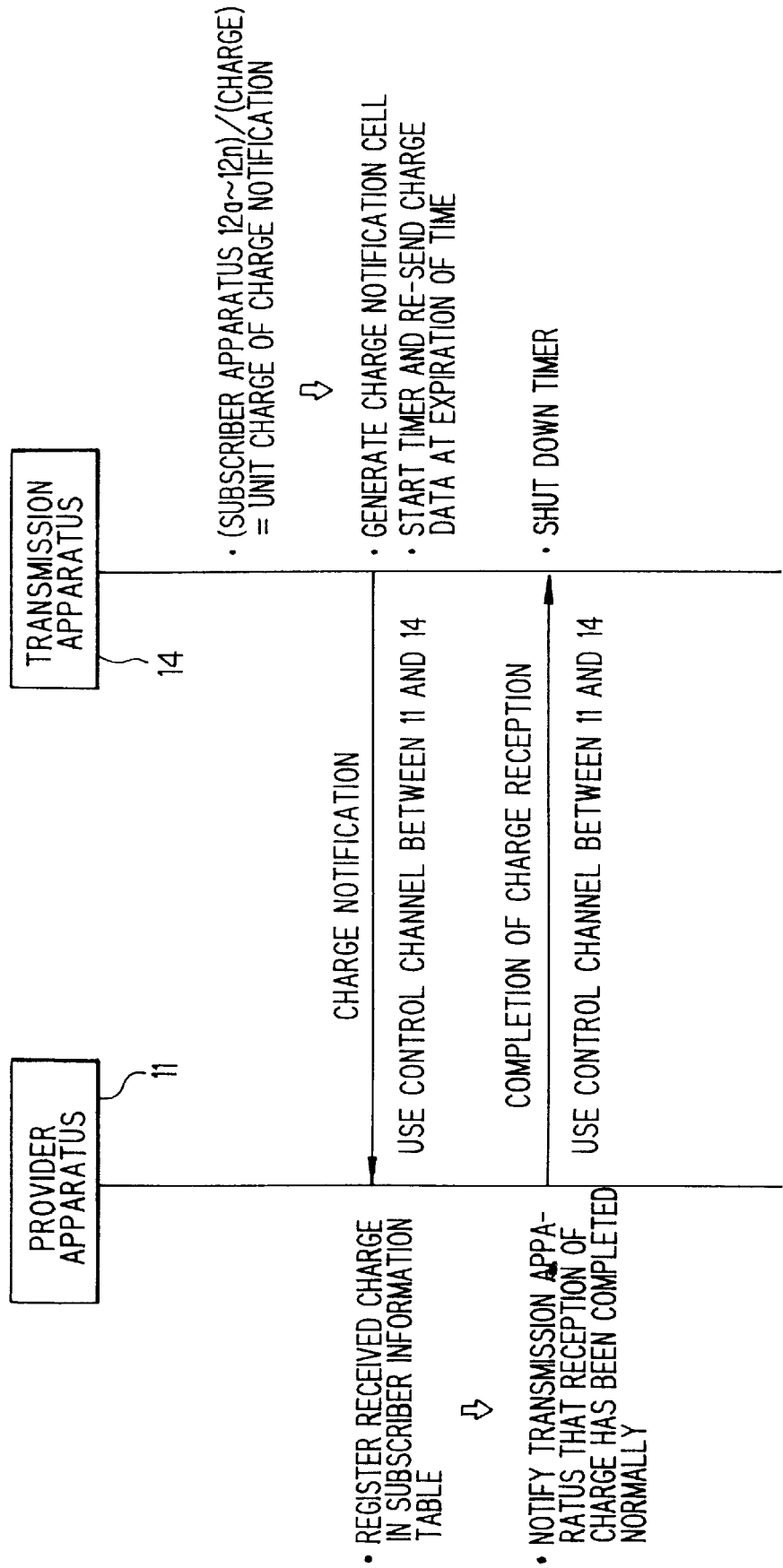
FIG. 56 is a sequence diagram showing a sequence through which the transmission apparatus notifies the provider apparatus of the charge whenever a fixed rate is exceeded.
Figure 57:
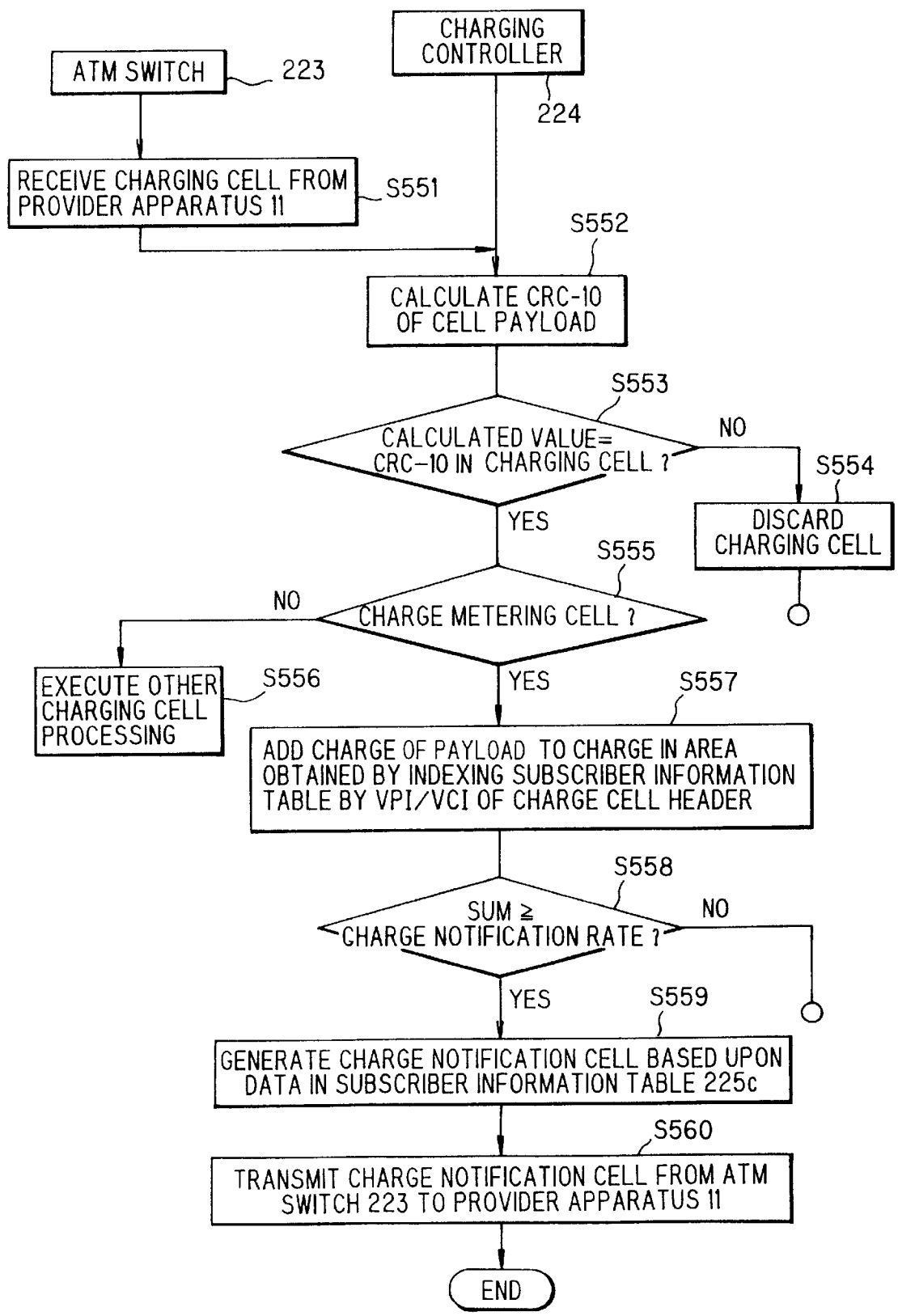
FIG. 57 is a flowchart of processing through which the transmission apparatus notifies the provider apparatus of the charge whenever a fixed rate is exceeded.

FIG. 56 is a diagram for describing the sequence of the third embodiment, and FIG. 57 is a flowchart of processing for charge notification performed by the transmission apparatus according to the fourth embodiment.

The method of measuring charge per subscriber apparatus in the transmission apparatus 14 is similar to that illustrated in the second embodiment.

Upon receiving a charging cell (whether this cell is a charge metering cell is unknown) from the provider apparatus 11 via the ATM switch 223 (step S551), the charging controller 224 of the transmission apparatus 14 calculates the CRC of the cell payload (step S552) and determines whether the charge coincides with the CRC within the charging cell (step S553). If the two do not match, the charging controller 224 discards the charging cell (step S554). If matching is achieved, however, the charging controller 224 refers to the OAM cell type and OAM function type that have been inserted into the first byte of the payload and determines whether the received cell is the charge metering cell (step S555). If the cell is not the charge metering cell, other charging cell processing is executed (step S556). If the cell is the charge metering cell, then the charging controller 224 reads the charge conforming to the subscriber-side video-channel VPI/VCI in the header of this cell out of the subscriber information table 225c (FIG. 30), adds the charge within the charge metering cell to this charge and stores the sum in the subscriber information table 225c (step S557).

Next, the charging controller 224 determines whether the sum exceeds the charge notification fee (step S558). If the charge notification fee has not been exceeded, the charging controller 224 waits for reception of the next charge metering cell. If the charge notification feed has been exceeded, the charging controller 224 refers to the subscriber information table 225c, generates the charge notification cell (FIG. 36) (step S559) and transmits the charge notification cell to the provider apparatus 11 via the ATM switch 223 using the control channel between the provider apparatus and the transmission apparatus. Processing performed by the provider apparatus to receive the charge notification cell is similar to that of the second embodiment.

(F) Fifth Embodiment

Figure 58:
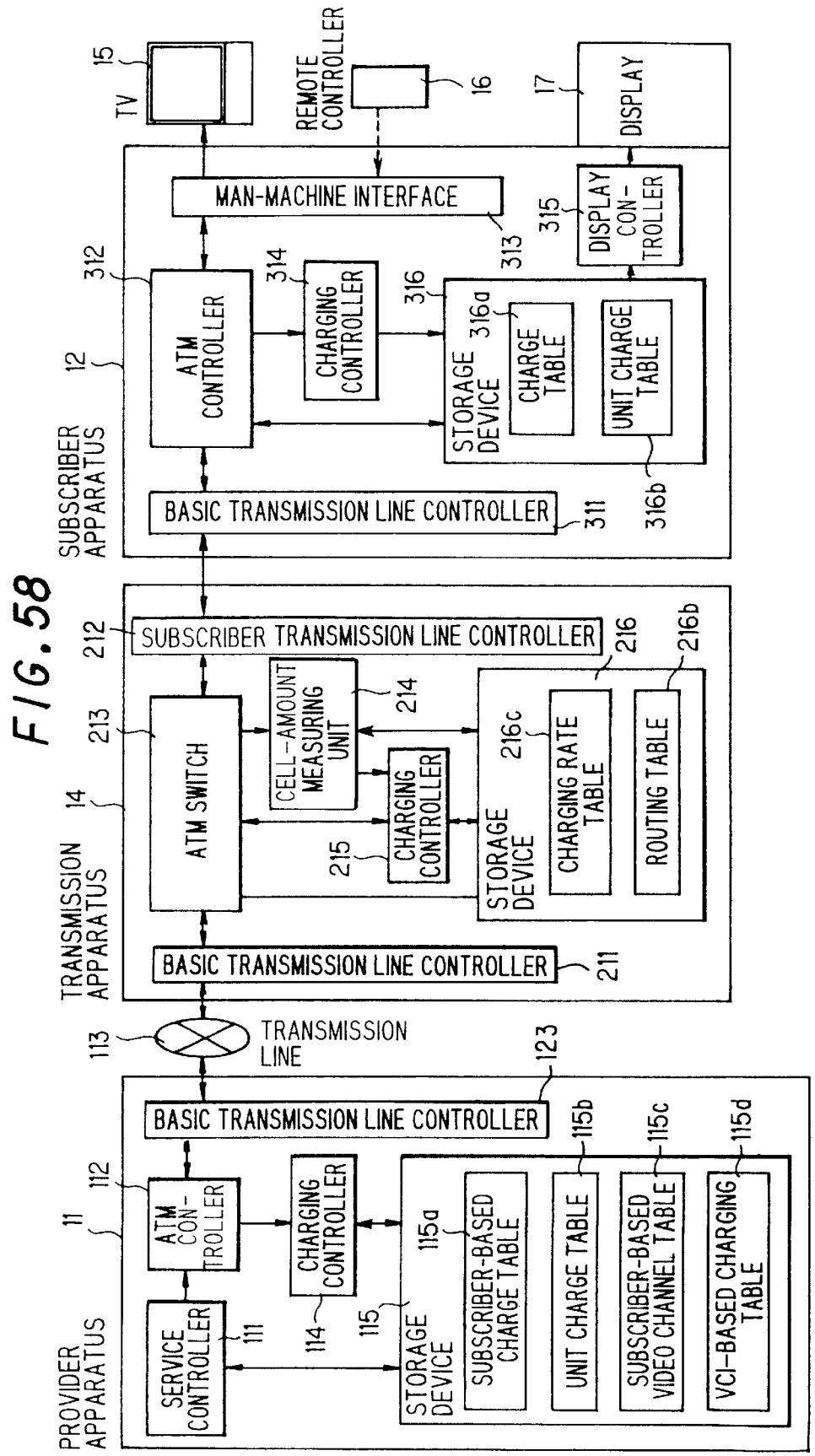
FIG. 58 is a block diagram illustrating an additional-service communication system according to a fifth embodiment of the present invention.

FIG. 58 is a block diagram illustrating an additional-service communication system according to a fifth embodiment of the present invention.

In the first embodiment, the transmission apparatus 14 (FIG. 4) is provided with the charging database (the VCI-based charging table 216a for registering the charging method and unit usage, etc.), the charging controller 215 of the transmission apparatus 14 generates the charge metering cells in accordance with this charging database and transmits the cells to the provider apparatus 11 and subscriber apparatus 12a~12n, and the provider apparatus and subscriber apparatus calculate and store the charge regarding each subscriber based upon the charge metering cells.

In the fifth embodiment, the provider apparatus 11 is provided with the charging database (the VCI-based charging table), the provider apparatus notifies the transmission apparatus 14 of the charging rate, per each service request from the subscriber apparatus, in accordance with the charging database, and the transmission apparatus generates the charge metering cells in accordance with the charging rate of which it has been notified and transmits these cells to the provider apparatus 11 and subscriber apparatus 12a~12n.

Elements in FIG. 58 identical with those of the first embodiment shown in FIG. 4 are designated by like reference characters. The fifth embodiment differs from the first embodiment in that:

(1) the provider apparatus 11 is provided with a VCI-based charging table 115d and the transmission apparatus 14 is not provided with the VCI-based charging table; and (2) The transmission apparatus 14 is provided with a charging rate table 216c for storing the charging method and unit usage for a video source provided by the provider apparatus 11.

Figure 59:
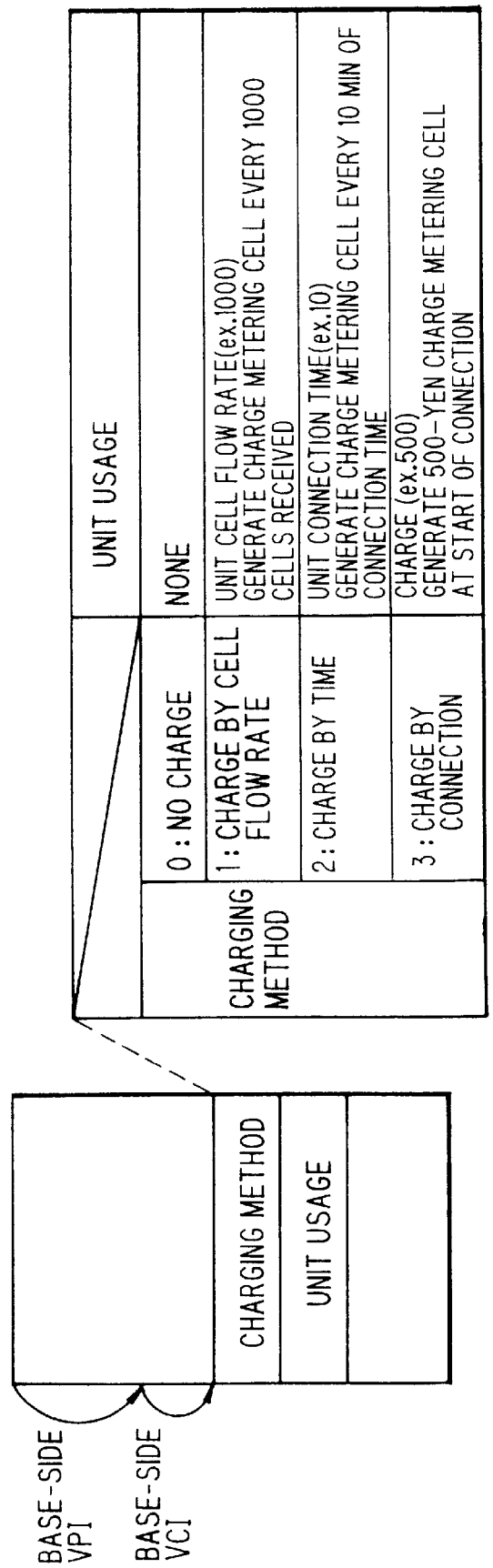
FIG. 59 is a diagram illustrating the content of a VCI-based charging table constituting a charging database in the provider apparatus.

FIG. 59 is a diagram illustrating the content of the VCI-based charging table 115d constituting the charging database provided in the provider apparatus 11. The table is so constructed that charging method and unit usage in accordance with the base-side VPI/VCI (video source) can be extracted from the table by indexing the table according to the base-side VPI/VCI of the video source. Methods of charging include (1) collecting no charge, (2) charging by cell flow rate, (3) charging by service provision time and (4) charging by connection. Unit metering for generating one charge metering cell is stipulated in conformity with the charging method. The stipulations in the table of FIG. 59 are such that one charge metering cell is generated whenever 1000 cells are received in the method of charging by cell flow rate, one charge metering cell is generated every ten minutes in the method of charging by service provision time, and a 500-yen charge metering cell is generated whenever a connection starts in the method of charging by connection.

Figure 60:
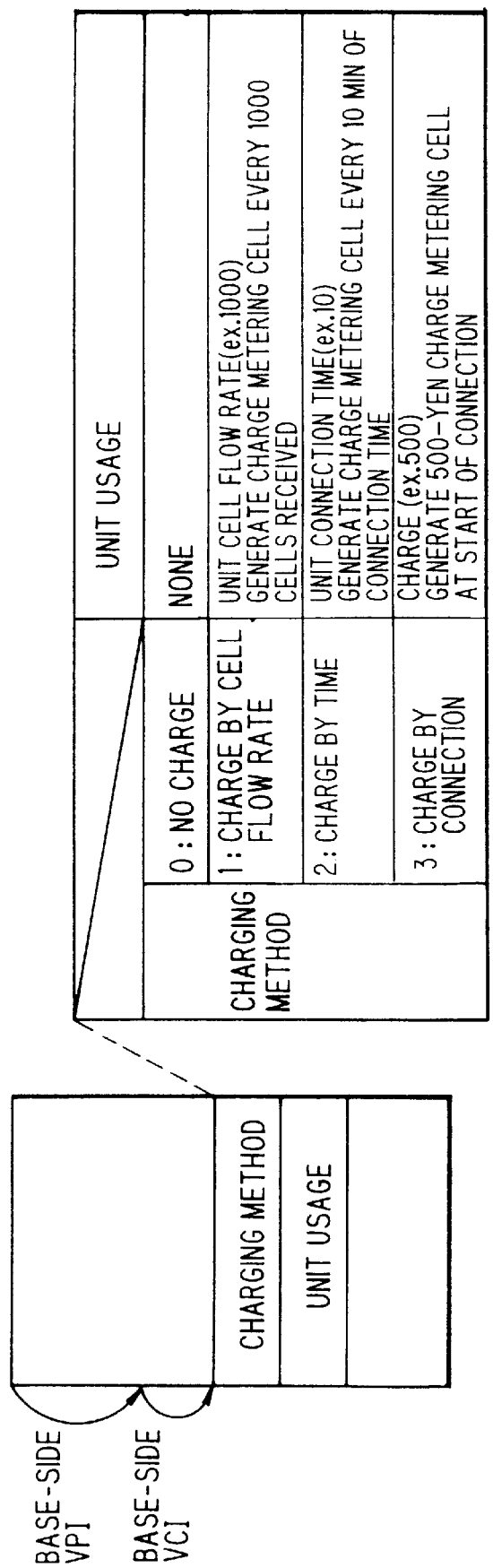
FIG. 60 is a diagram illustrating the content of a charging rate table in the transmission apparatus.

FIG. 60 shows the content of the charging rate table 216c needed to generate the charge metering cells in the transmission apparatus 14. The charging rate table 216c is created using the base-side VPI/VCI, charging method and unit usage contained in the charging database notification cell sent from the provider apparatus 11 whenever there is a request from the subscriber apparatus for service. In FIG. 60, it may appear that a plurality of charging methods have been stored in correspondence with the base-side VPI/VCI. In actuality, however, only one set of a charging method and unit usage have been stored.

The charging controller 214 of the transmission apparatus 14 refers to the charging rate table 216c, obtains the charging method and unit usage conforming to the base-side VPI/VCI of the video source provided by the provider apparatus 11 and generates charge metering cells based upon this charging method and unit usage.

Figure 61:
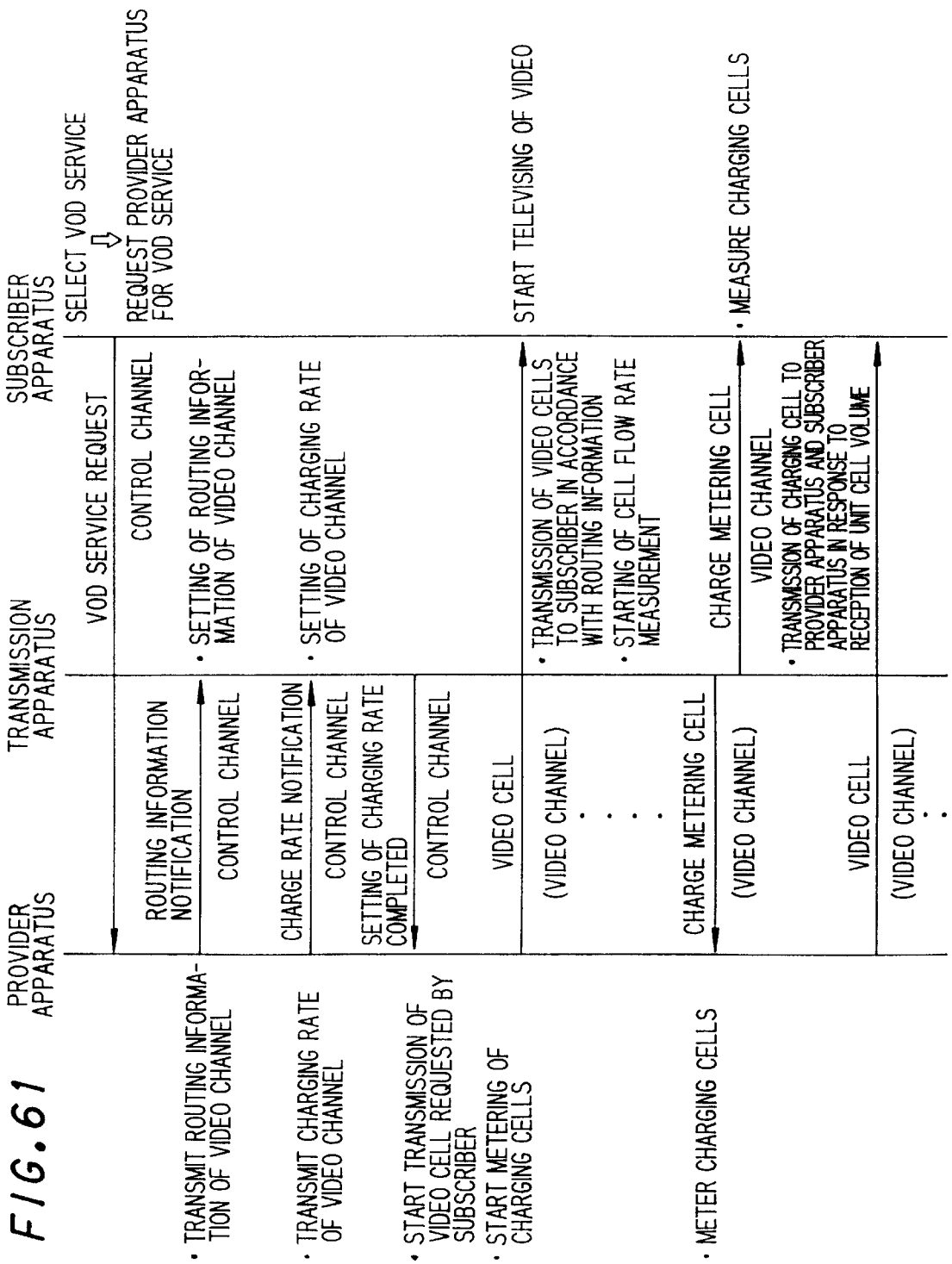
FIG. 61 is a sequence diagram showing a sequence for setting charging rate.
Figure 62:
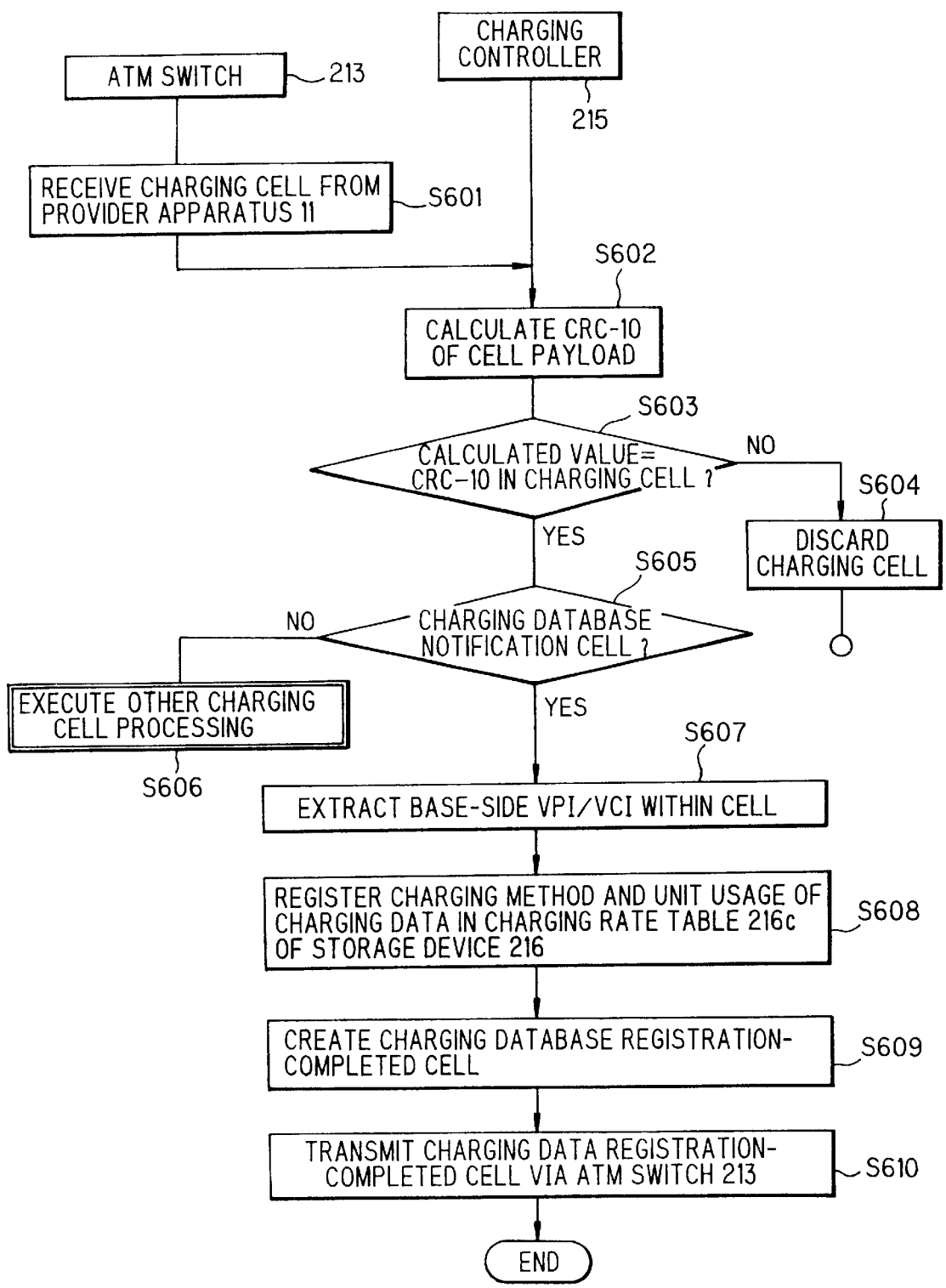
FIG. 62 is a flowchart of processing for setting charging rate.
Figure 63:
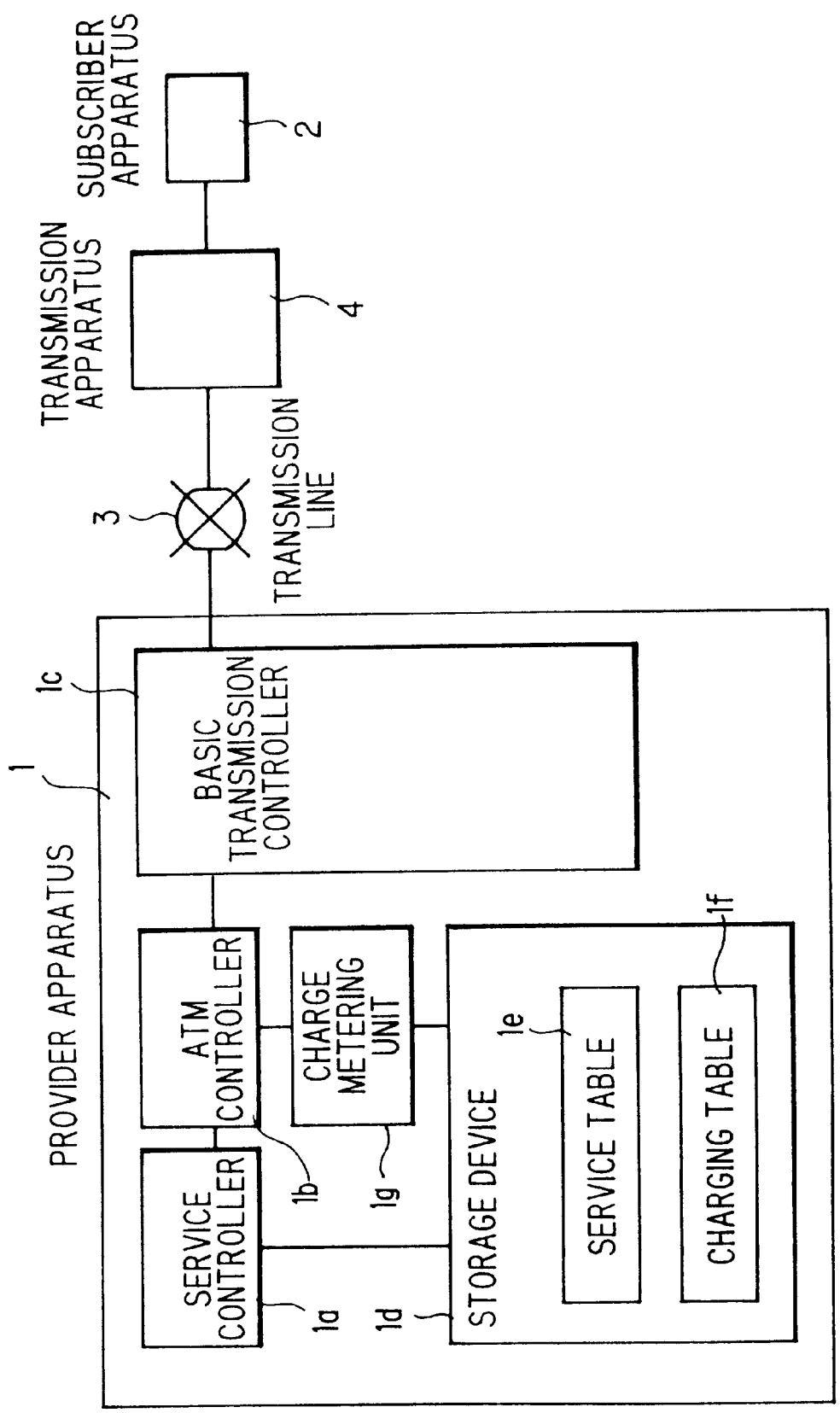
FIG. 63 is a diagram for describing a charging method according to the prior art.

FIG. 61 is a diagram for describing the sequence for setting the charging rate, and FIG. 62 is a flowchart of processing for setting the charging rate.

If the VOD service is selected by operating the remote controller 16, the subscriber apparatus 12 uses the control channel between itself and the provider apparatus 11 to send the provider apparatus 11 a request (video ID, subscriber address, etc.) for the VOD service via the transmission apparatus 14.

Upon receiving the VOD service request, the provider apparatus 11 refers to the subscriber-based video channel table 115c (FIG. 10) to obtain the subscriber-side VPI/VCI, obtains the base-side VPI/VCI conforming to the video ID and creates routing information. Next, the provider apparatus 11 uses the control channel between itself and the transmission apparatus 14 to transmit the routing information to the transmission apparatus 14 accommodating the subscriber apparatus 12 and decides the path between the provider apparatus 11 and the subscriber apparatus 12. The routing information includes the corresponding relationship between the base-side VPI/VCI and subscriber-side VPI/VCI, and the transmission apparatus 14 stores this routing information in the routing table 216b of the storage device 216.

After the routing information is transmitted, the charging controller 114 of the provider apparatus 11 refers to the VCI-based charging table 115d and extracts the charging method and unit usage conforming to the base-side VPI/VCI of the video source (video ID) for which there was a request from the subscriber apparatus 12. Next, the charging controller 114 generates the charging database notification cell (see FIG. 13) using the base-side VPI/VCI, charging method and unit usage of the video source (video ID) and transmits this cell to the transmission apparatus 14 via the ATM controller 112 using the control channel between the provider apparatus and the transmission apparatus.

Upon receiving the charging cell (whether this cell is the charging database notification cell is unknown) via the ATM switch 213 (step S601), the charging controller 215 of the transmission apparatus 14 calculates the CRC of the cell payload (step S602) and determines whether the charge coincides with the CRC in the charging cell (step S603). If the two do not match, the charging controller discards the charging cell (step S604). If matching is achieved, the charging controller 114 refers to the OAM cell type and OAM function type that have been inserted into the first byte of the payload and determines whether the received cell is the charging database notification cell (step S605). If the cell is not the charging database notification cell, the charging controller executes other charging processing (step S606). If the cell is the charging database notification cell, then the charging controller extracts the base-side video-channel VPI/VCI contained in the cell (step S607) and sets the charging method and unit usage contained in the charging database notification cell in an area obtained by indexing the charging rate table 216c by the base-side VPI/VCI values (step S608). The charging controller 215 thenceforth generates the charging database registration-completed cell (see FIG. 14) (step S609) and transmits this cell to the provider apparatus 11 via the ATM switch 213 (step S610).

After the charging database registration-completed cell is received, the provider apparatus 11 starts the flow of cells for video specified by the subscriber apparatus 12. The basic transmission line controller 211 of the transmission apparatus 14 accommodating the subscriber apparatus 12 executes transmission frame termination processing (processing for separating ATM cells from the transmission frame) and the ATM switch 213 refers to the routing table 216b to replace the base-side VPI/VCI of the video cell by the subscriber-side VPI/VCI and performs the routing of this cell. For every subscriber-sides VPI/VCI that has been set in the routing table 216b, the cell-amount measuring unit 214 measures the cell usage that is in accordance with the charging method that has been registered in the charging rate table 216c.

In a case where the cell flow rate charging method has been registered in the charging rate table 216c as the charging method, the cell-amount measuring unit 214 notifies the charging controller 215 of the subscriber-side VPI/VCI values and requests generation of the charge metering cell whenever cells of an amount corresponding to the unit cell flow rate registered in the charging rate table 216c are measured. In a case where the time charging method has been registered in the charging rate table 216c as the charging method, the cell-amount measuring unit 214 notifies the charging controller 215 of the subscriber-side VPI/VCI values and requests generation of the charge metering cell whenever the prescribed unit connection time registered in the charging rate table 216c elapses. In a case where the connection charging method has been registered in the charging rate table 216c as the charging method, the cell-amount measuring unit 214 notifies the charging controller 215 of the subscriber-side VPI/VCI values and requests generation of the charge metering cell only when the initial cell of the cells of interest is measured.

The charging controller 215 refers to the routing table 216b using the subscriber-side VPI/VCI values sent from the cell-amount measuring unit 214 and extracts the base-side VPI/VCI from the table. Next, the charging controller 215 generates the charge metering cell (FIG. 15), which is sent to the provider apparatus 11, based upon the base-side VPI/VCI and subscriber-side VPI/VCI and transmits the charge metering cell to the provider apparatus 11 via the ATM switch 213. If the charge metering cell is received, then the charging controller 114 of the provider apparatus 11 refers to the subscriber-based video channel table 115 (FIG. 10) to obtain the subscriber address that conforms to the subscriber-side video-channel VPI/VCI, refers to the subscriber-based charge table 115a (FIG. 9) to read out the charge corresponding to this subscriber address and adds the unit charge to this charge.

Further, the charging controller 215 of the transmission apparatus 14 generates a charge metering cell regarding the subscriber apparatus 12 based upon the subscriber-side VPI/VCI values communicated from the cell-amount measuring unit 214 and transmits this charge metering cell to the subscriber apparatus 12 via the ATM switch 213. The transmission apparatus 14 updates the subscriber charge and displays the updated charge on the display unit 17 whenever the charge metering cell is received.

The control described above is repeated for as long as video cells are being transmitted from the provider apparatus 11 to the subscriber apparatus 12.

In accordance with the invention, it is so arranged that charge metering cells are sent to a transmission line in addition to cells for additional service and control for charging subscribers is performed based upon the charge metering cells. As a result, charge on a per-subscriber basis can be managed without charging control necessarily being performed by a provider apparatus. This makes it possible to reduce the burden upon the provider apparatus and to improve the quality at which the original additional service is provided from the provider apparatus to the subscriber apparatus.

In accordance with the present invention, a transmission apparatus generates the charge metering cells in accordance with cell usage and the provider apparatus meters the charge metering cells. As a result, it is possible for the provider apparatus to meter and manage charge on a per-subscriber basis without measuring the amount of the additional-service cells. This makes it possible to reduce the burden upon the provider apparatus and to improve the service provided to the subscriber.

In accordance with the present invention, the provider apparatus measures the amount of the additional-service cells, generates charge metering cells in accordance with the amount of cell usage and transmits the charge metering cells to the transmission apparatus via the transmission line. The transmission apparatus meters charge on a per-subscriber basis on the basis of the charge metering cells and notifies the provider apparatus and subscriber apparatus of the charge. As a result, it is possible for the provider apparatus to meter and manage charge on a per-subscriber basis without updating the charge regarding each subscriber. This makes it possible to reduce the burden upon the provider apparatus and to improve the service provided to the subscriber.

In accordance with the present invention, the provider apparatus generates additional-service cells and charge metering cells and transmits these cells to the transmission apparatus. The transmission apparatus multicasts the charge metering cells and additional-service cells to a plurality of subscriber apparatus and meters the charge metering cells on a per-subscriber basis after multicasting. As a result, metering of charge on a per-subscriber basis at multicasting/broadcasting of additional service can be performed with ease. Moreover, the burden upon the provider apparatus can be reduced.

In accordance with the present invention, groups each consisting of a plurality of VCs are formed and charge is metered on a per-VC group basis. Alternatively, charge is metered on a per-VP basis or groups each consisting of a plurality of VPs are formed and charge is metered on a per-VP group basis. As a result, it is possible to meter charge in units of VC group, units of VP (on a per-subscriber basis) or units of VP group. This makes it possible to improve the service provided to the subscriber.

In accordance with the present invention, it is so arranged that charging cells are generated (a) in units based upon a predetermined flow rate at which additional-service cells are transmitted from the provider apparatus to a subscriber apparatus, (b) in units of predetermined times at which an additional service is provided from the provider apparatus to a subscriber apparatus or (c) per connection for supplying an additional service from the provider apparatus to a subscriber apparatus. As a result, subscribers can be charged by a desired charging method. Further, in accordance with the category of additional service which the provider apparatus provides to the subscriber apparatus, the charging method is set from among the methods of charging by prescribed cell flow rate, charging by prescribed service provision time and charging by connection, and charging is carried out in accordance with the charging method that has been set. This makes it possible to charge the subscriber by the charging method best suited to the additional service.

In accordance with the present invention, the transmission apparatus notifies the provider apparatus and subscriber apparatus of the charge by communicating a charge notification cell (a) whenever a connection ends, (b) periodically, (c) on a flat-rate basis or (d) when there is a charge notification request from the provider apparatus or subscriber apparatus. This makes it possible to notify the provider apparatus and subscriber apparatus of the charge at a desired timing. In accordance with the present invention, the transmission apparatus transmits a charge metering cell or a charge notification cell to a subscriber apparatus and the subscriber apparatus uses these cells to update the charge and display the updated charge. This makes it possible for the subscriber to ascertain the current charge. The end result is an improvement in the quality of the subscriber charging service.

As many apparently widely different embodiments of the present invention can be made without departing from the spirit and scope thereof, it is to be understood that the invention is not limited to the specific embodiments thereof except as defined in the appended claims.

What is claimed is:

1. A method of charging for additional service in a communication system in which an additional service for which a request has been issued by a subscriber apparatus is provided to the subscriber apparatus from a provider apparatus via a transmission line, the method comprising the steps of:

sending a charge metering cell to the transmission line along with additional-service cells, wherein every unit of a predetermined quantity of flow of the additional-service cells being transmitted from the provider apparatus to the subscriber apparatus; and performing charging control based upon a number of charge metering cells.

2. A method of charging for additional service in a communication system in which an additional service for which a request has been issued by a subscriber apparatus is provided to the subscriber apparatus from a provider apparatus by cells via a transmission line, the method comprising the steps of:

providing a transmission apparatus between the provider apparatus and subscriber apparatus;

measuring, in said transmission apparatus, amount of additional-service cells in regard to each subscriber apparatus;

generating, in said transmission apparatus, charge metering cells commensurate with the amount of additional-service cells; and transmitting the charge metering cells from said transmission apparatus to said provider apparatus and/or said subscriber apparatus.

3. The method according to claim 2, further comprising the step of calculating, in said subscriber apparatus, a charge in regard to the subscriber apparatus based upon a number of charge metering cells received.

4. The method according to claim 2, further comprising the steps of extracting charge metering cells by said provider apparatus and calculating charge in regard to each subscriber apparatus by said provider apparatus based upon a number of charge metering cells received per each subscriber apparatus.

5. The method according to claim 2, further comprising the step of generating, by said transmission apparatus, a charge metering cell every unit of predetermined quantity of flow of additional-service cells transmitted from the provider apparatus to the subscriber apparatus.

6. The method according to claim 2, further comprising the step of generating, by said transmission apparatus, a charge metering cell every unit of predetermined time at which additional-service cells are provided from the provider apparatus to the subscriber apparatus.

7. The method according to claim 2, further comprising the step of generating, by said transmission apparatus, a charge metering cell per connection for providing an additional service from the provider apparatus to the subscriber apparatus.

8. The method according to claim 2, further comprising the step of deciding, by said transmission apparatus, and in dependence upon the category of additional service which the provider apparatus provides to the subscriber apparatus, which of the following charging methods is to be used to perform charging control: (a) charging by quantity of flow of additional-service cells, (b) charging by service provision time and (c) charging by a number of connection, and generating charge metering cells in accordance with the charging method.

9. The method according to claim 2, further comprising the steps of:

providing the transmission apparatus with a charging database; and performing charging control by said transmission apparatus in accordance with said charging database.

10. The method according to claim 2, further comprising the steps of:

providing the provider apparatus with a charging database; and causing the provider apparatus to notify the transmission apparatus of a charging method, which is in accordance with said charging database, in response to every additional-service request from the subscriber apparatus, wherein, said transmission apparatus generates said charge metering cells in accordance with said notified charging method.

11. The method according to claim 2, further comprising the steps of:

setting a unit charge per charge metering cell; and calculating charge, by the provider apparatus or the subscriber apparatus, based upon number of charge metering cells received and the unit charge.

12. The method according to claim 2, further comprising the steps of:

inserting a charge into a charge metering cell; and causing the provider apparatus or subscriber apparatus to add the charge contained in the charge metering cell received to a currently prevailing total charge, thereby updating the total charge in regard to each subscriber.

13. A method of charging for additional service in a communication system in which an additional service for which a request has been issued by a subscriber apparatus is provided to the subscriber apparatus from a provider apparatus by cells via a transmission line, the method comprising the steps of:

providing a transmission apparatus between the provider apparatus and subscriber apparatus;

measuring, in said provider apparatus, amount of additional-service cells for each subscriber apparatus and generating charge metering cells commensurate with the amount of additional-service cells; and transmitting the charge metering cells from the provider apparatus to the transmission apparatus via the transmission line.

14. The method according to claim 13, further comprising the step of:

calculating, in the transmission apparatus, charge in regard to each subscriber apparatus based upon the charge metering cells received from the provider apparatus.

15. The method according to claim 14, further comprising step of:

notifying the provider apparatus, by the transmission apparatus, of the calculated charge in regard to each subscriber apparatus.

16. The method according to claim 15, wherein the transmission apparatus notifies the provider apparatus of the calculated charge, by sending a charge notification cell (a) whenever a connection ends, (b) periodically, (c) on a flat-rate basis or (d) when there is a charge notification request from the provider apparatus.

17. The method according to claim 14, further comprising step of:

notifying the subscriber apparatus, by the transmission apparatus, of the calculated charge in regard to each subscriber apparatus.

18. The method according to claim 17, wherein the transmission apparatus notifies the subscriber apparatus of the calculated charge by sending a charge notification cell (a) whenever a connection ends, (b) periodically, (c) on a flat-rate basis or (d) when there is a charge notification request from the subscriber apparatus.

19. The method according to claim 14, further comprising the step of:

forming groups of a plurality of VCs; and referring to a VCI of the charge metering cell received from the provider apparatus and calculating charge in regard to each VC group.

20. The method according to claim 14, further comprising the step of:

forming groups of a plurality of VPs; and referring to a VPI of the charge metering cell received from the provider apparatus and calculating charge in regard to each VP group.

21. The method according to claim 13, further comprising the steps of:

multicasting, in said transmission apparatus, the charge metering cells and the additional-service cells received from the provider apparatus to a plurality of subscriber apparatus;

counting, in said transmission apparatus, the charge metering cells in regard to each subscriber apparatus after multicasting; and calculating, in said transmission apparatus, charge in regard to each subscriber at multicasting of an additional service based upon the counted value.

22. The method according to claim 14 or 21, wherein the transmission apparatus refers to a VPI of a charge metering cell and calculates charge in regard to each VP.

23. The method according to claim 13, wherein the provider apparatus measures amount of additional-service cells in regard to each subscriber apparatus, generates charge metering cells commensurate with the amount of additional-service cells and transmits these charge metering cells to each subscriber apparatus; and the subscriber apparatus calculates charge in regard to this subscriber apparatus based upon a number of charge metering cells received.

24. The method according to claim 13, wherein the provider apparatus generates a charge metering cell every unit of predetermined quantity of flow of additional-service cells transmitted from the provider apparatus to the subscriber apparatus.

25. The method according to claim 13, wherein the provider apparatus generates a charge metering cell every unit of predetermined time at which additional-service cells are provided from the provider apparatus to the subscriber apparatus.

26. The method according to claim 13, wherein the provider apparatus generates a charge metering cell per connection for providing an additional service from the provider apparatus to the subscriber apparatus.

27. The method according to claim 13, wherein the provider apparatus decides, in dependence upon the category of additional service which the provider apparatus provides to the subscriber apparatus, which of the following charging methods is to be used to perform charging control: (a) charging by quantity of flow of the additional-service cells, (b) charging by service provision time and (c) charging by a number of connection, and generates charge metering cells in accordance with the charging method decided.

28. The method according to claim 13, further comprising the steps of:

providing the transmission apparatus with a charging database; and causing the transmission apparatus to perform charging control in accordance with said charging database.

29. The method according to claim 13, further comprising the steps of:

setting a unit charge per charge metering cell; and calculating charge, by the transmission apparatus, based upon number of charge metering cells received and the unit charge.

30. The method according to claim 13, further comprising the steps of:

inserting a charge into a charge metering cell; and causing the transmission apparatus to add the charge contained in the charge metering cell received to a currently prevailing total charge, thereby updating the total charge in regard to each subscriber.

31. A transmission apparatus of an additional-service communication system in which an additional service for which a request has been issued by a subscriber apparatus is provided to the subscriber apparatus from a provider apparatus by cells via the transmission apparatus, said transmission apparatus comprising:

means for measuring amount of additional-service cells in regard to each subscriber apparatus;

means for generating charge metering cells commensurate with the amount of additional-service cells; and means for transmitting the charge metering cells to the provider apparatus and/or subscriber apparatus.

32. An additional-service communication system in which an additional service for which a request has been issued by a subscriber apparatus is provided to the subscriber apparatus from a provider apparatus by cells via a transmission apparatus, wherein:

said transmission apparatus comprises means for measuring amount of additional-service cells in regard to each subscriber apparatus;

means for generating charge metering cells commensurate with the amount of additional-service cells; and means for transmitting the charge metering cells to the provider apparatus and/or subscriber apparatus;

said subscriber apparatus comprises:

means for extracting the charge metering cells sent from the transmission apparatus; and means for calculating a charge in regard to the subscriber apparatus based upon a number of charge metering cells received; and said provider apparatus comprises:

means for extracting charge metering cells sent from the transmission apparatus;

means for calculating a charge in regard to each subscriber apparatus based upon a number of charge metering cells received per each subscriber apparatus; and means for storing the charge in regard to each subscriber apparatus.

33. An additional-service communication system in which an additional service for which a request has been issued by a subscriber apparatus is provided to the subscriber apparatus from a provider apparatus by cells via a transmission apparatus, wherein:

said provider apparatus comprises means for measuring amount of additional-service cells for each subscriber apparatus;

means for generating charge metering cells commensurate with the amount of additional-service cells for each subscriber apparatus;

means for transmitting the charge metering cells; and means for storing the charge in regard to each subscriber apparatus; and said transmission apparatus comprises:

means for extracting charge metering cells sent from said provider apparatus and calculating a charge in regard to each subscriber apparatus based upon a number of charge metering cells received; and means for notifying said provider apparatus, by a charge notification cell, of the charge in regard to each subscriber apparatus.

34. The system according to claim 33, wherein the subscriber apparatus comprises means for extracting charge metering cells sent from said provider apparatus and calculating charge in regard to said subscriber apparatus based upon a number of charge metering cells received.

35. The system according to claim 33, wherein said transmission apparatus further comprises means for notifying the subscriber apparatus, by a charge notification cell, of the charge in regard to the subscriber apparatus.

36. An additional-service communication system in which an additional service for which a request has been issued by a subscriber apparatus is provided to the subscriber apparatus from a provider apparatus by cells via a transmission apparatus, wherein:

said provider apparatus comprises means for measuring amount of additional-service cells for each subscriber apparatus;

means for generating charge metering cells commensurate with the amount of additional-service cells or each subscriber apparatus;

means for transmitting the charge metering cells; and means for storing the charge in regard to each subscriber apparatus; and said transmission apparatus comprises:

means for multicasting, to a plurality of subscriber apparatus, charge metering cells and additional-service cells sent from said provider apparatus;

means for counting the charge metering cells in regard to each subscriber apparatus after multicasting, and calculating charge in regard to each subscriber apparatus at multicasting of an additional service, and means for notifying said provider apparatus and subscriber apparatus, by a charge notification cell, of the charge due from the subscriber apparatus.

* * * * *